United States Patent
Tanishima et al.

(12)
(10) Patent No.: US 6,175,747 B1
(45) Date of Patent: *Jan. 16, 2001

(54) BASE TRANSCEIVER STATION AND SUBSCRIBER UNIT IN WIRELESS LOCAL LOOP SYSTEM USING PERSONAL HANDY-PHONE SYSTEM AND METHOD FOR OPERATING SAME

(75) Inventors: Yasuo Tanishima; Rikihiko Mashima; Atsushi Yamashita; Hiroyuki Sogo; Mitsuru Seta; Hitoshi Ishikawa; Tsudoi Kubo; Masahiko Shirota, all of Kawasaki; Yutaka Hamada, Yokohama, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/821,627

(22) Filed: Mar. 20, 1997

(30) Foreign Application Priority Data

Jun. 28, 1996 (JP) .................................................. 8-169700

(51) Int. Cl.⁷ .............................. H04B 1/38; H04M 1/00; H04M 11/00
(52) U.S. Cl. .......................... 455/562; 455/561; 455/560; 455/550; 455/403
(58) Field of Search ..................................... 455/403, 561, 455/562, 82, 83, 13.3, 272, 342, 422, 445, 560, 446, 448, 464, 502, 503, 554, 466, 67.4, 72, 436, 277.1, 552; 370/336, 337, 347, 307, 222, 465

(56) References Cited

U.S. PATENT DOCUMENTS

| | | | |
|---|---|---|---|
| 3,680,128 | * 7/1972 | Wille et al. ........................... | 343/702 |
| 3,692,952 | * 9/1972 | Leonard ................................ | 455/554 |
| 4,143,369 | * 3/1979 | Ayers ................................. | 455/277.1 |
| 4,898,010 | * 2/1990 | Futami et al. ........................ | 70/278 |
| 5,260,944 | * 11/1993 | Tomabechi ........................... | 370/347 |
| 5,349,313 | * 9/1994 | Collins et al. ....................... | 333/131 |
| 5,371,473 | * 12/1994 | Trinh et al. ......................... | 330/129 |

(List continued on next page.)

FOREIGN PATENT DOCUMENTS

| | | |
|---|---|---|
| 5102904 | 4/1993 | (JP) . |
| 5167489 | 7/1993 | (JP) . |
| 06338835 | 12/1994 | (JP) . |
| 6-339172 | 12/1994 | (JP) . |
| 07123065 | 5/1995 | (JP) . |
| 7-202834 | 8/1995 | (JP) . |
| 07245784 | 9/1995 | (JP) . |
| 08056379 | 2/1996 | (JP) . |
| 8-84148 | 3/1996 | (JP) . |
| 09261724 | 10/1997 | (JP) . |

* cited by examiner

*Primary Examiner*—Dwayne D. Bost
*Assistant Examiner*—Raymond B. Persino
(74) *Attorney, Agent, or Firm*—Helfgott & Karas, P.C.

(57) ABSTRACT

A base transceiver station in a wireless local loop system using a personal handy-phone system constituted by a plurality of cell stations, each accommodating a plurality of subscriber units, a hybrid section integrally handling signals transmitted and received by the plurality of cell stations via a single antenna, and a multiplexing/demultiplexing unit integrally handling the signals transferred between the plurality of cell stations and an existing network, thereby enabling construction of a wireless local loop system which is small in size, can expand the service area without an increase of interference with other base transceiver stations, has a good affinity with existing networks, is provided with ISDN functions, and, at the same time, provides backup against faults and improves the transmission quality and reliability.

39 Claims, 67 Drawing Sheets

U.S. PATENT DOCUMENTS

| | | | |
|---|---|---|---|
| 5,550,813 | * | 8/1996 | Vella-Coleiro ........................ 455/73 |
| 5,555,260 | * | 9/1996 | Rinnback et al. ..................... 455/72 |
| 5,602,837 | * | 2/1997 | Takahashi ............................ 455/466 |
| 5,603,089 | * | 2/1997 | Searle et al. ........................ 455/562 |
| 5,608,724 | * | 3/1997 | Green, Jr. ............................ 370/307 |
| 5,657,374 | * | 8/1997 | Russell et al. ....................... 455/422 |
| 5,680,395 | * | 10/1997 | Weaver, Jr. et al. ................. 455/436 |
| 5,715,527 | * | 2/1998 | Horii et al. .......................... 455/82 |
| 5,754,082 | * | 5/1998 | Swanson .............................. 333/124 |
| 5,784,406 | * | 7/1998 | Dejaco et al. ...................... 455/67.4 |
| 5,818,918 | * | 10/1998 | Fujii .................................... 455/552 |
| 5,825,762 | * | 10/1998 | Kamin, Jr. et al. ................. 455/562 |

EXAMPLE OF DRAIN VOLTAGES

| | Vds | OPERATING POINT IN EACH COM. AMP | |
|---|---|---|---|
| | | COM. AMP 1 | COM. AMP 2 |
| A | +10V | | TIME SLOT 4 |
| B | +9V | | TIME SLOT 3 |
| C | +8V | | TIME SLOT 1 |
| D | +7V | TIME SLOTS 1,3 | |
| E | 0V | TIME SLOTS 2,4 | TIME SLOT 2 |

FIG. 16

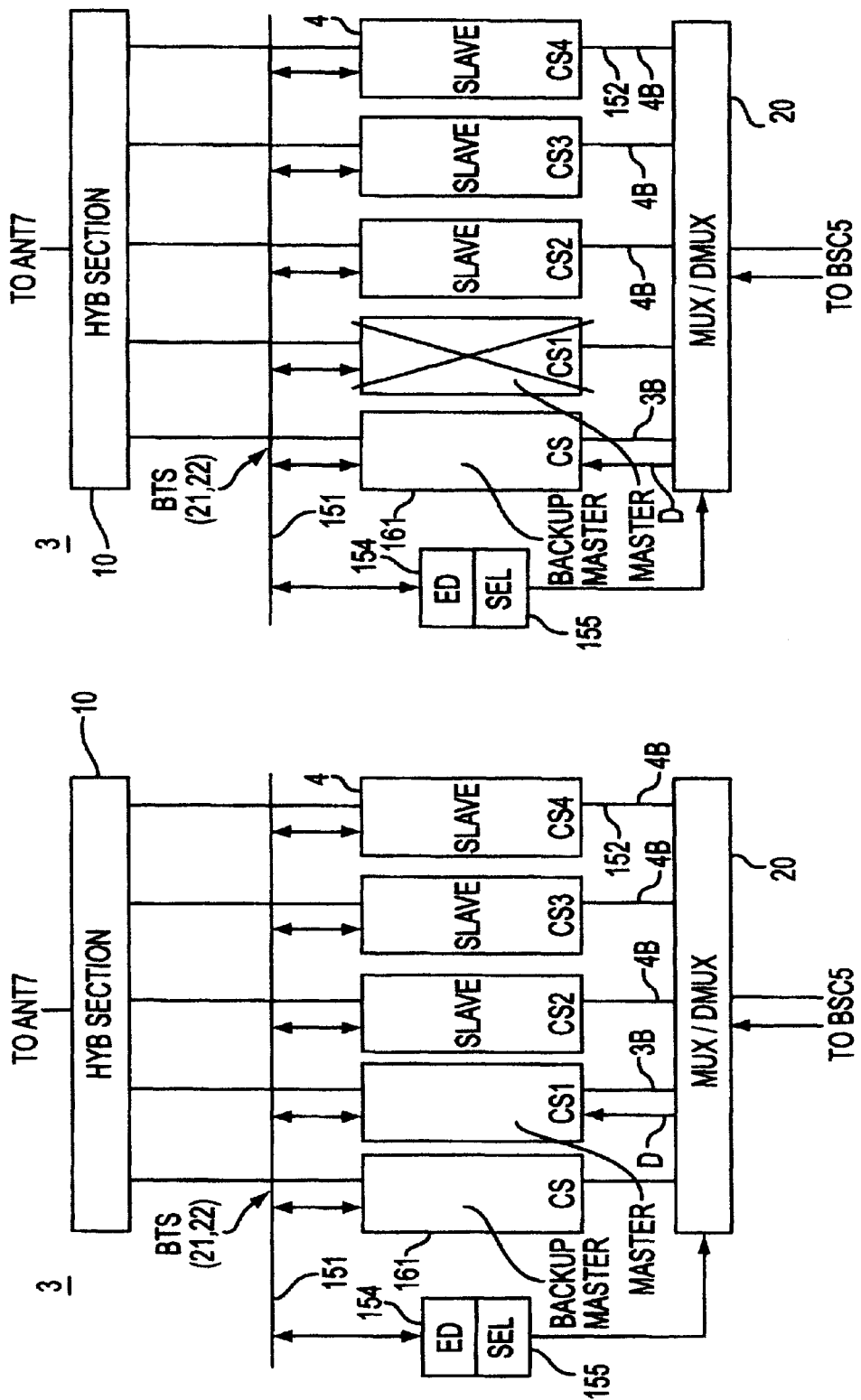

000# BASE TRANSCEIVER STATION AND SUBSCRIBER UNIT IN WIRELESS LOCAL LOOP SYSTEM USING PERSONAL HANDY-PHONE SYSTEM AND METHOD FOR OPERATING SAME

BACKGROUND OF THE INVENTION

1. Field of the Invention

The present invention relates to a wireless local loop (WLL) system using a so-called "Personal Handy-phone System" (PHS), more particularly relates to a base transceiver station and a subscriber unit in a wireless local loop system and a method for operating the same.

Wireless local loop systems are currently being closely looked at among the various access type systems. They may be considered one of the optimal means for connecting a subscriber exchange (local exchange) with subscribers through radio channels.

One way for constructing such a wireless local loop system is to build upon the existing cellular networks used for cellular telephones.

Another way for constructing such a wireless local loop system is to build upon a new PHS network.

There are advantages and disadvantages to each of the above first and second techniques. The first technique is better from the viewpoint of the mobility of the subscriber (cellular telephone), that is, enables the cellular telephone to be used by a moving car, train, etc. On the other hand, the second technique is better from the viewpoint of the affinity and compatibility with existing public switched telephone networks (PSTN), that is, the cellular networks upon which the first technique is based exist as completely different systems from the public switched telephone networks, Further, the second technique is better from the viewpoint of the extremely high quality of the lines.

The present invention relates to a wireless local loop system established based on the second technique, that is, a wireless local loop system incorporating a PHS network.

2. Description of the Related Art

The basic technology for realizing the PHS type wireless local loop system upon which the present invention is founded already exists, as will be illustrated later, however, use of such a wireless local loop system by a large number of subscribers as part of a public switched telephone network in the broad sense of the term requires more than simple technical feasibility. It is further required that the wireless local loop system be practical.

Realization of such a practical wireless local loop system, however, requires that several tasks be solved. It is particularly important to solve the following six tasks:

1) Sharp reduction of the number of transmitting and receiving antennas which must be provided in the base transceiver station (BTS) so as to reduce the size and raise the efficiency of the base transceiver station. 2) Elimination of the problems inherent to conventional PHS networks, that is, the problem of the small service area per base transceiver system and the problem of the susceptibility to interference from other base transceiver stations.

3) Design of a configuration enabling full utilization of the inherent characteristic of a PHS network as mentioned above, that is, the excellent affinity and compatibility with a public switched telephone network.

4) Inexpensive realization of the functions of an integrated services digital network (ISDN) to eliminate the reliance of existing PHS networks on expensive ISDNs.

5) Minimalization of the deterioration in the quality of service to the subscriber due to the higher probability of the occurrence of faults in a base transceiver station accompanying the large number of cell stations (CS) required to be provided in the base transceiver station in the case of a cell with a large amount of traffic.

6) Relating to the task of 5), realization of a base transceiver station keeping the occurrence of the above faults to a minimum, having a high transmission quality, and having a high reliability.

SUMMARY OF THE INVENTION

Accordingly, an object of the present invention is to provide a PHS type wireless local loop system, more particularly a base transceiver station and subscriber unit in such a wireless local loop system and a method of operation of the same which successfully solve several of the above six tasks, preferably which successfully solve all of the six tasks at the same time.

To achieve the above object, the present invention provides a base transceiver station constituted by a plurality of cell stations, each accommodating a plurality of subscriber units, a hybrid section integrally handling signals transmitted and received by the plurality of cell stations via a single antenna, and a multiplexing/demultiplexing unit integrally handling the signals transferred between the plurality of cell stations and an existing network. More particularly, the present invention provides a base transceiver station in a PHS type wireless local loop system which is small in size, can expand the service area without an increase of interference with other base transceiver stations, has a good affinity with existing networks, is provided with ISDN functions, and, at the same time, provides backup against faults, and improves the transmission quality and reliability.

BRIEF DESCRIPTION OF THE DRAWINGS

The above object and features of the present invention will be more apparent from the following description of the preferred embodiments given with reference to the accompanying drawings, wherein:

FIG. 16 is a view of drain voltages in four modes A to D shown in FIG. 15 according to the example of FIG. 14;

FIGS. 54A and 54B are views of a third mode of the ninth embodiment according to the present invention, in which FIG. 54A is a view showing the state before occurrence of a fault and FIG. 54B is a view showing the state after the occurrence of the fault;

FIGS. 55A and 55B are views of a fourth mode of the ninth embodiment according to the present invention, in which FIG. 55A is a view showing the state before occurrence of a fault and FIG. 55B is a view showing the state after the occurrence of the fault;

FIGS. 56A and 56B are views of a fifth mode of the ninth embodiment according to the present invention, in which FIG. 56A is a view showing the state before occurrence of a fault and FIG. 56B is a view showing the state after the occurrence of the fault;

FIGS. 58A and 58B are views of a seventh mode of the ninth embodiment according to the present invention, in which FIG. 58A is a view showing the state before occurrence of a fault and FIG. 58B is a view showing the state after the occurrence of the fault;

FIGS. 59A and 59B are views of an eighth mode of the ninth embodiment according to the present invention, in which FIG. 59A is a view showing the state before occurrence of a fault and FIG. 59B is a view showing the state after the occurrence of the fault;

FIGS. 60A and 60B are views of a ninth mode of the ninth embodiment according to the present invention, in which FIG. 60A is a view showing the state before occurrence of a fault and FIG. 60B is a view showing the state after the occurrence of the fault;

DESCRIPTION OF THE PREFERRED EMBODIMENTS

Before describing the embodiments of the present invention, the related art and the disadvantages therein will be described with reference to the related figures.

Figure 67:
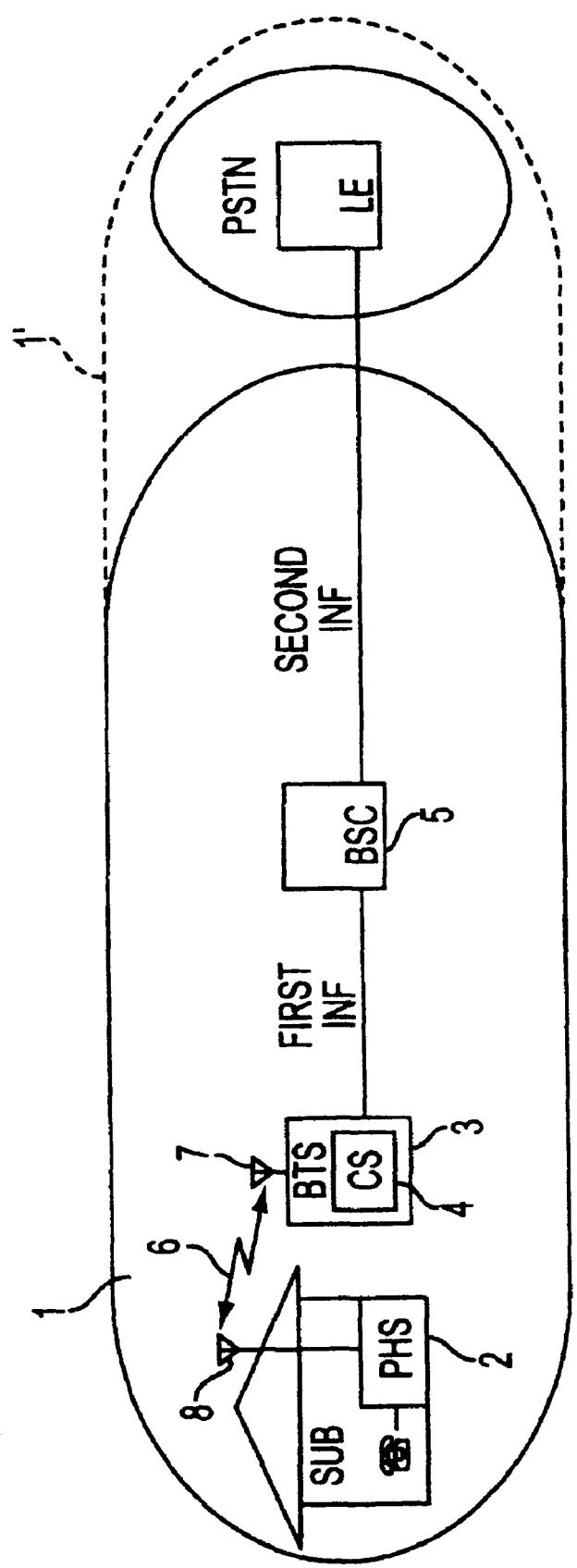
FIG. 67 is a view of the basic configuration of the wireless local loop system upon which the present invention is founded.

FIG. 67 is a view of the basic configuration of a wireless local loop system upon which the present invention is founded. In the figure, 1 represents the wireless local loop system as a whole. This wireless local loop system 1 is easily linked up with an existing public switched telephone network and forms a public switched telephone network PSTN1' in the broad sense. Note that a subscriber exchange LE is included in the public switched telephone network.

The principal component of the wireless local loop system 1 is the base transceiver station (BTS) 3. This base transceiver station 3 is connected to a base station controller (BSC) 5 via a first interface (INF). This base station controller (BSC) 5 further transfers transmission information with the public switched telephone network (PSTN) via a second interface (INF).

The base transceiver station (BTS) 3 is connected to a subscriber SUB via a radio channel 6. As mentioned above, the present invention assumes use of a PHS type wireless local loop system 1, so a subscriber unit 2 comprising a PHS terminal is connected to this subscriber SUB.

Since the subscriber SUB is connected to the public switched telephone network (PSTN) using a PHS terminal 2 in this way, a cell station (CS) 4 adapted to a PHS network must be introduced into the base transceiver station (BTS) 3.

As stated earlier, the basic technology for realizing the PHS type wireless local loop system 1 shown in FIG. 67 already exists, however, use of such a wireless local loop system 1 by a large number of subscribers SUB as part of a public switched telephone network PSTN1' in the broad sense of the term requires more than simple technical feasibility. It is further required that the wireless local loop system 1 be practical.

Realization of such a practical wireless local loop system, however, requires that several tasks be solved. It is particularly important to solve the six tasks explained earlier.

The present invention provides a PHS type wireless local loop system, more particularly a base transceiver station (BTS) and subscriber unit in such a wireless local loop system and a method of operation of the same which successfully solve several of the above six tasks, preferably which successfully solve all of the six tasks at the same time.

Figure 1:
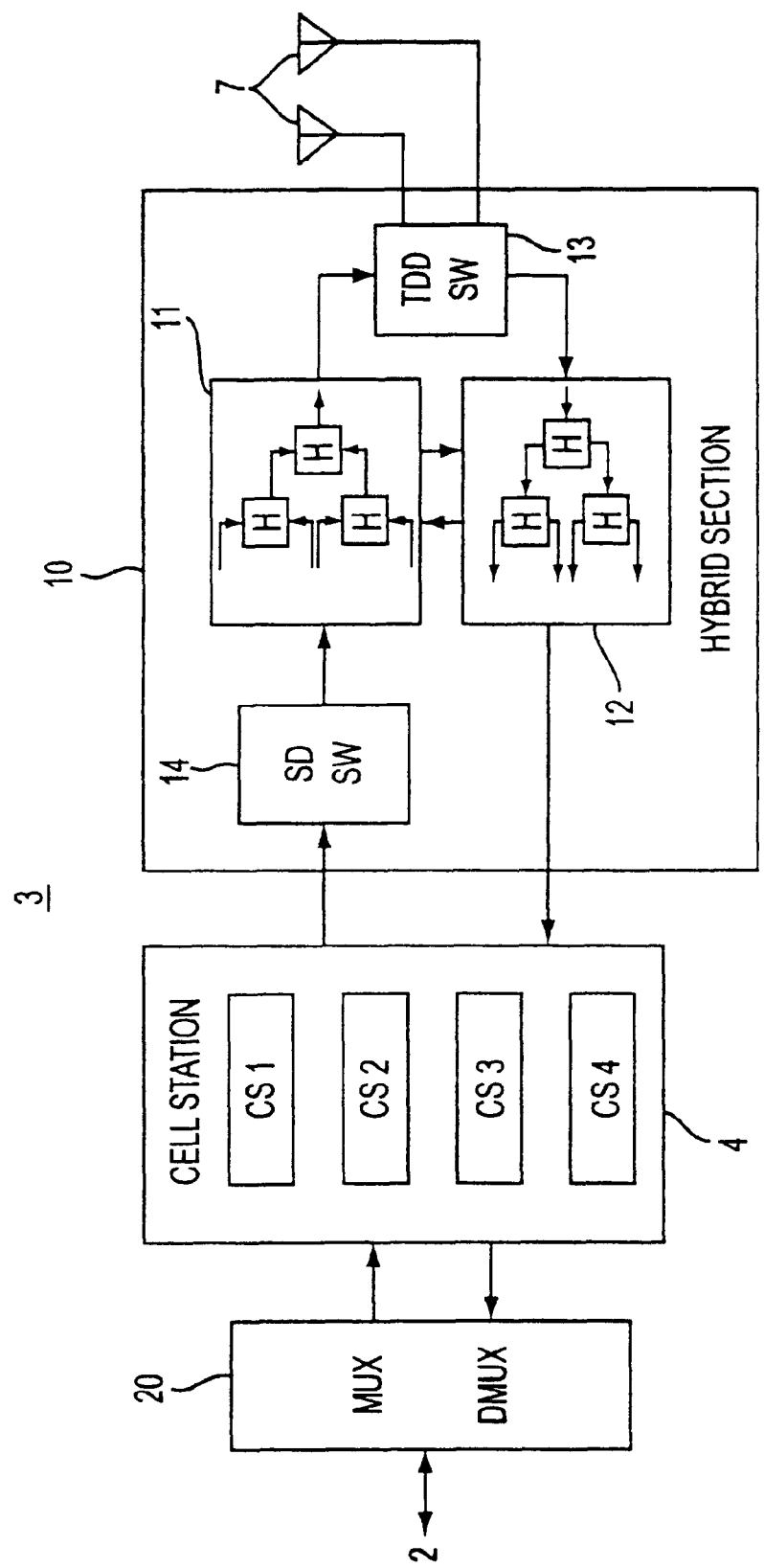
FIG. 1 is a view of the basic configuration of the present invention.

FIG. 1 is a view of the basic configuration of the present invention. The figure specifically shows the base transceiver station (BTS) 3, which forms the heart of the wireless local loop system 1 shown in FIG. 67. The cell station (CS) 4 in FIG. 67 is constituted by a plurality of, for example, four, cell stations CS1, CS2, CS3, and CS4. Each cell station (CS1 to CS4) accommodates a plurality of subscriber units 2 comprised by PHS terminals. Preferably, they accommodate these subscriber units 2 via a multiplexing/demultiplexing unit (MUX/DMUX) 20.

In FIG. 1, the transmitting and receiving antenna 7 shown in FIG. 67 is connected to the cell station (CS) 4 via a hybrid section 10.

The hybrid section 10 is comprised of a power combiner (comprised by a hybrid H) 11, a power distributor (comprised by a hybrid H) 12, a time division duplex switch (TDD·SW) 13, and a space diversity switch (SD·SW) 14.

In more detail, the hybrid section 10 is constituted as follows. Namely, it is arranged between a plurality of cell stations (CS1 to CS4) 4 and two transmitting and receiving antennas 7 having a space diversity (SD) configuration and is constituted by a multistage power combiner 11 which combines the transmission powers from the plurality of cell stations (CS) 4 and feeds the combined power to one of the two transmitting and receiving antennas 7, a multistage power distributor 12 for distributing the received power received from one of the two transmitting and receiving antennas 7 to the plurality of cell stations (CS) 4, a space diversity switch (SD·SW) 14 which combines the transmission powers toward one of the two transmitting and receiving antennas 7, and a time division duplex switch (TDD·SW) 13 for alternately switching that one transmitting and receiving antenna 7 between transmission use and reception use under a time division duplex (TDD) mode.

Figure 2:
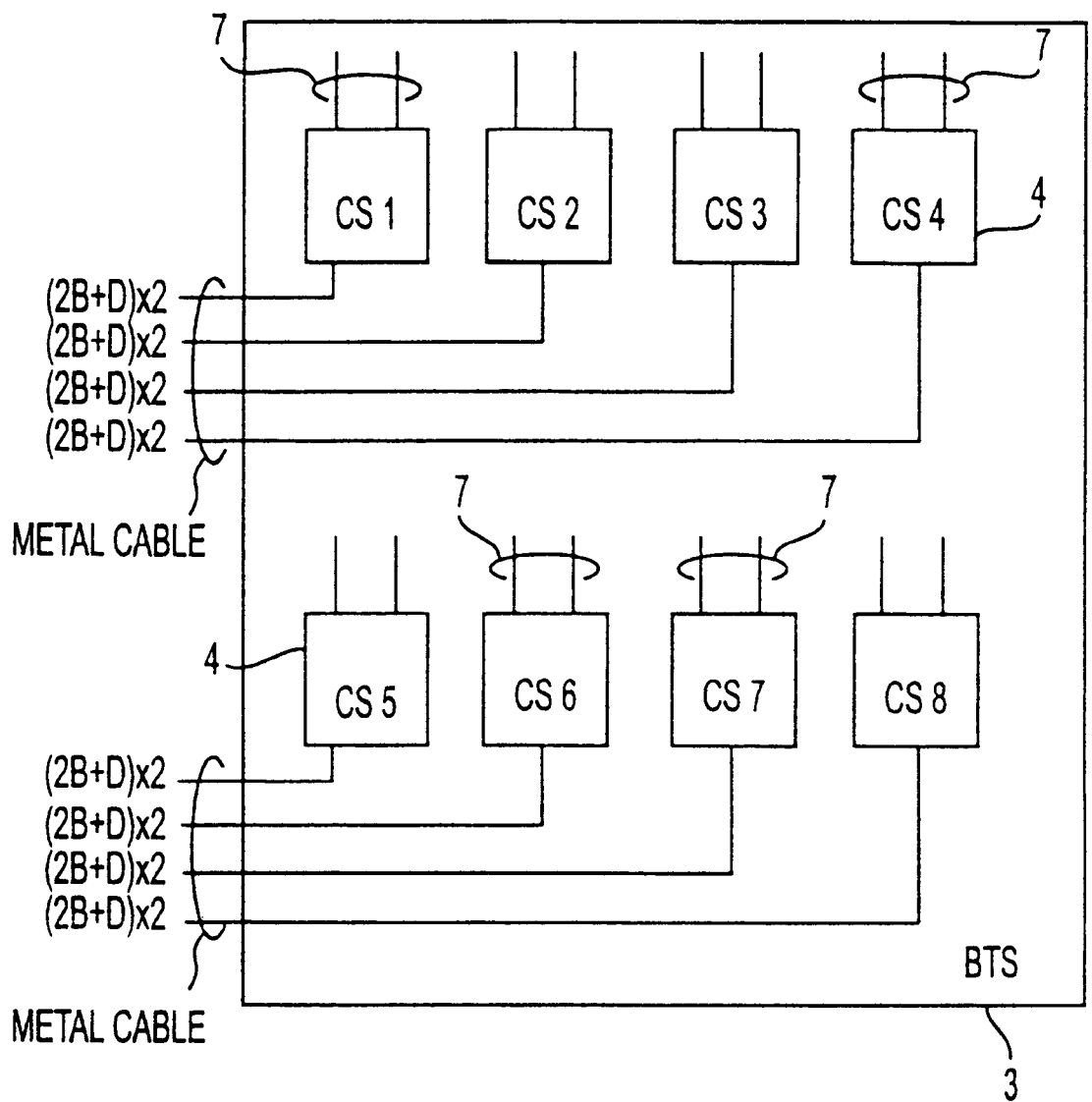
FIG. 2 is a view of an example of the functions which should be possessed by a base transceiver station of the present invention.

FIG. 2 is a view of an example of the functions which should be possessed by the base transceiver station of the present invention. The configuration shown in FIG. 1 corresponds to the upper half of FIG. 2. FIG. 2 shows an example in which the base transceiver station (BTS) 3 has eight cell stations (CS1 to CS8). Note that the number of the cell stations (CS) can be determined in consideration of the number of the subscriber units 2 accommodated by the base transceiver station (BTS) 3.

Since a base transceiver station (BTS) 3 having the configuration shown in FIG. 2 is provided with eight cell stations (CS1 to CS8) 4, the number of the transmitting and receiving antennas 7 becomes 16 (=2×8). Further, each cell station (CS) requires two sets of channels, each set comprising two speech channels (B channels) and one control channel (D channel) (2B+D), under the current PHS standards (based on ISDN). Therefore, a large number of metal cables must be laid.

Thus, a base transceiver station (BTS) 3 having the configuration of FIG. 2 bristles with 16 transmitting and receiving antennas 7. Therefore there arises a problem of enlargement of the tower on which the base transceiver station (BTS) 3 is mounted and a shadow loss due to the enlarged tower. This leads to the task 1) explained above.

Figure 3:
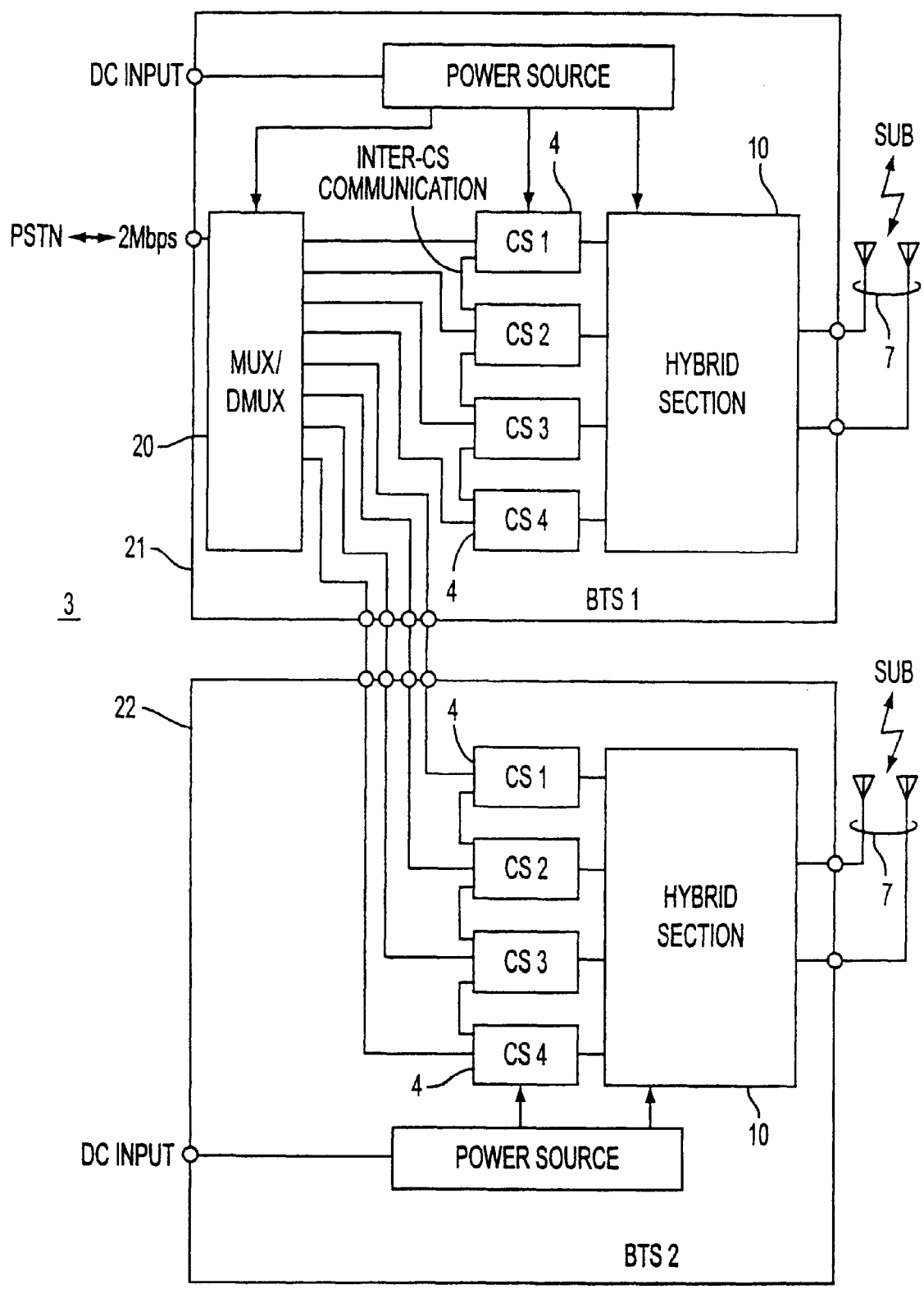
FIG. 3 is a view of an example of the configuration of a base transceiver station reconfigured to the basic configuration of FIG. 1.

When the base transceiver station (BTS) 3 shown in FIG. 2 is reconfigured in accordance with the basic configuration of the present invention shown in FIG. 1, the configuration shown in FIG. 3 is exhibited.

FIG. 3 is a view of an example of the configuration of a base transceiver station reconfigured according to the basic configuration of FIG. 1. The base transceiver station (BTS) 3 shown in the figure comprises a first base transceiver station (BTS1) 21 and a second base transceiver station (BTS2) 22 having almost the same configuration.

Each of the first and second base transceiver stations (BTS1 and BTS2) 21 and 22, as illustrated, is provided with a plurality of cell stations (CS), for example, four cell stations (CS1 to CS4) 4, together constituting cell stations as one system. Two such systems are therefore formed. Note that in the first and second base transceiver stations (BTS1 and BTS2) 21 and 22, "CS1" indicates a master cell station, and the other "CS's" indicate slave cell stations. These are connected by an inter-cell station communication.

The first base transceiver station (BTS1) 21 is provided with a multiplexing/demultiplexing unit (MUX/DMUX) 20, while the second base transceiver station (BTS2) 22 is not. However, the above-mentioned hybrid sections (10 of FIG. 1) are provided in both of the first and second base transceiver stations (BTS1 and BTS2) 21 and 22 as the hybrid sections 10, respectively.

When the distribution density of the subscriber units 2 accommodated in a base transceiver station (BTS) 3 is small or the traffic is light, the base transceiver station (BTS) 3 can be formed by only the first base transceiver station (BTS1) 21.

By assigning the three B channels of B1, B2, and B3 and the D channel to the cell station CS1 in the first base transceiver station (BTS1) and similarly assigning the four B channels of B4, B5, B6, and B7 to the cell station CS2, the four B channels of B8, B9, B10, and B11 to the cell station CS3, and the four B channels of B12, B13, B14, and B15 to the cell station CS4, it is possible to form (15B+D) channels as a whole. (15B+D) channels can be accommodated as a whole in the second base transceiver station (BTS2) 22 in exactly the same way.

By using the multiplexing part of the multiplexing/demultiplexing unit (MUX/DMUX) 20 and setting the transmission capacity to 2 Mbps so as to interface with the public switched telephone network (PSTN) side, the affinity and compatibility of the public switched telephone network (PSTN) and wireless local loop system become extremely good. This relates to the tasks 3) and 4) explained above.

Figure 4:
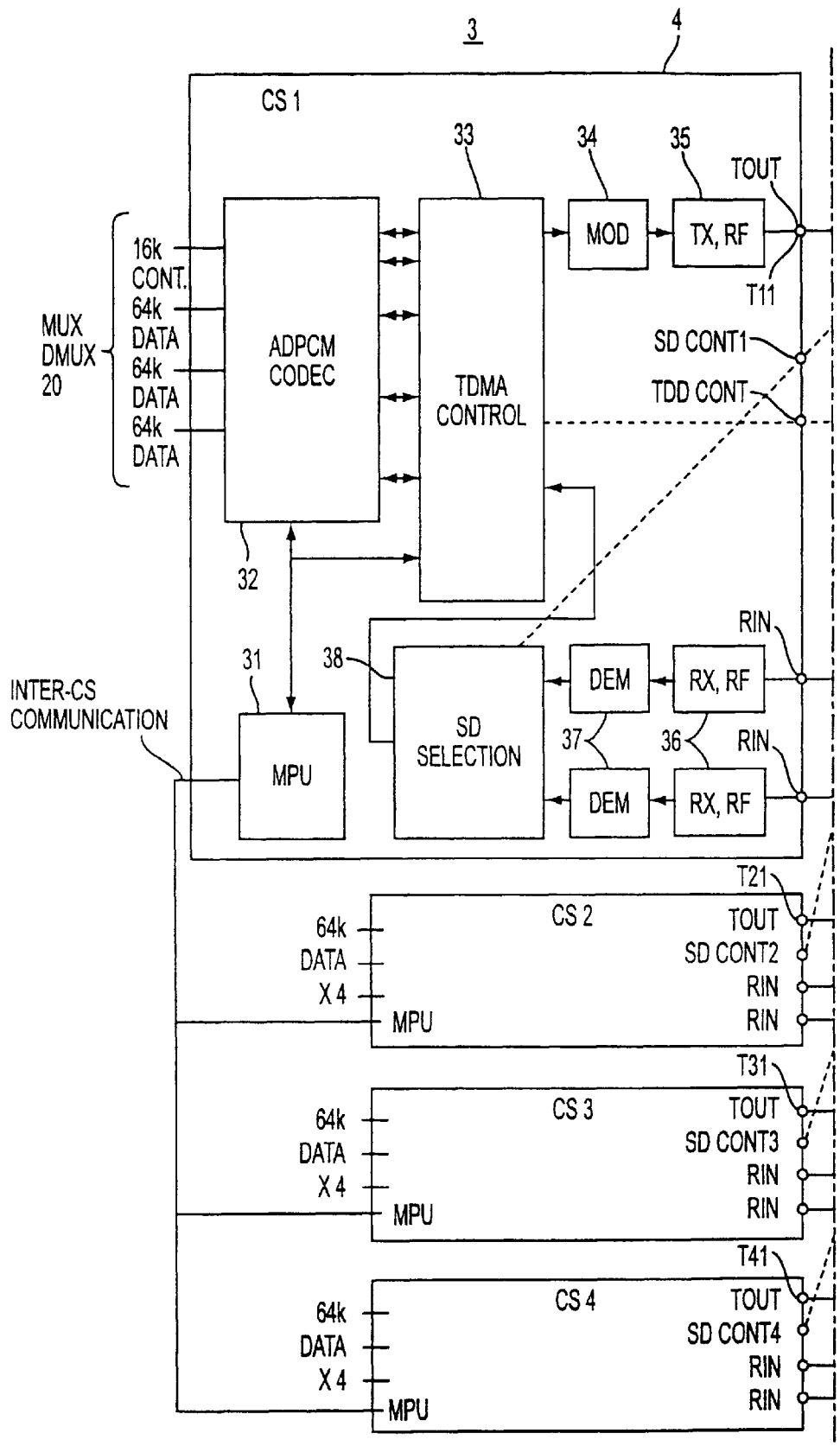
FIG. 4 is a view of a first part of a first embodiment according to the present invention.
Figure 5:
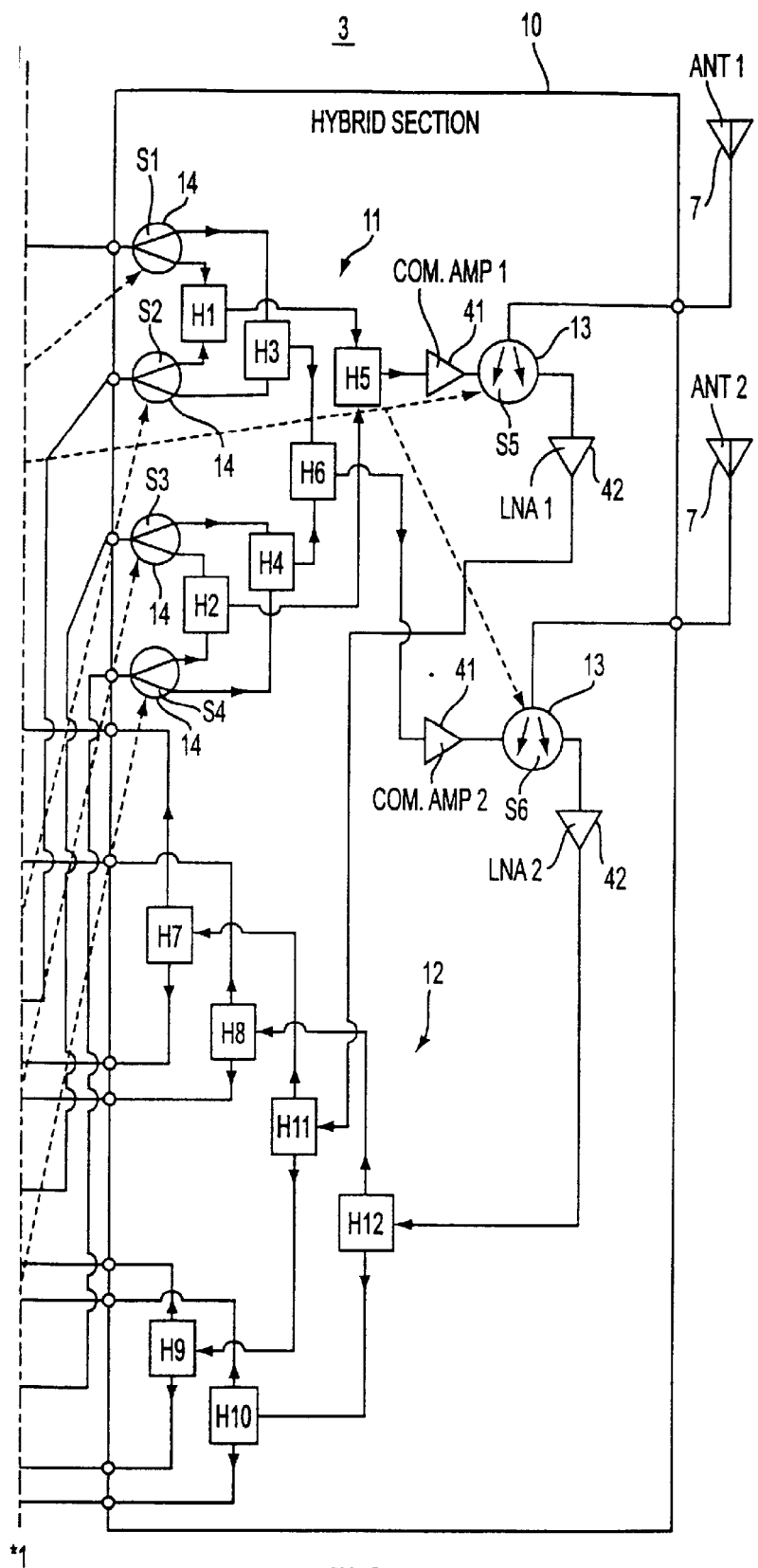
FIG. 5 is a view of a second part of the first embodiment according to the present invention.

FIGS. 4 and 5 are views of a first and second part of a first embodiment according to the present invention. Note that the same reference numerals or symbols are given to the same constituent elements throughout the figures.

FIGS. 4 and 5 show the base transceiver station (BTS) 3 as a whole, No explanation will be given of the multiplexing/demultiplexing unit (MUX/DMUX) 20, however.

Four cell stations (CS1 to CS4) 4 share a single control channel (D channel: 16 kbps CONT) though they basically should each have their own. At this time, the cell station CS1 serves as the master cell station, while the remaining cell stations CS2 to CS4 are made to function as slave cell stations. Control information is transferred among the cell stations CS1 to CS4 by the illustrated inter-cell station communication via their microprocessors (MPU) 31 so as to increase the number of the speech channels (B channels) accommodated in these four cell stations up to 15 channels.

The transmission system in each cell station (CS), as shown in FIG. 4, is provided with, first, an adaptive differential pulse code modulation (ADPCM) coder and decoder (CODEC) 32 for converting the 64 kbps voice or data signal from the multiplexing/demultiplexing unit (MUX/DMUX) (20 of FIG. 3) to a 32 kbps voice or data signal. Then, further, a time division multiple access (TDMA) control unit 33 multiplexes the single control channel (D channel) with for example three voice/data channels (B channels), then applies for example quadrature phase shift keying (QPSK) modulation at a modulator (MOD) 34. Further, a transmission amplifier (TX·RF) 35 converts (up-converts) the signal to the frequency required for the radio transmission, amplifies the signal, and then inputs it from the cell station transmission end T11 to the hybrid section 10 (FIG. 5) which forms one of the characterizing features of the present invention.

On the other hand, viewing the reception system in each cell station (CS) 4, the receiving amplifier (RX·RF) 36 first receives the signal obtained via the hybrid section 10, converts it (down-converts it) to the required frequency optimum for the processing in the cell station (CS), and amplifies it. A demodulator (DEM) 37 then reproduces it to the original digital voice/data signal.

As shown at the right end in FIG. 5, the transmitting and receiving antenna 7 has a space diversity (SD) configuration, and the components of the reception system (36 and 37) form two systems. For this reason, a space diversity (SD) selection unit 38 selects the reproduced demodulated data having the higher reception level from the pair of reception signals obtained from the pair of transmitting and receiving antennas 7. This selected demodulated data is supplied to the time division multiple access (TDMA) control unit 33. Further, the selection information showing which is higher in reception level is also notified to the microprocessor (MPU) 31.

Receiving the demodulated data, the time division multiplex access (TDMA) control unit 33 separates the demodulated data into the signal of the control channel (D channel) and the signals of the speech channels (B channels) containing the voice/data information. The adaptive differential pulse code modulation (ADPCM) coder and decoder (CODEC) 32 then converts the separated signal to 64 kbps data and then sends the same to the multiplexing/demultiplexing means (MUX/DMUX) 20.

Next, viewing the hybrid section 10 shown in FIG. 5, the power combiner 11 shown in FIG. 1 is realized as a multistage power combiner (in the figure, comprised of a plurality of hybrids (H1 to H6), for example, 3 dB directional combiners).

The combined transmission power from the final hybrid H5 or H6 is input to common transmitting amplifiers 41 (COMP·AMP1 and COMP·AMP2) comprising for example high power amplifiers. The time division duplex switch (TDD·SW) 13 shown in FIG. 1 is shown here as the time division duplex switches (TDD·SW) S5 and S6. The outputs of the common transmitting amplifiers 41 are input to the pair of transmitting and receiving antennas 7 (ANT1 and ANT2).

The space diversity switch (SD·SW) 14 shown in FIG. 1 determines whether to select the route on the antenna ANT1 side or to select the route on the antenna ANT2 side among the antennas 7. This space diversity switch (SD·SW) 14 is realized as the space diversity switches (SD·SW) S1 to S4 in FIG. 5. Whether the antenna ANTi side or the antenna ANT2 side is selected is determined by the switch routes in these space diversity switches (SD·SW) S1 to S4. Here, each switch route is determined based on the selection information (which antenna between the antennas ANT1 and ANT2 had a higher reception level) in the space diversity (SD) selection unit 38 in each cell station (CS1 and CS2).

When the antenna ANT1 system is selected, the transmission powers from the cell stations CS1 and CS2 are combined at the hybrid H1 by the switches S1 and S2, the transmission powers from the cell stations CS3 and CS4 are combined at the hybrid H2 by the switches S3 and S4, and further these combined powers are combined and output from the hybrid HS.

When the antenna ANT2 system is selected, the switches S1, S2, S3, and S4 are instructed by the space diversity (SD) selection unit 38 to set routes opposite to the above routes. The combined powers of the cell stations CS1 and CS2 and the cell stations CS3 and CS4 are cumulatively combined at the hybrids H3 and H6.

The above description was given for a transmission operation at the base transceiver station (BTS) 3. In the case of a reception operation, the time division duplex switches (TDD-SW) 13 (switches S5 and S6) are set so as to guide the signals received from the antennas ANT1 and ANT2 to low noise amplifiers 42 (LNA1, LNA2), respectively, The time division duplex switches (TDD-SW) 13 (S5, S6) are set in this way under a time division duplex (TDD) mode under the control of the time division multiple access (TDMA) control unit 33 (refer to FIG. 6 mentioned later).

The signals received from the low noise amplifiers 42 (LNA1 and LNA2) are distributed to the cell stations (CS1 to CS4) via the power distributor 12 shown in FIG. 1. The signal received from the antenna ANT1 is distributed to the cell stations CS1 to CS4 via the hybrids H11, H7, and H9 among the plurality of hybrids (H7 to H12) constituting the power distributor 12, while the signals received from the antenna ANT2 are distributed to the cell stations CS1 to CS4 via the hybrids H12, H8, and H10.

The thus distributed reception signals are input to a pair of receiving amplifiers (RX·RF) 36 in each cell station (CS1 to CS4) shown in FIG. 4.

Figure 6:
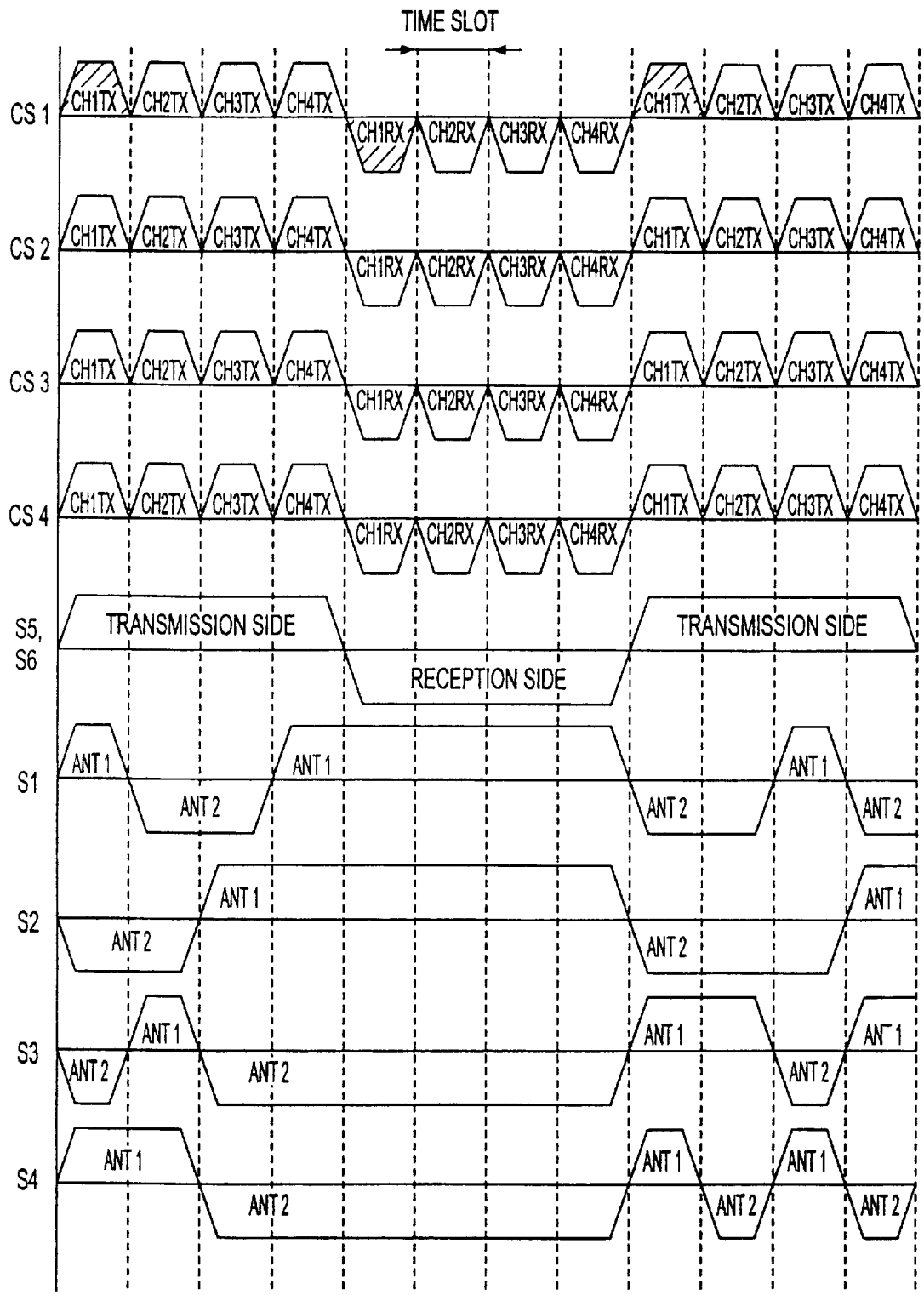
FIG. 6 is a timing chart of signals of the different parts in FIG. 4 and FIG. 5.

FIG. 6 is a timing chart of the signals at various parts in FIG. 4 and FIG. 5. The columns indicated as "CS1" to "CS4" at the left end of chart show the channel assignment for making the cell stations (CS1 to CS4) perform a time division multiple access (TDMA) operation and, at the same time, show the way the time division duplex (TDD) operation is performed.

Further, the columns indicated as "S5" and "S6" show the way the time division duplex switches (TDD-SW) S5 and S6 shown in FIG. 5 define the timing of the time division duplex (TDD) operation and the way the so-called "ping-pong transmission" is executed.

Furthermore, the columns indicated as "S1" to "S4" show an example of the way the space diversity (SD) operation is performed and the way that the antenna system having a good reception sensitivity is always selected.

Referring to the columns of CS1 to CS4 of FIG. 6 again, the first time slot among the four time slots at the transmission (TX) timing is assigned to the cell station CS1 as the first channel CH1 (CH1TX). The second, third, and fourth time slots among the remaining three time slots at the transmission (TX) timing are assigned to the other cell stations CS2, CS3, and CS4 as the second, third, and fourth channels CH2TX, CH3TX, and CH4TX, respectively.

On the other hand, the first time slot among the four time slots at the reception (RX) timing is assigned to the cell station CS1 as the first channel CH1 (CH1RX) and, similarly, the second, third, and fourth channels CH2RX, CH3RX, and CH4RX are assigned to the other cell stations CS2 to CS4.

To realize such a channel assignment, the cell stations CS1 to CS4 must be completely synchronized with each other. This synchronization is carried out for the cell stations CS1 to CS4 by the master cell station (CS1) 4 as a representative of the same. Namely, the three slave cell stations (CS2 to CS4) 4 nare in dependent synchronization with the master cell station (CS1) 4 by the inter-cell station communication shown in FIG. 4.

By doing this, it is sufficient to assign the radio channels for control of the cell stations CS1 to CS4 in the radio zone 6 (FIG. 67) between the transmitting and receiving antenna 7 and the subscriber units 2 to just the master cell station CS1 as a representative case. The space utilization efficiency becomes extremely good. In FIG. 6, the channel (CH1TX, CH1RX) shown with hatching in the column of "CS1" is a channel which the cell station CS1 uses the control channel (D channel) common to the cell stations CS1 to CS4 representatively. The channels other than the channels shown with hatching are the speech channels (B channels).

Figure 7:
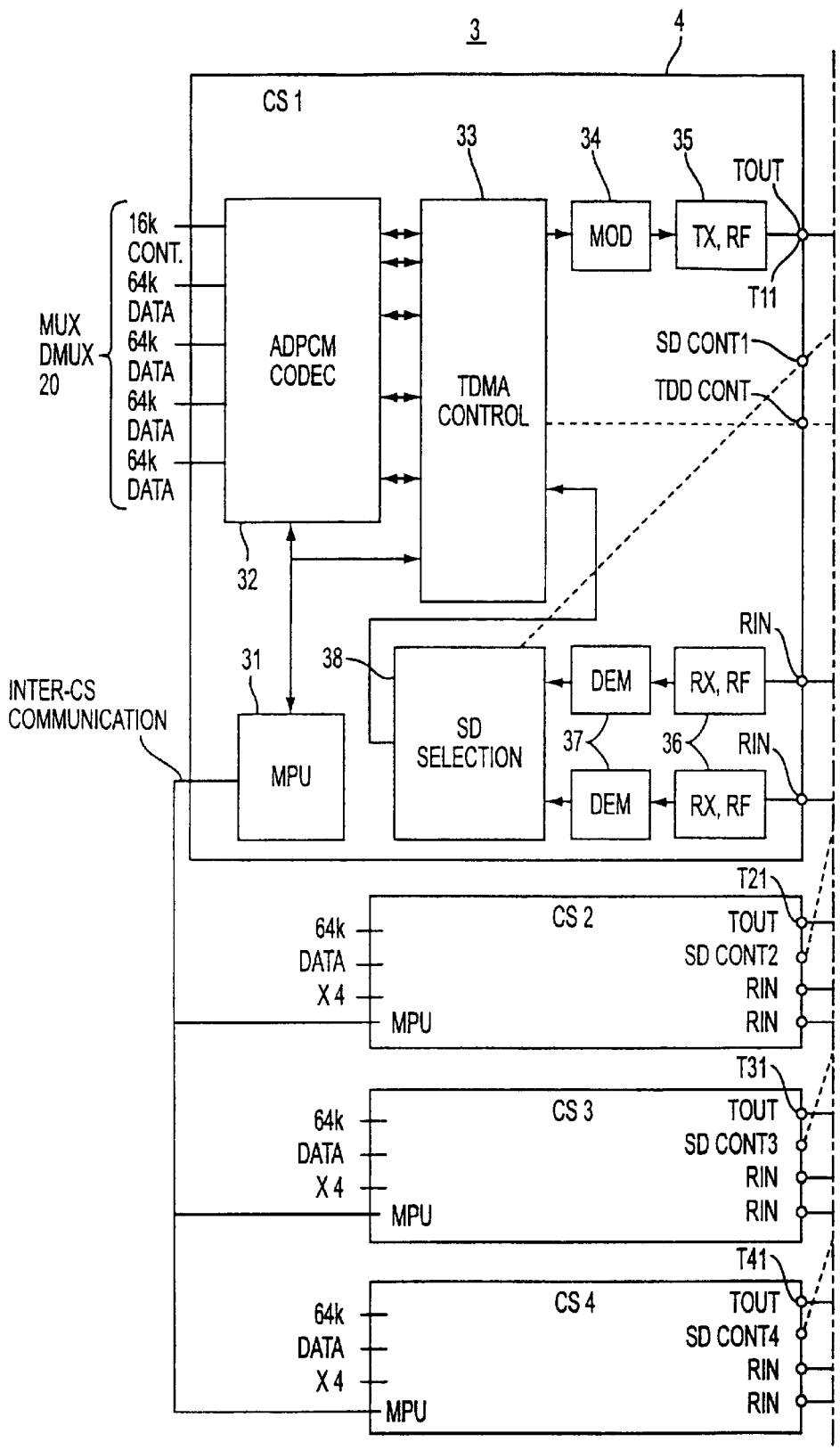
FIG. 7 is a view of a first part of a first modification of the first embodiment shown in FIG. 4 and FIG. 5.
Figure 8:
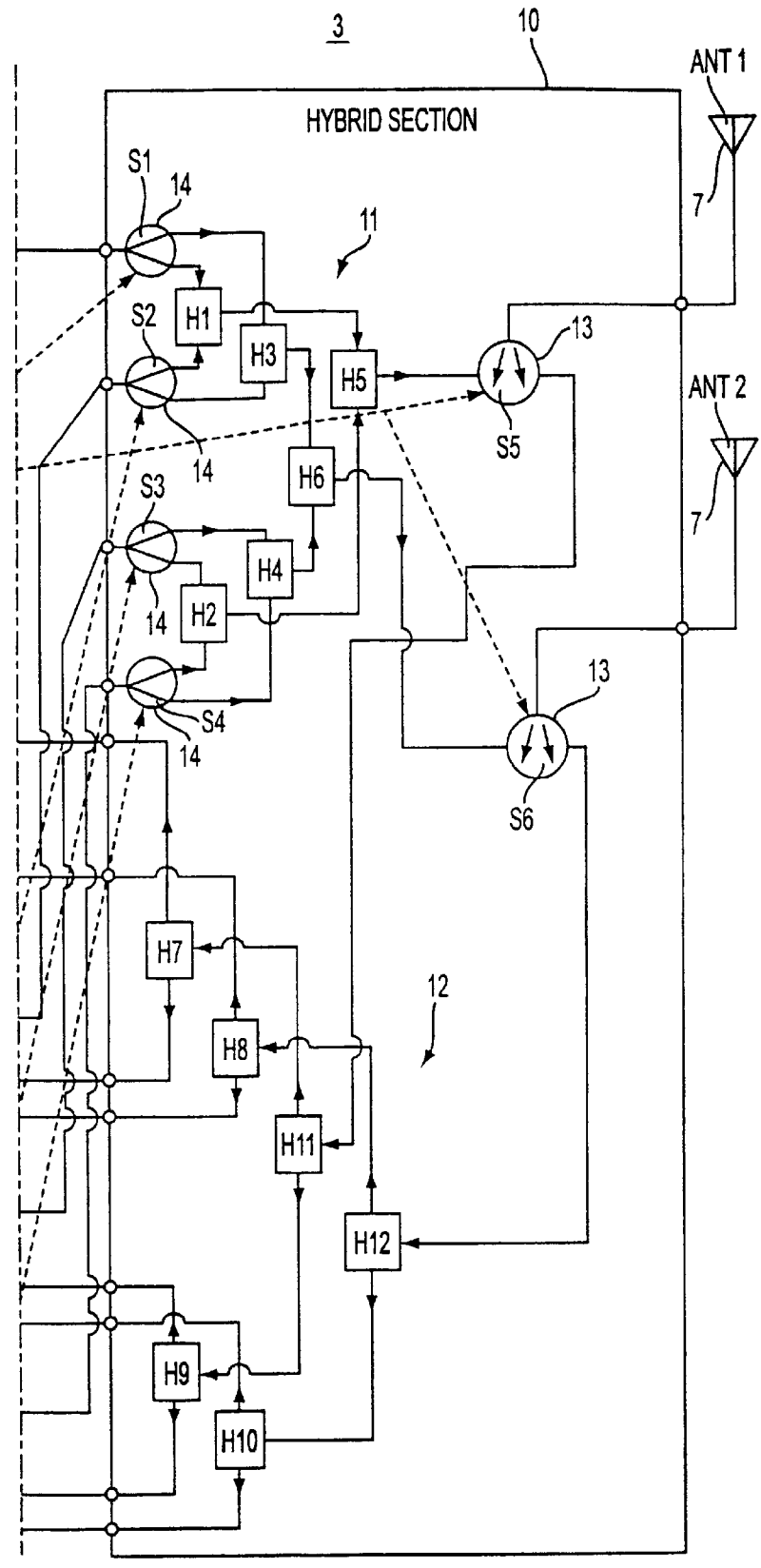
FIG. 8 is a view of a second part of the first modification of the first embodiment shown in FIG. 4 and FIG. 5.

FIGS. 7 and 8 are views of parts of a first modification of the first embodiment shown in FIG. 4 and FIG. 5.

The configurations shown in FIG. 7 and FIG. 8 correspond to the configurations obtained by deleting the common transmitting amplifiers (COM·AMP1 and COM·AMP2) 41 and further deleting the low noise amplifiers (LNA1 and LNA2) 42 from the components shown in FIG. 4 and FIG. 5.

As a result, the configurations of FIG. 7 and FIG. 8 enable a reduction in the hardware costs in comparison with the first embodiment shown in FIG. 4 and FIG. 5. This first modification is preferred when the radio zone 6 between the subscribers SUB and the base transceiver station (BTS) 3 is short and it is not necessary to make the service area (propagation distance) that much larger.

Figure 9:
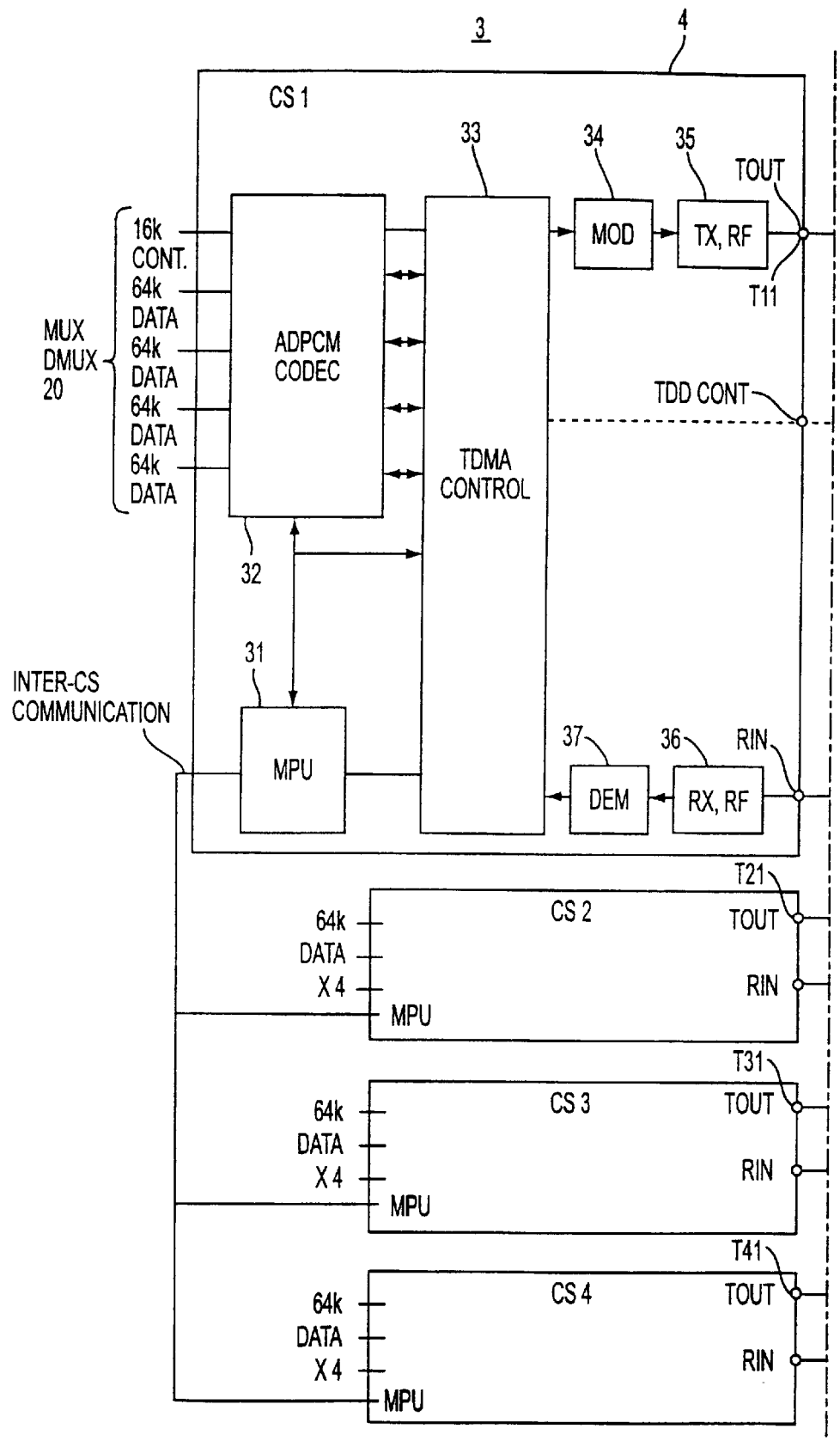
FIG. 9 is a view of a first part of a second modification of the first embodiment shown in FIG. 4 and FIG. 5.
Figure 10:
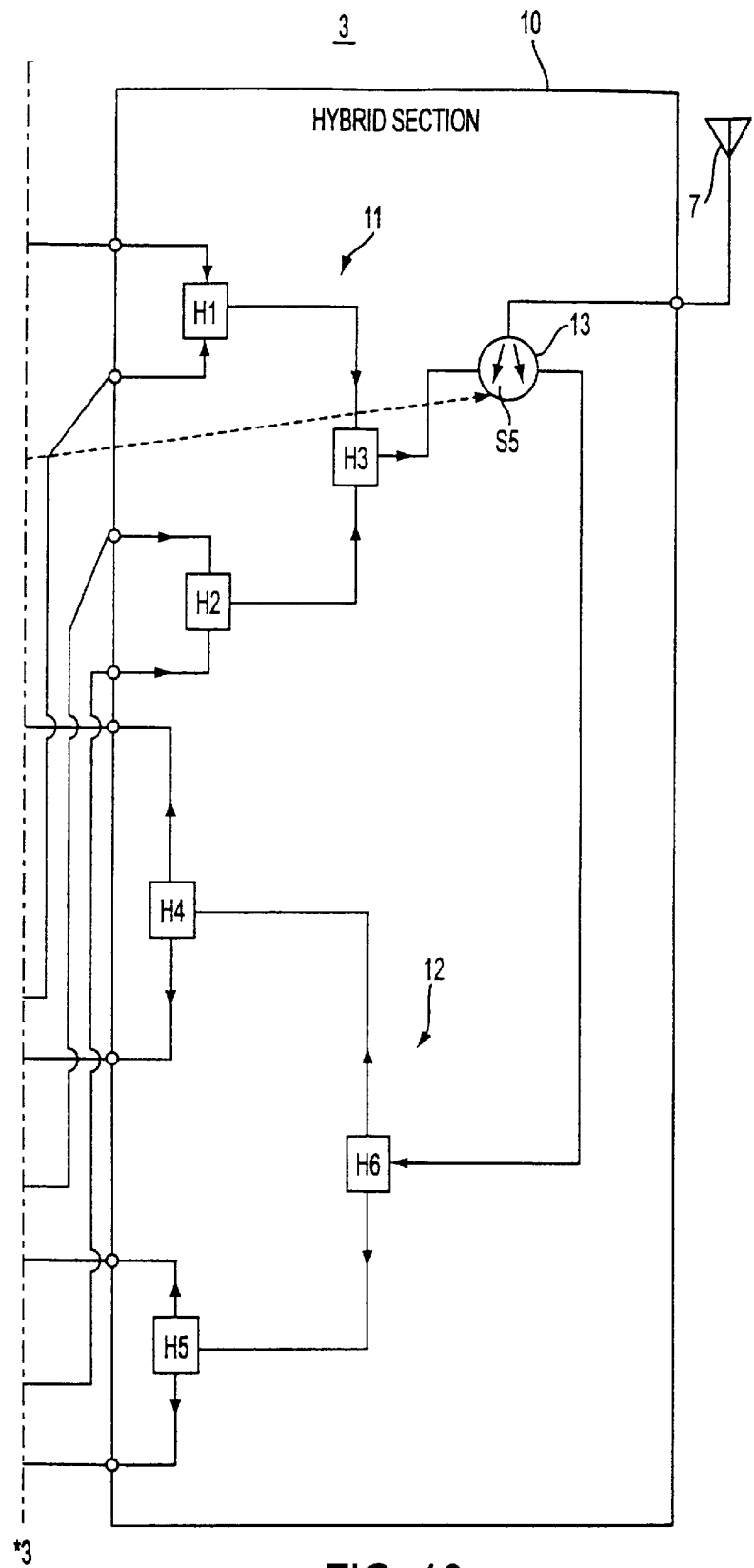
FIG. 10 is a view of a second part of the second modification of the first embodiment shown in FIG. 4 and FIG. 5.

FIGS. 9 and 10 are views of parts of a second modification of the first embodiment shown in FIG. 4 and FIG. 5.

The configurations shown in FIG. 9 and FIG. 10 correspond to the configurations obtained by deleting the space diversity (SD) function from the components shown in FIG. 4 and FIG. 5. Therefore the space diversity switch (SD·SW) 14 is eliminated. Accordingly, the number of the transmitting and receiving antennas 7 is reduced from two (ANT1 and ANT2) to one.

As a result, the hardware cost can be reduced in comparison with the first embodiment. This second modification is preferably applied in an area where the propagation space (radio zone) 6 between the subscribers SUB and the base transceiver station (BTS) 3 is within sight and so-called "multipath fading" seldom occurs. Further, in an area featuring such conditions, the common transmitting amplifiers 41 and the low noise amplifiers 42 can also be deleted as in the first modification in many cases and so a further reduction of the hardware costs is possible.

In short, the base transceiver station (BTS) 3 of the second modification is constituted by (1) a plurality of cell stations (CS) 4 accommodating the subscriber units 2 each comprising a plurality of PHS terminals and (2) a hybrid section 10 comprising a multistage power combiner 11 which is arranged between these cell stations (CS) and a single transmitting and receiving antenna 7 and which combines the transmitting powers from these cell stations (CS) and feeds the result to the transmitting and receiving antenna 7, a multistage power distributor 12 for distributing the reception power received from the transmitting and receiving antenna 7 to these cell stations (CS), and the time division duplex switch (TDD·SW) 13 (only S6) for alternately switching this transmitting and receiving antenna 7 to the transmission use and reception use under the time division duplex (TDD) mode.

Here, the first embodiment shown in FIG. 4 and FIG. 5 will be referred to again. In the case of the hybrid section 10 (FIG. 5) for combining the transmitting powers from four cell stations (CS1 to CS4) as shown in FIG. 4, when a circuit configuration considering the space diversity (SD) operation is adopted, two hybrids (H) constituting the power combiner 11 are necessary along the flow of the signals (for example, H1→H5 or H3→H6). Accordingly, even if there is no dead loss, a loss of 6 dB is generated.

On the other hand, in the case of a single mode operation not considering the space diversity (SD) operation (refer to FIG. 9 and FIG. 10), two hybrids (H) are necessary along the flow of the signals, so even if there is no dead loss, a loss of 6 dB is generated.

The function of the power combiner (hybrid) 11 is for combining two transmission input powers into one in the case of the transmission system (TX) as mentioned above and for dividing one reception input power into two in the case of the reception system (RX).

The above loss causes a reduction of the transmitting power emitted from the transmitting and receiving antenna 7 in the case of the transmission system, while leads to deterioration of the noise figure in the case of the reception system.

In order to solve these problems, in the first embodiment, a common transmitting amplifier 41 is inserted between the hybrid H5 and the antenna 7.

When the common transmitting amplifier 14 is inserted between the hybrid H5 and the antenna 7, however, the transmitting powers of the four cell stations (CS1 to CS4) will be commonly amplified by one amplifier 41, that is, four signals will be input to one amplifier 41, and there easily arises a problem of intermodulation distortion due to the nonlinearity of the amplifiers. Therefore, even in a case where a plurality of signals are input, it becomes necessary to suppress the level of the intermodulation distortion to the predetermined level or less and a so-called big back-off must be taken. As a result, it becomes necessary to use an amplifier 41 having a large saturation power. Note that, the "back-off" referred to here is the level difference between the output saturation level and the level at the operation point. However, when such a large saturation power is obtained, a problem of an increase of the power consumption is caused.

Furthermore, there arises another problem of an increase of cost and an enlargement of the size of the apparatus, for example, the heat radiation structure becomes large and the required power source becomes large.

In the second embodiment mentioned later, in consideration with the above problems, attention is paid to the fact that synchronization is established in the transmitting and receiving time slots among the four cell stations (refer to FIG. 6). By introducing a bias changing means (51) for adjusting the bias of the common transmitting amplifier 41, a reduction of the power consumption is enabled.

Figure 11:
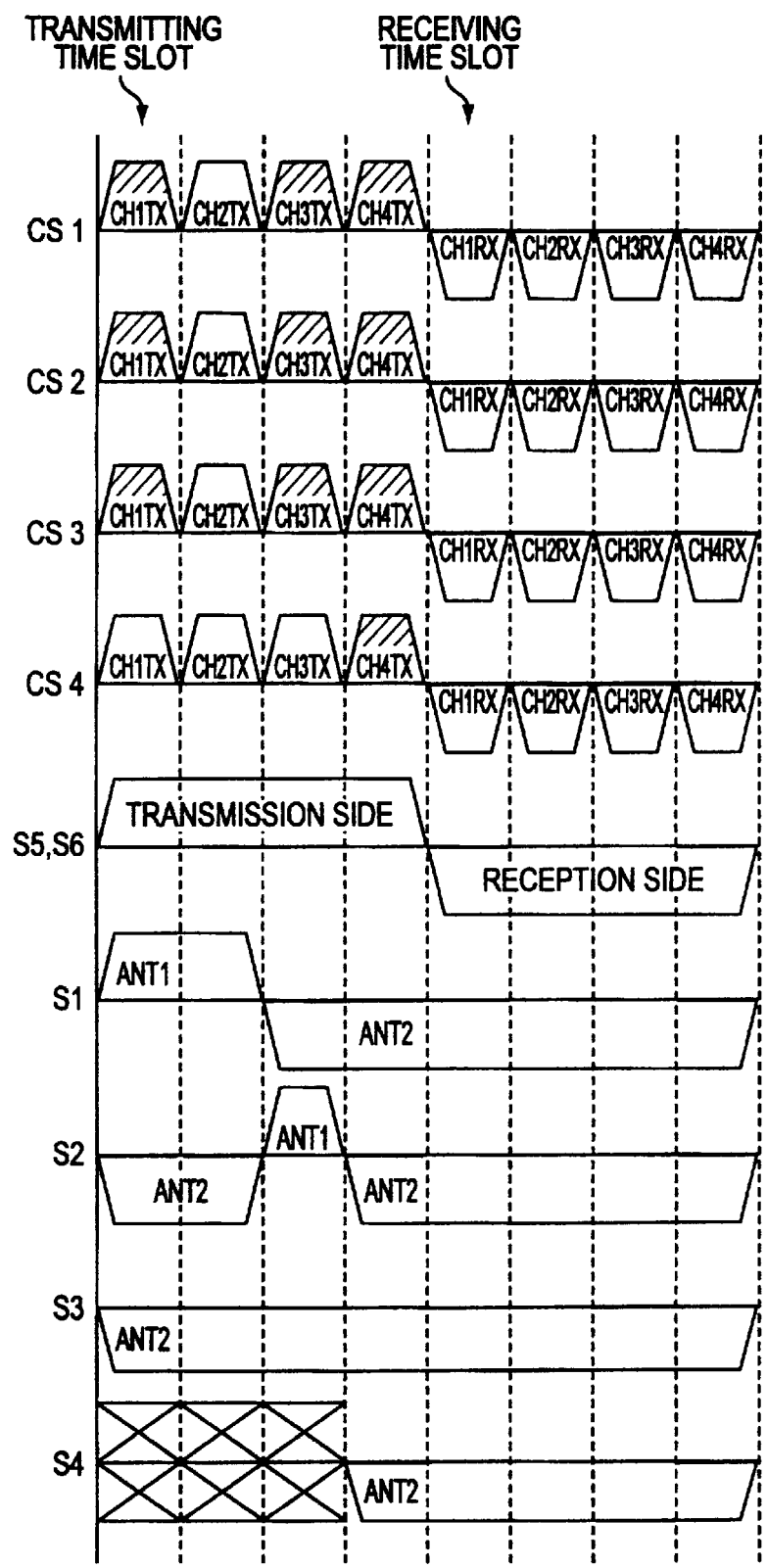
FIG. 11 is a timing chart of signals of various parts in a second embodiment.

FIG. 11 is a timing chart of signals at the parts in the second embodiment. Note that the present figure corresponds to FIG. 6. For the switching pattern of the space diversity switches (SD·SW) S1 to S4 of FIG. 11, however, an example different from that of FIG. 6 is shown.

In the transmitting time slots (four time slots) in FIG. 11, the channel (CH) of each time slot shown by the hatching indicates the in-use channel, that is, a channel now transmitting significant information. This, however, is only one example. Note that CH1TX and CH1RX of the master cell station (CS1) show the control channels (D-channels) common to all cell stations (CS1 to CS4) at the transmission and reception. The channels other than this are all speech channels (B-channels). This was explained referring to FIG. 6.

Further, in the column of the space diversity switch (SD·SW) S4 of FIG. 11, the mark x of the first to third time slots shows that the switching state of the space diversity switch (SD·SW) S4 immediately before this is held during the first to third time slots.

Figure 12:
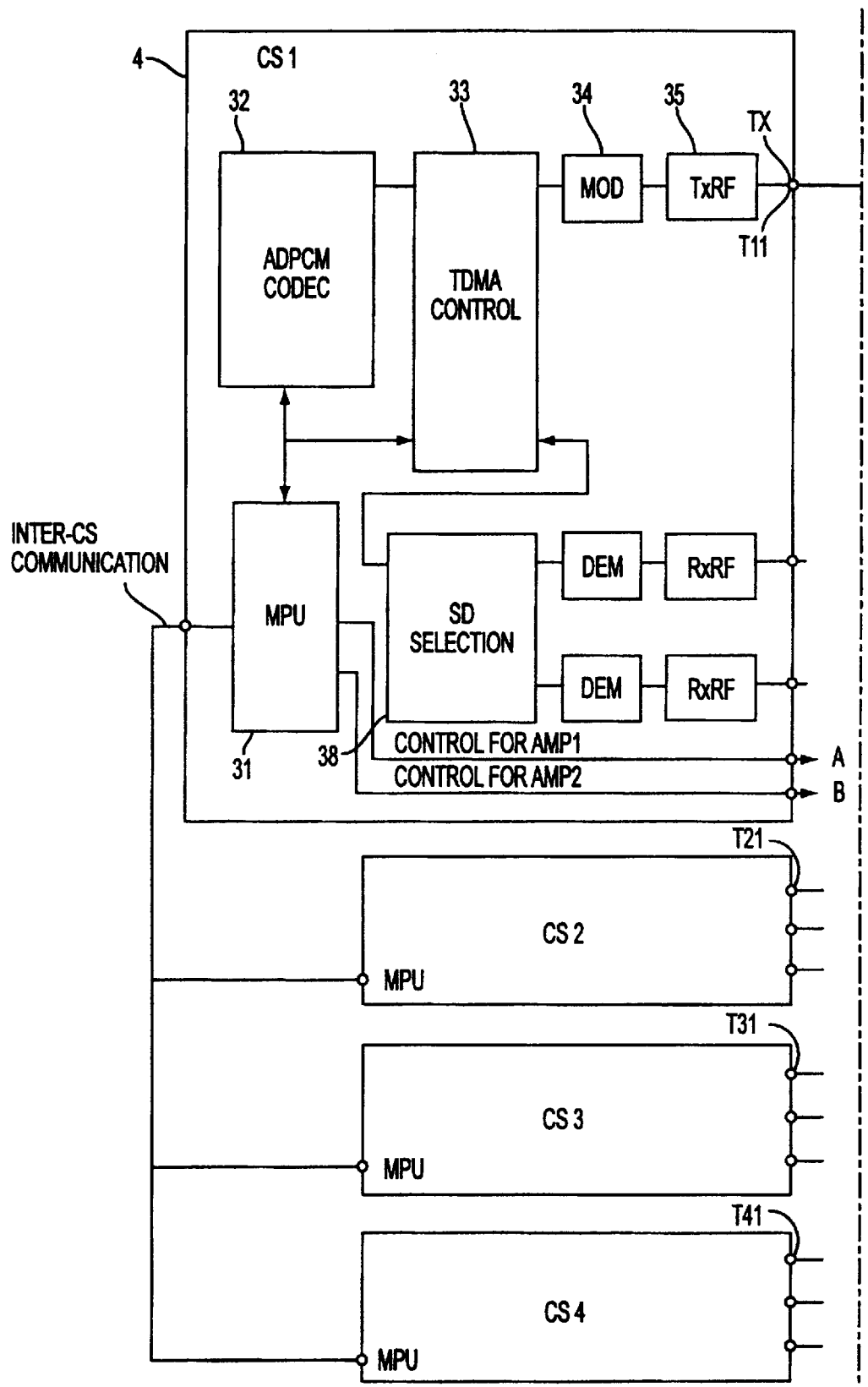
FIG. 12 is a view of a first part of the second embodiment according to the present invention.
Figure 13:
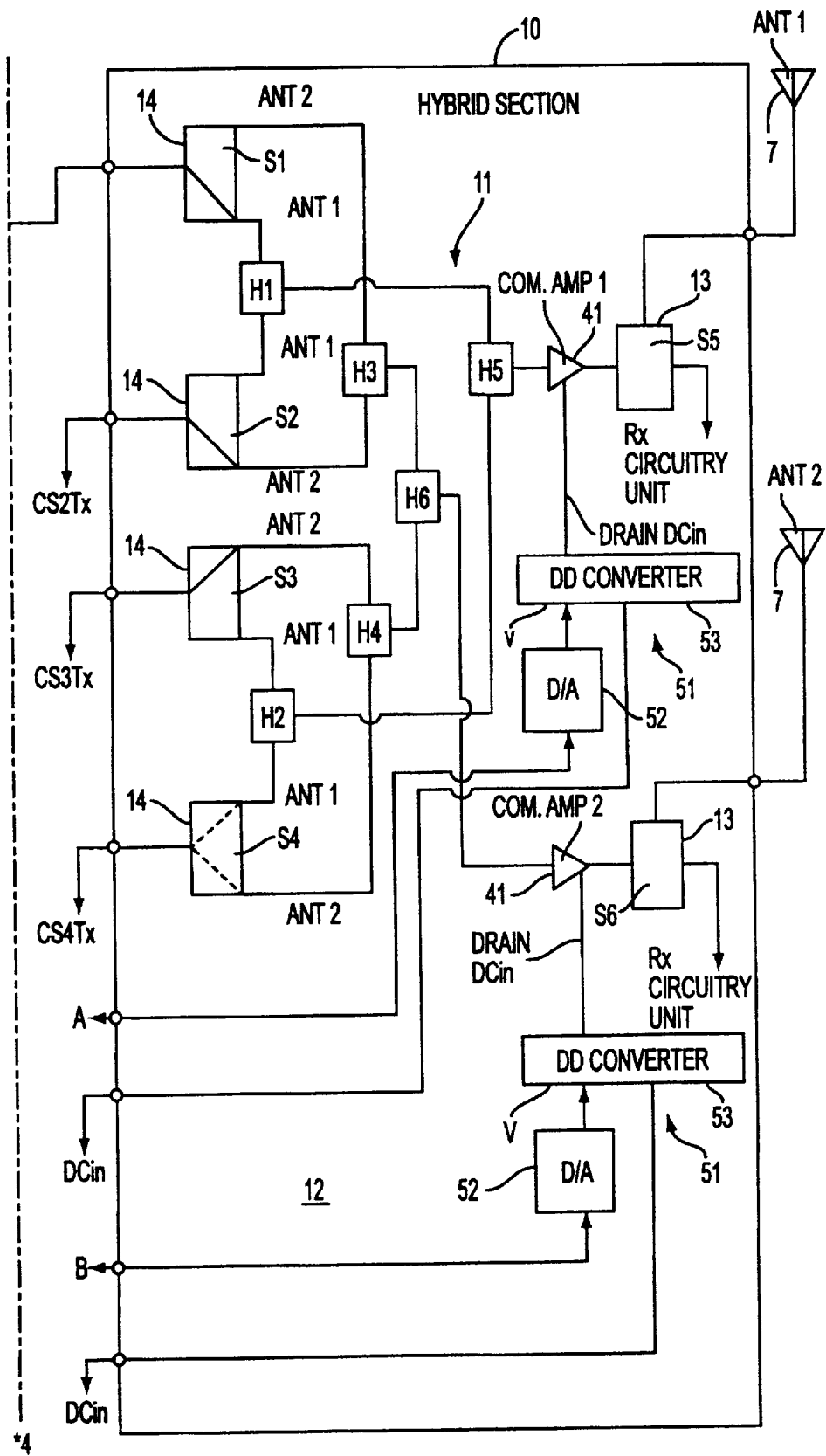
FIG. 13 is a view of a second part of the second embodiment according to the present invention.

FIG. 12 and FIG. 13 are views of parts of a second embodiment according to the present invention. Note that the basic configuration of FIG. 12 and FIG. 13 is exactly the same as that of FIG. 4 and FIG. 5, but for easier understanding of the bias changing means 51, the method of expression of the figures has been changed. Further, the power distributor 12 is omitted. Further, in this example, the operation direction of the space diversity switch (SD·SW) 14 at the time of the first time slot of the transmission time slots of FIG. 11 is represented.

The concept of the second embodiment can be applied to not only the common transmitting amplifier 41, but also the common receiving amplifier (same as low noise amplifier LNA of FIG. 5), but the following explanation is made taking as an example the former amplifier 41. Control signals (A and B in the diagram) from the microprocessor (MPU) 31, which centrally manages the receiving time slot information of the cell stations CS1 to CS4 (what time slot is used by each cell station and further which antenna 7 between ANT1 and ANT2 is used by each cell station) pass through one of the D/A converters 52 and are input to an output voltage variable terminal V of the corresponding DC/DC converter (DC converter) 53. A variable drain voltage is supplied to one of the common transmitting amplifiers (COM·AMP1 or COM·AMP2) 41 (comprised by an FET).

Figure 14:
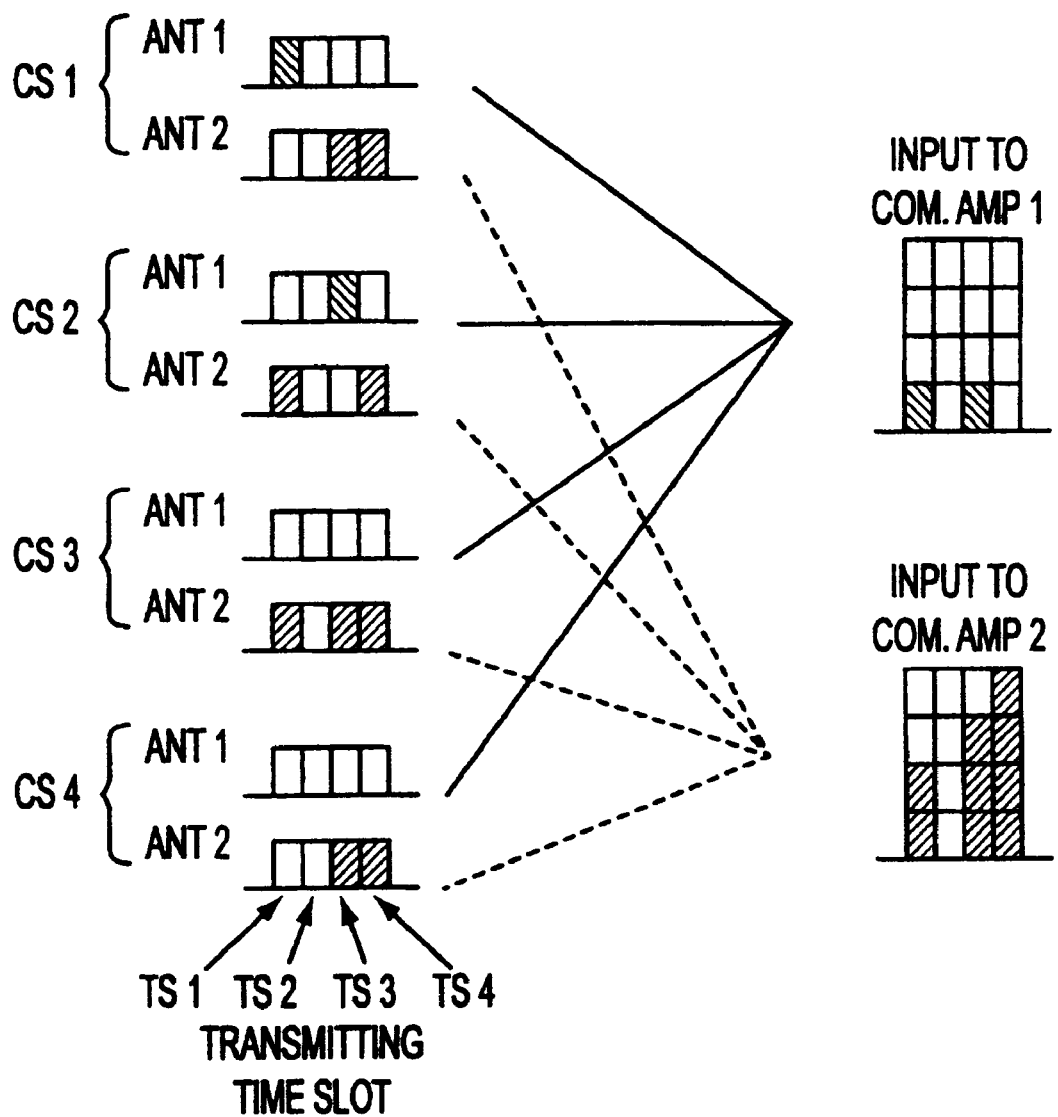
FIG. 14 is a view of an example of the number of user subscribers in each cell station for every transmitting time slot.

FIG. 14 is a view of an example of the number of the user subscribers in each cell station for every transmitting time slot. The left side of the figure statistically represents a situation in which the time slots (TS1 to TS4) are used by the subscribers (SUB) for the cell stations (CS1 to CS4) divided between the antenna ANT1 side and the antenna ANT2 side, while the right side of FIG. 14 statistically represents the situation in which the signals of the time slots (TS1 to TS4) are input to the common transmitting amplifiers (COM*AMP1 and COM·AMP2) 41 via the space diversity switch (SD·SW) 14 for switching the signals to the intended antenna.

It is seen from the example of this figure that the following transmission signals must be amplified at the common transmitting amplifiers (COM·AMP1 and COM·AMP2) 41:

| T1 of COM*AMP1: for 1 person, | T1 of COM*AMP2: for 2 persons, |
|---|---|
| T2: for 0 person, | T2: for 0 person, |
| T3: for 1 person, | T3: for 3 persons, |
| T4: for 0 person, | T4: for 4 persons. |

Figure 15:
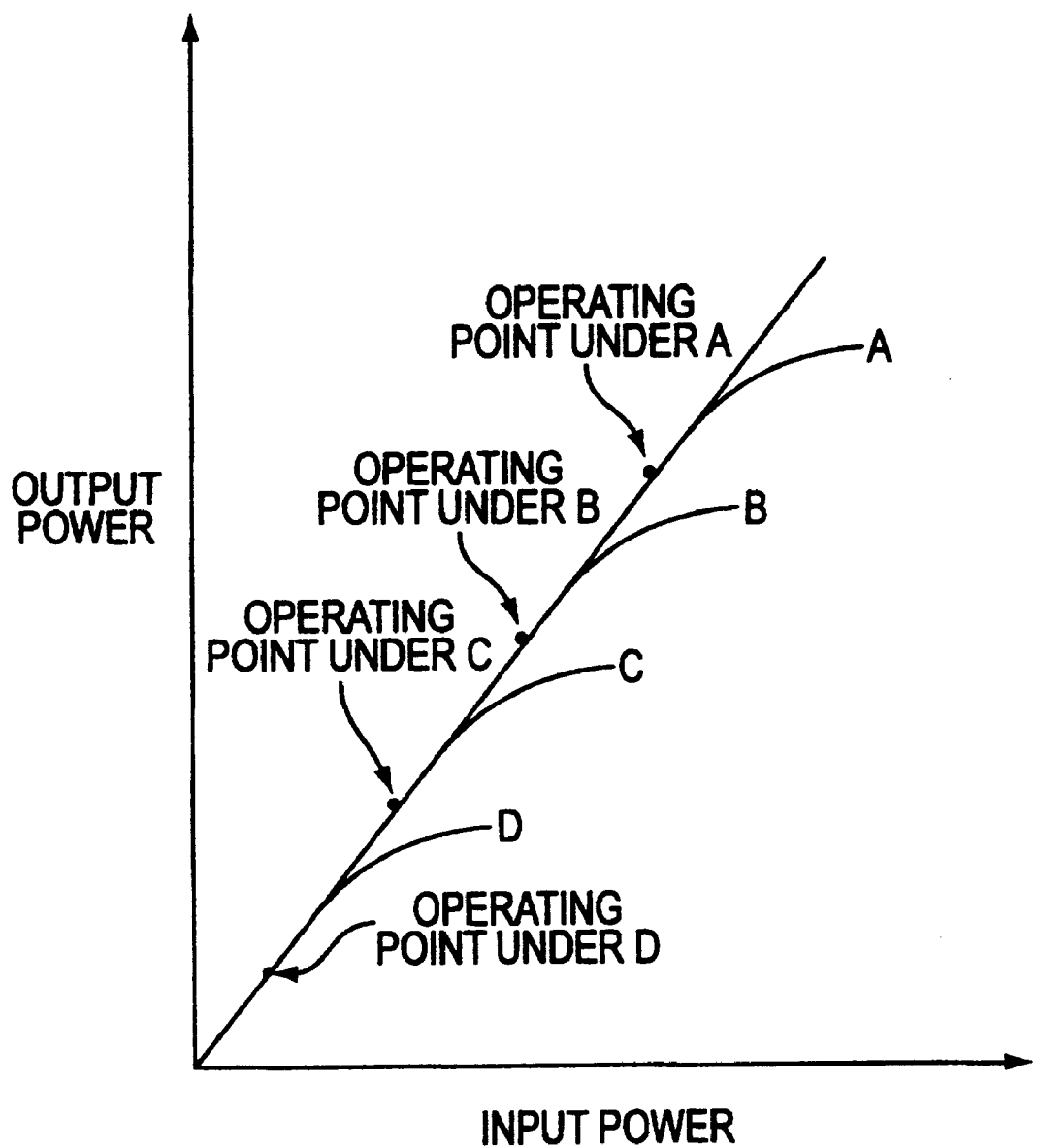
FIG. 15 is a view of an input power versus output power characteristic of a common transmitting amplifier (COM. AMP)

FIG. 15 is a view of a characteristic of input power versus output power of a common transmitting amplifier (COM·AMP). The drain voltage (refer to drain $DC_{in}$ of FIG. 13) is given so that the back-off becomes constant in accordance with the situation of use of the time slots (TS1 to TS4). But if the bias is finely adjusted with respect to the FET (common transmitting amplifier), five different types of biases will be given to the drain of the FET. That is, in addition to the four modes A, B, C, and D of FIG. 15, for the time slots not utilized by the cell stations CS1 to CS4, the drain voltage is made 0 V and only the gate voltage is given (mode E).

FIG. 16 is a view of the drain voltage in the four modes A to D in FIG. 15 in the case of the example of FIG. 14.

Figure 17:
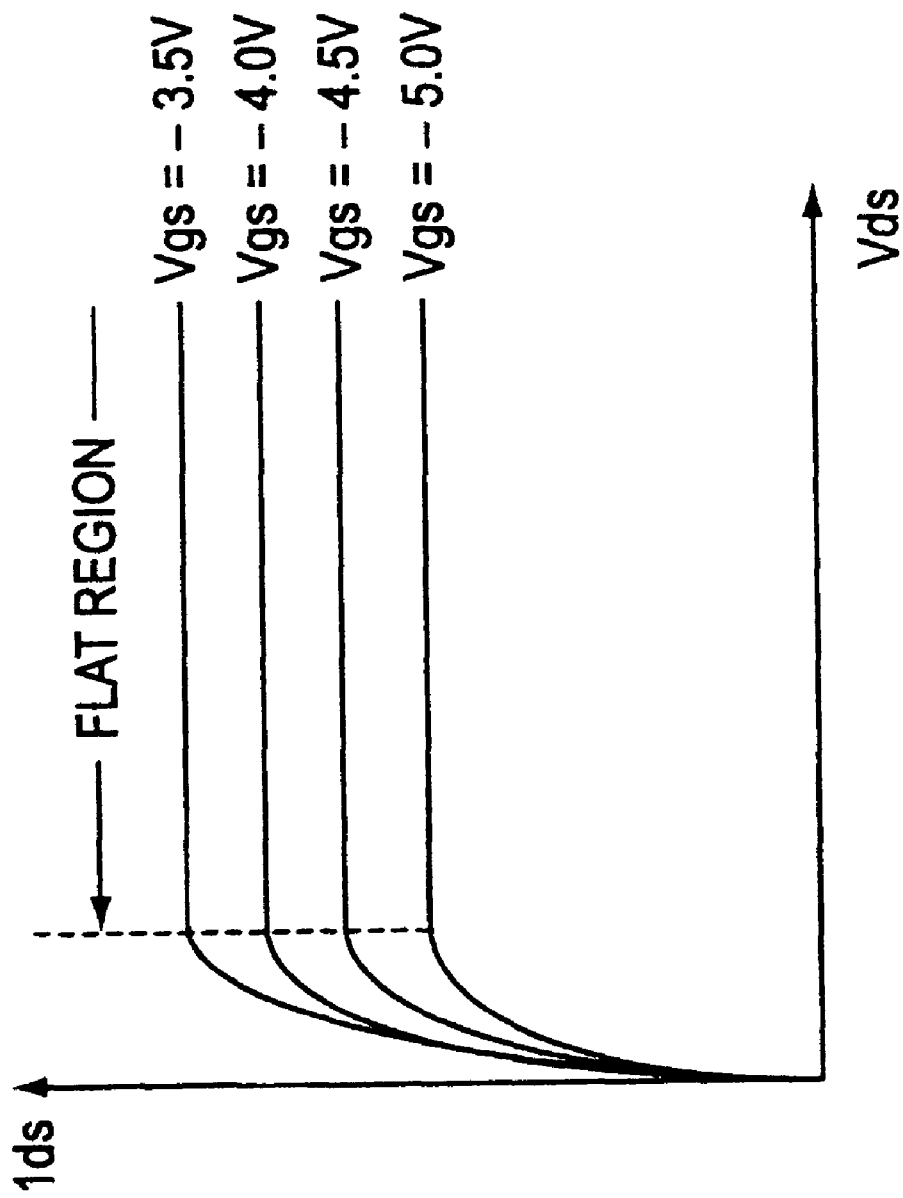
FIG. 17 is a view of a voltage (Vds) versus current (Ids) characteristic of a field effect transistor (FET)

FIG. 17 is a view of a voltage ($V_{ds}$) versus current ($I_{ds}$) characteristic of the FET. As shown in the figure, when the drain voltage of the FET is changed, the gain in the region where the static characteristic is flat does not change much at all and only the saturation power changes. Accordingly, it is possible to achieve a reduction of the power consumption by using this flat region.

In short, summarizing the second embodiment, the base transceiver station (BTS) 3 according to the second embodiment operates under a time division multiple access (TOMA) mode in which a plurality of cell stations 4 occupy channels individually assigned for every time slot and, at the same time, provides a common transmitting amplifier 41 disposed on the output side of the multistage power combiner 11 common to these plurality of cell stations and a common receiving amplifier 42 provided on input side of the multistage power distributor 12 common to these plurality of cell stations. Here, the base transceiver station (BTS) 3 further includes a bias changing means 51 giving a bias of a level in proportion to the number of the in-use channels (CS1 to CS4) for every time slot for the corresponding amplifier of the common transmitting amplifier 41.

Here, the first embodiment shown in FIG. 4 and FIG. 5 will be referred to again. The transmitting output from the transmitting and receiving antenna 7 in the base transceiver station (BTS) 3 in this first embodiment is desirably constant. This is because, in the case of radio communication, in order to avoid interference with another base transceiver station, the transmitting output must be held within a prescribed range. Namely, when the outputs from the plurality of (four) cell stations (CS1 to CS4) 4 are combined at the hybrid section 10 and transmitted as in the first embodiment, each output level from each cell station (CS) must independently become constant at the input end to the antenna 7.

The only control of the transmitting output performed under the multiple combining operation at the base transceiver station (BTS) 3 in the first embodiment (FIG. 4 and FIG. 5) is automatic control so that the transmission level at the output end of each cell station (CS), that is, at the output of the transmitting amplifier 35, becomes constant. Namely, the amplifier 35 merely executes automatic level control (ALC). As a result, no output level correction was performed after the combining after passing through the power combiner 11. Therefore, even if a change occurs in the passing loss after passing through the power combiner 11 due to aging, no compensation is performed with respect to that change, so there arises a problem that the transmission level is liable to deviate from the standard. The third embodiment can deal with this problem.

The point of this third embodiment resides in that, in a base transceiver station (BTS) 3 provided with a plurality of transmitting amplifiers 35 for every plurality of cell stations (CS) 4, the base transceiver station further includes a transmission gain changing means (61) for detecting the transmission power at the point nearest the input end of the transmitting and receiving antenna 7 and giving a transmission gain in proportion to the result of detection to each transmitting amplifier 35.

Figure 18:
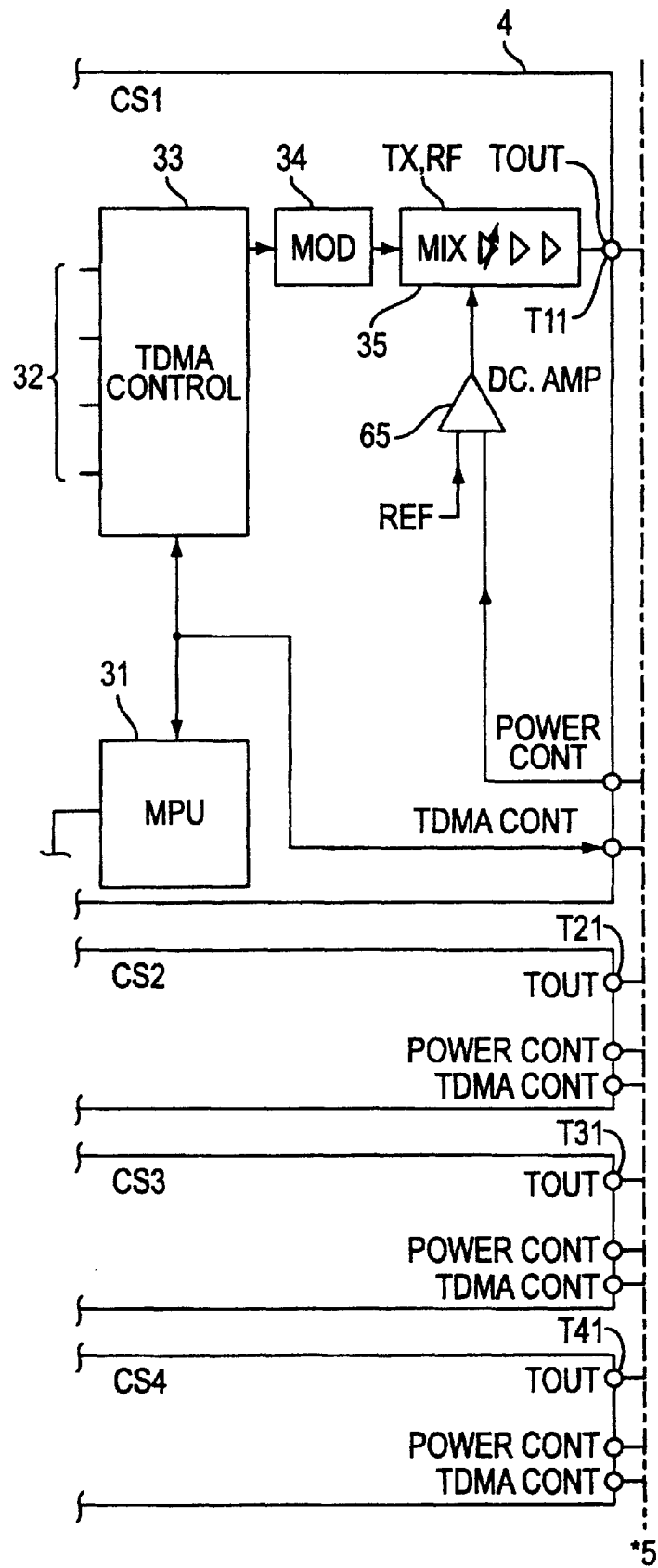
FIG. 18 is a view of a first part of a third embodiment according to the present invention.
Figure 19:
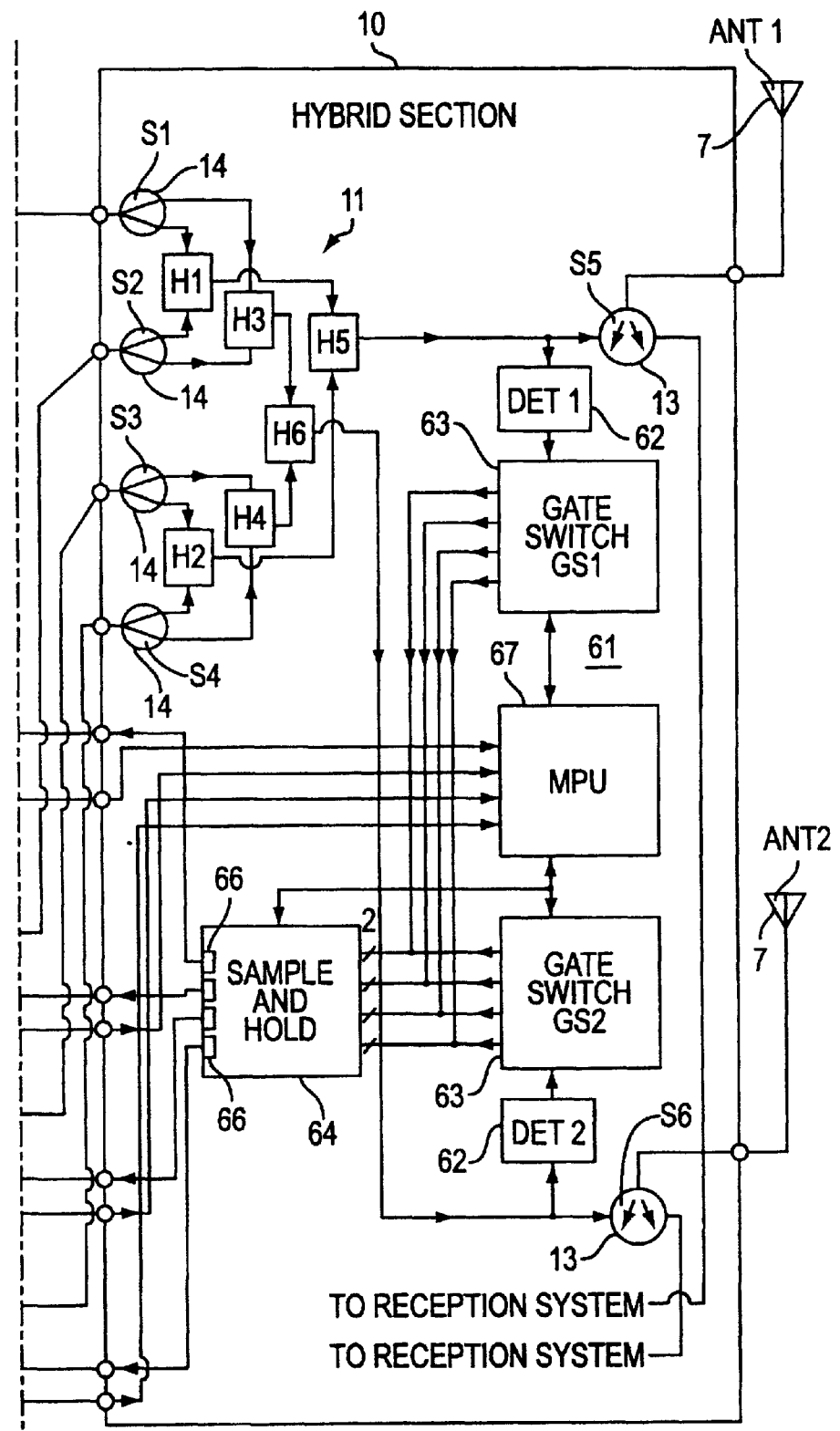
FIG. 19 is a view of a second part of the third embodiment according to the present invention.

FIG. 18 and FIG. 19 are views of parts of the third embodiment according to the present invention. In these figures, the characteristic feature of the present embodiment resides in the above transmission gain changing means 61. In order to realize this means 61, various procedures can be considered, but in the example of the figure, this means 61 is realized by the components 62 to 67. Reference numeral 62 shows transmitting output detectors (DET1, DET2), 63 shows gate switches (GS1, GS2), 64 shows a sample and hold circuit, 65 shows a gain control voltage output circuit, 66 shows a ½ switch, and 67 shows a microprocessor (MPU).

When the outputs from the plurality cell stations (CS1 to CS4) 4 are combined and transmitted from one transmitting and receiving antenna 7, a transmitting output detecting circuit 62 is provided at the point nearest the input end of that antenna 7. Then, based on the burst timing information from the TDMA·CONT terminal of each cell station (CS) 4, the microprocessor (MPU) 67 controls the gate switches 63 and the sample and hold circuit 64 and detects the transmitting output while establishing synchronization among the channels. The difference between the result of the detection and the reference voltage ref is found at the gain control voltage output circuit (DC·AMP) 65 and fed back to the transmitting amplifier 35 and the transmission gain is adjusted at each cell station to make the output at the input end of the antenna 7 constant.

Figure 20:
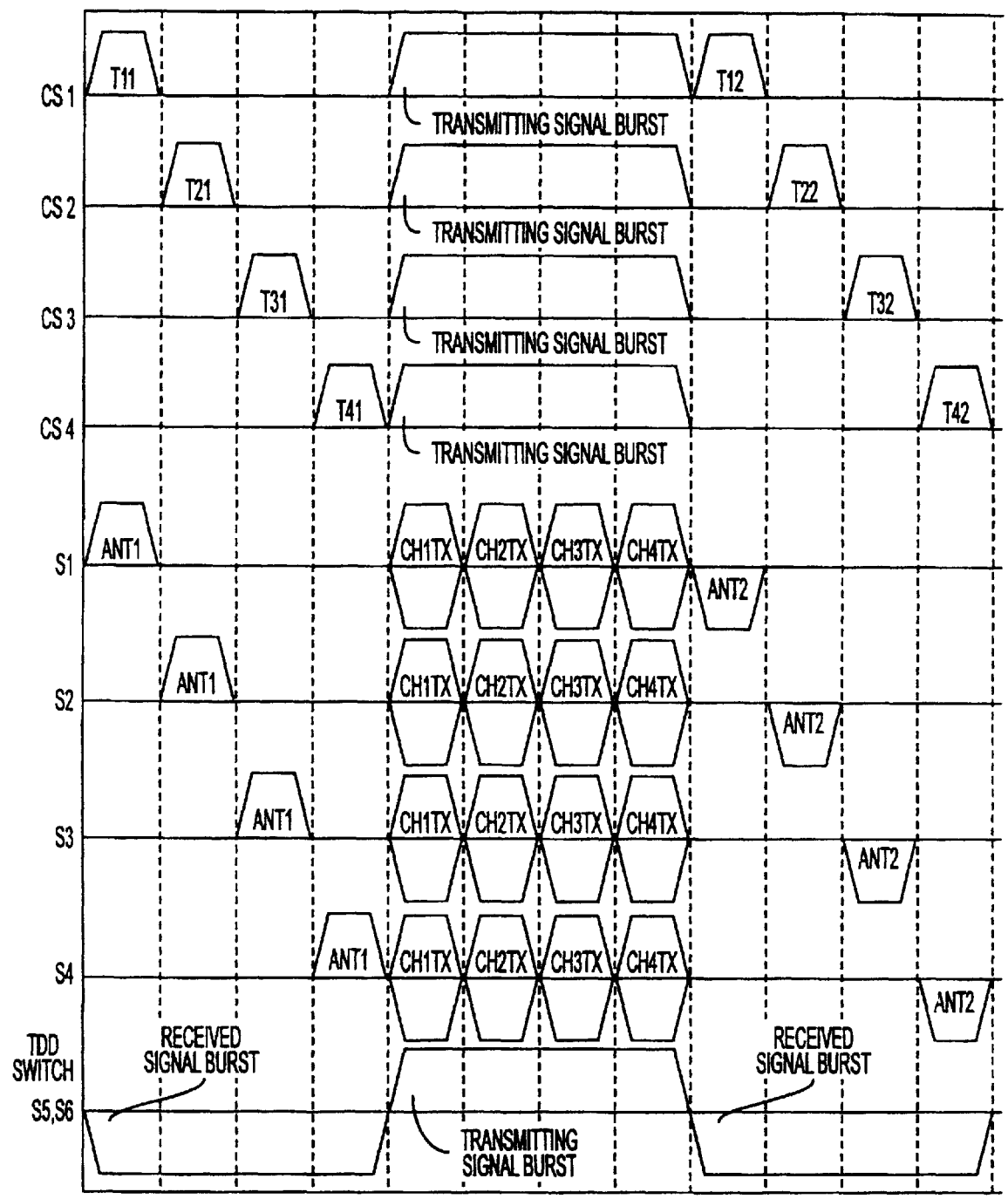
FIG. 20 is a timing chart of a measurement timing of a transmitting power.

FIG. 20 is a timing chart showing a measuring timing of the transmitting output. The third embodiment shown in FIG. 18 and FIG. 19 will be explained referring to this figure as well. Note that, FIG. 20 is to be viewed in the same way as FIG. 6 and FIG. 11.

The transmitting signal burst at each cell station (CS) is increased or reduced according to the call quantity. For this reason, the intended gain control cannot be performed only by detection at the point after is the combination (output of H5). Therefore, as shown in FIG. 20, at the time of a reception signal burst, the transmitting wave is transmitted while successively shifting the time slot by each burst from each cell station (CS) 4, and the output level at the output end (H5 or H6) of the power combiner 11 is measured at the combining end.

Referring also to FIG. 18 and FIG. 19, detecting circuits 62 (DET1 and DET2) and gate switches (GS1 and GS2) 63 are provided at output ends of the hybrids (H5 and H6) in the hybrid section 10. The detection output from each gate switch 63 is held in each cell station (CS) by the sample and hold circuit 64. The microprocessor (MPU) 67 controls the gate switches 63 and the sample and hold circuit 64 by the burst timing information from each cell station (CS) 4. That is, the transmitting outputs are successively sampled (detected) for every time slot and the detected power thereof is held in the sample and hold circuit 64 for each time slot, that is, corresponding to each cell station (CS), until the end of the subsequent transmitting signal burst timing.

In FIG. 20, the measuring burst T11 for measuring only the transmitting output from the cell station CS1 is output. At this time, the space diversity switch (SD·SW) (S1) 14 has been changed over to the ANT1 side of the antenna 7. Thus, a measurement-use transmitting wave is transmitted from the hybrid H5 of the power combiner 11. This transmitting wave is converted to a DC detection voltage at the detector 62 (DET1) and selected as the measuring burst from the cell station CS1 at the gate switch 63 (GS1). This DC detection voltage is held as a hold voltage at the sample and hold circuit 64 until the next measuring burst T12 is output. Note that, the above hold voltage is fed back to the cell station CS1, compared with the reference voltage (ref) in the gain control voltage output circuit 65 comprising the DC amplifier (DC·AMP), and controls the gain of the transmitting amplifier (TX·RF) 35. This control is carried out so that the prescribed output is obtained at the input end of the antenna 7. Note that, in the present figure, a mixer (MIX), the illustration of which was omitted in other figures, is indicated in the transmitting amplifier (TX·RF). This is a mixer for frequency conversion. The cell station CS sends the frequency (f1 to f4), different for the cell stations CS1 to CS4, at the next measuring burst (T12), to the ANT2 side of the space diversity switch (SD·SW) 14 (S1), thereby to obtain the measurement-use transmitting wave for the cell station CS1 from the hybrid H6 of the power combiner 14. Further, this transmitting wave is converted to a DC voltage at the transmitting output detector 62 (DET2) and selected as the measuring burst from the cell station CS1 at the gate switch 63 (GS2) in the same way as that mentioned above. The selected DC detection voltage of the ANT2 system for the cell station CS1 is held by the sample and hold circuit 64 until the next measuring burst (T13). After this, the space diversity switch (SD·SW) S1 is operated by alternately switching the space diversity switch (SD·SW) to the ANT1 side and ANT2 side for every burst. For this reason, the sample and hold circuit 64 is provided with a ½ switching unit 66 for switching the space diversity switch (SD·SW) S1 to the ANT1 side or the ANT2 side.

The cell stations CS2 to CS4 control the transmitting output in the same way as the cell station CS1.

An operation similar to the operation for the cell station CS1 is successively carried out in the order of the cell station CS1→cell station CS2→cell station CS3→cell station CS4. The fact that the supply of the transmitting output measuring bursts (T11 to T42) at the cell station CS1 to the cell station CS4 is performed at the reception frame is clear from FIG. 20. Further, at the time of the transmitting signal burst, the space diversity switch (SD·SW) (S1 to S4) 14 selects one of the ANT1 and ANT2 in accordance with the reception level detected at the reception system of each cell station (CS).

In short, according to this detailed example of the third embodiment, the base transceiver station (BTS) 3 operates under a time division multiple access (TDMA) mode in which a plurality of cell stations (CS) 4 occupy channels individually assigned for every time slot and the plurality of cell stations (CS) 4 operate while alternately repeating the cycles of the transmission frame and reception frame as a whole under a time division duplex (TDD) mode. Here, the transmission gain changing means 61 makes the transmitting amplifier 35 of each of the cell stations (CS1 to CS4) 4 sequentially output a constant transmitting output measurement-use burst for every time slot in each cycle of the reception frame, obtains the transmission gains according to the results of measurement detection for every transmitting amplifier 35, and gives the transmission gain to the transmitting amplifiers 35 until the end of the subsequent transmission frame cycle.

Referring again to the first embodiment shown in FIG. 4 and FIG. 5, the only control of the transmitting output performed after the multiple combining of the transmitting output at the base transceiver station (BTS) 3 in the first embodiment is automatic control so that the transmission level at the output end of each cell station (CS) becomes constant. As a result, as mentioned in the third embodiment as well, no output level correction was performed after the combining. Therefore, any change in the gain of the common transmitting amplifier 41 due to aging is not compensated for, so there arises a problem that the transmission level from the antenna 7 is liable to deviate from the standard level. The fourth embodiment can deal with this problem.

The point of this fourth embodiment resides in that, in the base transceiver station (BTS) 3 provided with a common transmitting amplifier 41 disposed common to a plurality of cell stations (CS) 4 on the output side of the multistage power combiner 11, the base transceiver station further includes a transmission gain adjusting means 71 for adjusting the transmission gain of the common transmitting amplifier 41 so that the transmitting output level at the input end of the transmitting and receiving antenna 7 is maintained at the predetermined constant value in a state where the input level at the input end of the common transmitting amplifier 41 becomes the same level for any of the plurality of the cell stations (CS) 4.

Figure 21:
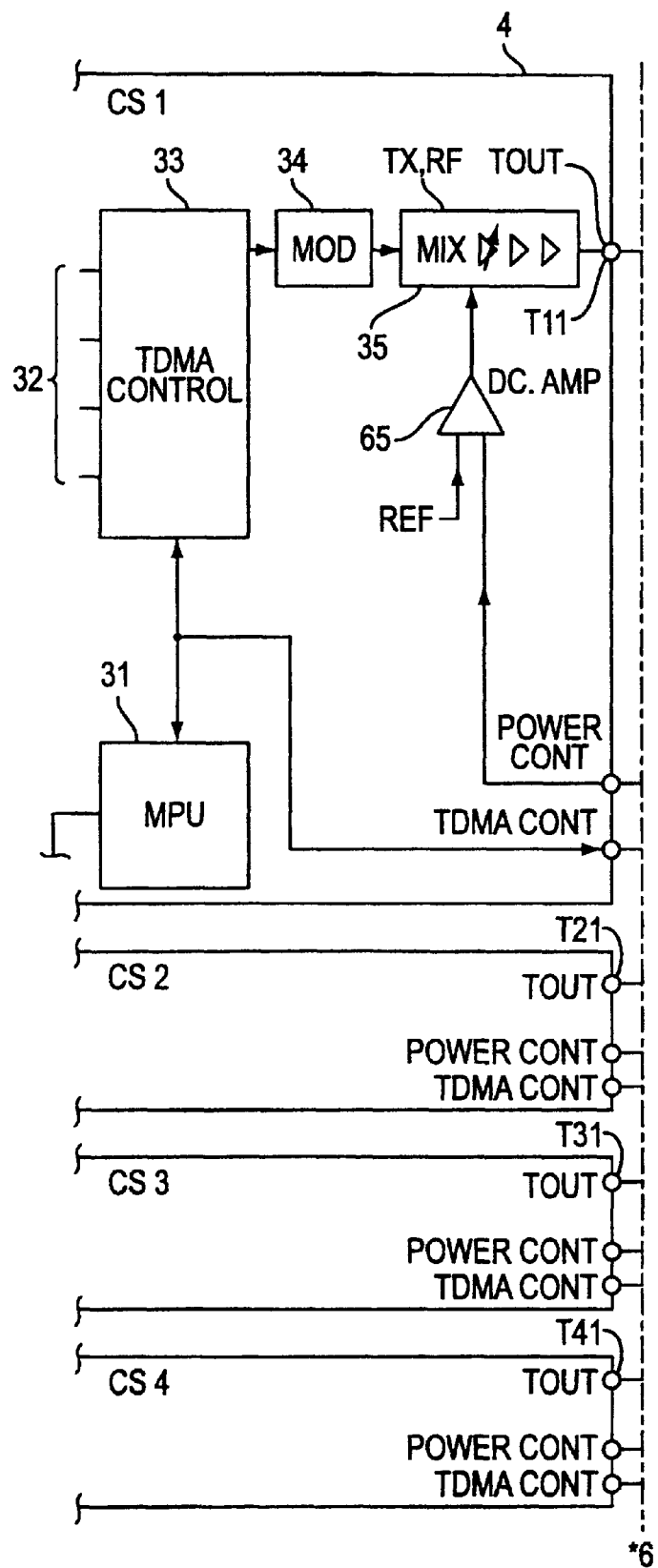
FIG. 21 is a view of a first part of a fourth embodiment according to the present invention.
Figure 22:
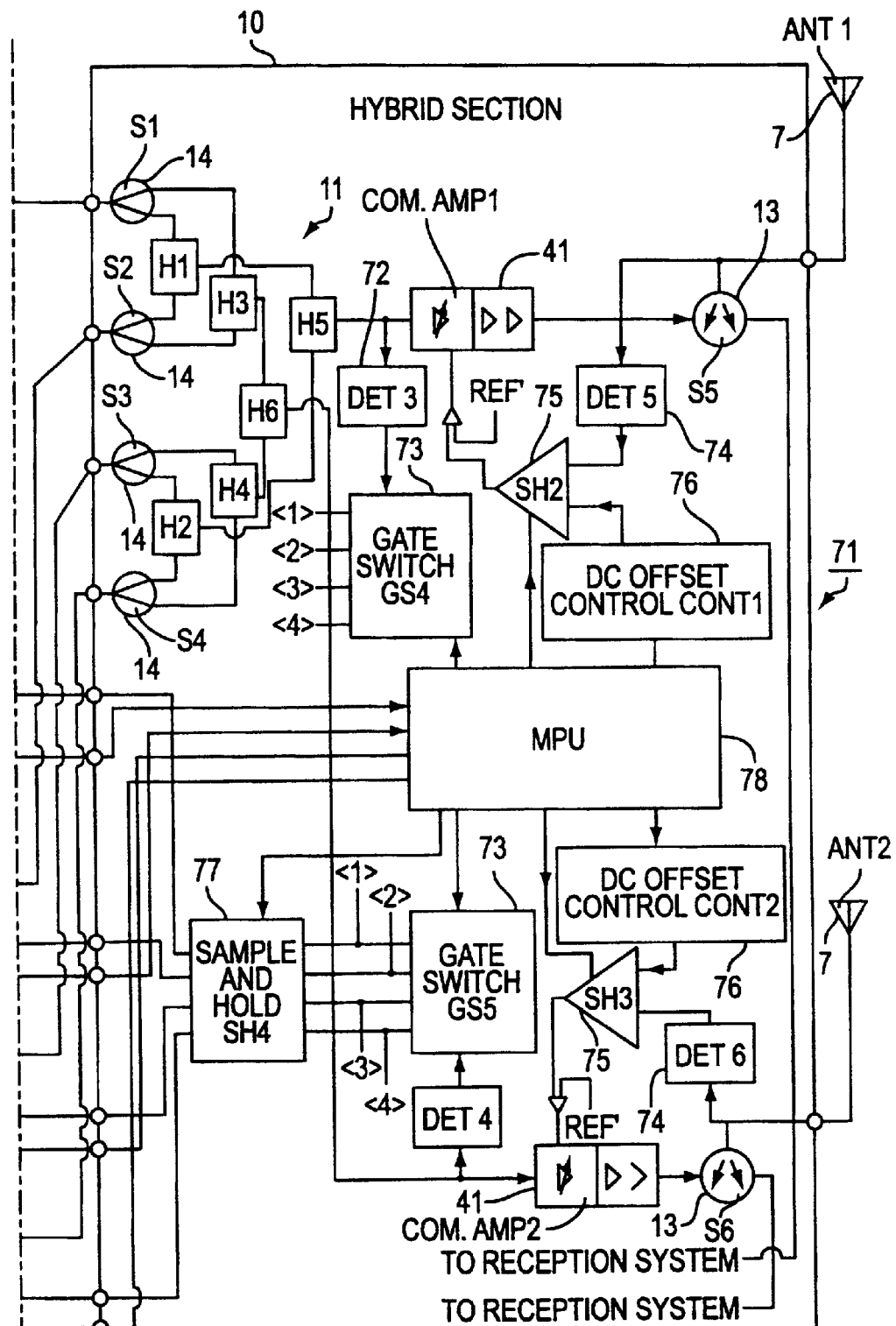
FIG. 22 is a view of a second part of the fourth embodiment according to the present invention.

FIG. 21 and FIG. 22 are views of parts of a fourth embodiment according to the present invention. In these figures, the characteristic feature of the present embodiment resides in the transmission gain adjusting means 71. Various techniques can be considered in order to realize this means 71, but in the example of these figures, this means 71 is realized by the components 72 to 78. Reference numeral 72 shows input side transmission output detectors (DET3 and DET4), 73 shows gate switches (GS4 and GS5), 74 shows output side transmission output detectors (DET5 and DET6), 75 shows sample and hold circuits (SH2 and SH3), 76 shows DC offset control units (CONT1 and CONT2), 77 shows a sample and hold circuit (SH4), and 78 shows a microprocessor (MPU).

Where the outputs from the plurality of cell stations (CS1 to CS4) 4 are combined and transmitted from one transmitting and receiving antenna 7, the input side transmission output detectors 72 (DET3 and DET4) are provided at the point nearest the combining end (output of the hybrid H5 or H6) thereof. Then, based on the burst timing information from each cell station (CS) 4, the microprocess (MPU) 78 controls the gate switches 73 (GS4 and GS5) and the sample and hold circuit 77 and detects the transmission output while establishing synchronization among the channels. The difference between the result of detection and the reference voltage ref is found at the gain control voltage output circuit 65 and fed back to the transmitting amplifier 35. The transmission gain at each cell station (CS) 4 is variably changed and made the output constant at the combining end (115 or H6). Further, output side transmission output detectors 74 (DET5 and DET6) are provided at the input end of the antenna 7. Based on the burst timing information from each cell station (CS) 4, the DC offset voltage from the DC offset control units 76 (CONT1 and CONT2) and the DC detection voltage from the detector 74 are sampled and held at the sample and hold circuits 75 (SH2 and SH3) for every burst timing under the control of the microprocessor (MPU) 78. Control is performed so that the transmitting output from the common transmitting amplifier 41 becomes constant.

The control of the output level at the combining ends (H5 and H6) of the transmitting wave is similar to that in the third embodiment.

In this fourth embodiment, output side transmission output detectors 74 (DET5 and DET6) are provided which add the transmitting outputs at the transmitting wave combining ends (H5 and H6) to the common transmitting amplifiers 41 (COM·AMP1 and COM·AMP2) for amplifying the same up to the predetermined level and detect the output at the input end of the antenna 7. The detection voltages thereof are sampled and held by the sample and hold circuits (SH2 and SH3) under the instruction of the microprocessor (MPU) 78. The gains of the common transmitting amplifiers 41 (COM·AMP1 and COM·AMP2) are controlled to make the transmission output level constant.

The transmitting signal burst from each cell station (CS) is increased or reduced according to the call quantity. The transmission control at the point after the combination becomes complex, but control is performed so that the input side level of the common transmitting amplifier 41 becomes the same for all of the four cell stations (CS1 to CS4) by the method according to the second embodiment and in that state the gain of the amplifier (COM·AMP) is controlled so that the input end level of the antenna 7 becomes constant.

Namely, the transmission output level at the input end of the antenna 7 is detected for every time slot (four time slots) in the transmitting signal burst period (refer to FIG. 20), and the DC detection voltage is supplied to the sample and hold circuit 75. On the other hand, the number of the transmitting waves of each cell station (CS) is determined at the microprocessor (MPU) 78 from the burst timing information from the TDMA·CONT terminal of each cell station (CS) 4, and the DC offset voltage is given to the sample and hold circuit 75 via the DC offset control unit 76.

The sample and hold circuit 75 supplies a voltage proportional to the difference between the DC detection voltage and the DC offset voltage to the common transmitting amplifier 41, controls the gain thereof, and makes the transmitting output levels constant at the input end of the antenna 7.

Note that the gain of the common transmitting amplifier 41 is controlled independently on the ANT1 side and the ANT2 side of the antenna 7.

In short, according to the detailed example of the fourth embodiment, the base transceiver station (BTS) 3 operates under a time division multiple access (TDMA) mode in which a plurality of cell stations (CS) 4 occupy channels individually assigned for every time slot and, at the same time, these plurality of cell stations (CS) 4 operate while alternately repeating the cycles of the transmission frame and reception frame as a whole under a time division duplex (TDD) mode. Here, the transmission gain adjusting means 71 feeds back the error voltage between the differential voltage, obtained by subtracting the offset based on the number of the transmitting waves using the channel from the level of the transmitting output at the input end of the transmitting and receiving antenna 7, and the predetermined reference voltage ref' to the common transmitting amplifier 41 for every time slot in each transmission frame cycle so as to adjust the transmission gain.

Next, an explanation will be made of a fifth embodiment based on the present invention. The PHS system is a method basically used for mobile telecommunication, so presupposes that the position of the subscriber unit (mobile terminal) is not fixed but moves around. For this reason, an omnidirectional antenna has been used both in the base transceiver station and the subscriber units (mobile terminals). Note that, a system in which directional antennas are used in the base transceiver station and one radio zone is divided into a plurality of fan type zones is sometimes used, but in this case, the radio zone is divided in a fixed manner so the basic concept is the same as the case of an omnidirectional antenna.

The wireless local loop (WLL) system is a system designed to facilitate construction of the telecommunication infrastructure at a low cost. Even in a case where the density of the subscribers (SUB) is relatively low, it is necessary to reduce the system costs. In particular, the reduction of the cost of the infrastructure requires a decrease of the number of the base transceiver stations and a reduction of the costs of the base transceiver stations. To decrease the number of the base transceiver stations, it is necessary to make the radio zone larger, but the rise of the transmission power required for this purpose causes an increase in the hardware costs. Further, in the case of a PHS system, the transmission power of each subscriber unit 2 is limited by the standards (refer to Standard RCR STD-28).

On the other hand, as mentioned above, a system of dividing one radio zone into a plurality of fan type zones is sometimes used. Since a directional antenna is used in each fan type zone, the system is improved in terms of both of the transmission power and the resistance to interference. However, the total power and the number of the radio units per radio zone are increased by exactly the number of the fan type zones, so consequently the cost of the base transceiver station is not lowered.

The reason why the required transmission power becomes larger due to an enlargement of the radio zone is that the electromagnetic waves are emitted even in the undesired directions due to the use of the omnidirectional antenna in the base transceiver station and/or subscriber unit. Therefore, transmission power is wasted.

Further, where the antenna is omnidirectional, the emission of such unnecessary electromagnetic waves causes interference in the other adjoining base transceiver stations, therefore the "frequency repetition number" must be made large. Namely, a frequency the same as the frequency used in a certain radio zone cannot be used except at a radio zone much further away. As a result, the efficiency of frequency utilization is degraded, and the number of the subscribers (SUB) which can be accommodated per radio zone becomes small. Therefore, the radio zone cannot be enlarged and conversely the number of the base transceiver stations must be increased. In the system dividing one radio zone into a plurality of fan type zones, this problem is reduced, but is still not sufficiently effectively resolved.

The fifth embodiment is designed to deal with the above problem and relates to the task 2) mentioned above. In order to solve this problem, basically the following base transceiver station (BTS) 3 is provided. Namely, it is a base transceiver station in a PHS type wireless local loop (WLL) system 1 comprising a base transceiver station (BTS) 3 and a large number of subscriber units 2 which are scattered around the base transceiver station (BTS) 3, are accommodated by the base transceiver station 3, and have a PHS terminal, provided with a variably directional transmitting and receiving antenna means 81 by which the transmission and reception wave is given a variable directivity in accordance with the distribution of the large number of subscriber units 2 with respect to the base transceiver station.

The base transceiver station (BTS) 3 and/or subscriber unit 2 in the wireless local loop (WLL) system 1 uses a directional antenna, so the emission of undesired electromagnetic waves is reduced and the radio zone can be enlarged while realizing an increase of the transmission distance and a reduction of interference. The infrastructural cost is reduced due to this.

In short, in a wireless local loop (WLL) system 1, the positions of the subscriber units 2 are fixed and it is possible to determine which subscribers SUB are present in what directions with respect to the base transceiver station (BTS) 3 on the infrastructure side. Using this fact, it is possible to use an antenna having directivity oriented to the subscribers in the base transceiver station so as to reduce the undesired emission of electromagnetic waves, increase the transmission distance, and reduce interference simultaneously.

Similarly, by taking note of the fact that the direction of the base transceiver station 3 with respect to the subscriber unit 2 is fixed and using a directional antenna oriented to the base transceiver station (BTS) 3 at the subscriber unit 2, it is possible to reduce the interference and, at the same time, enhance the efficiency of frequency utilization.

Figure 23:
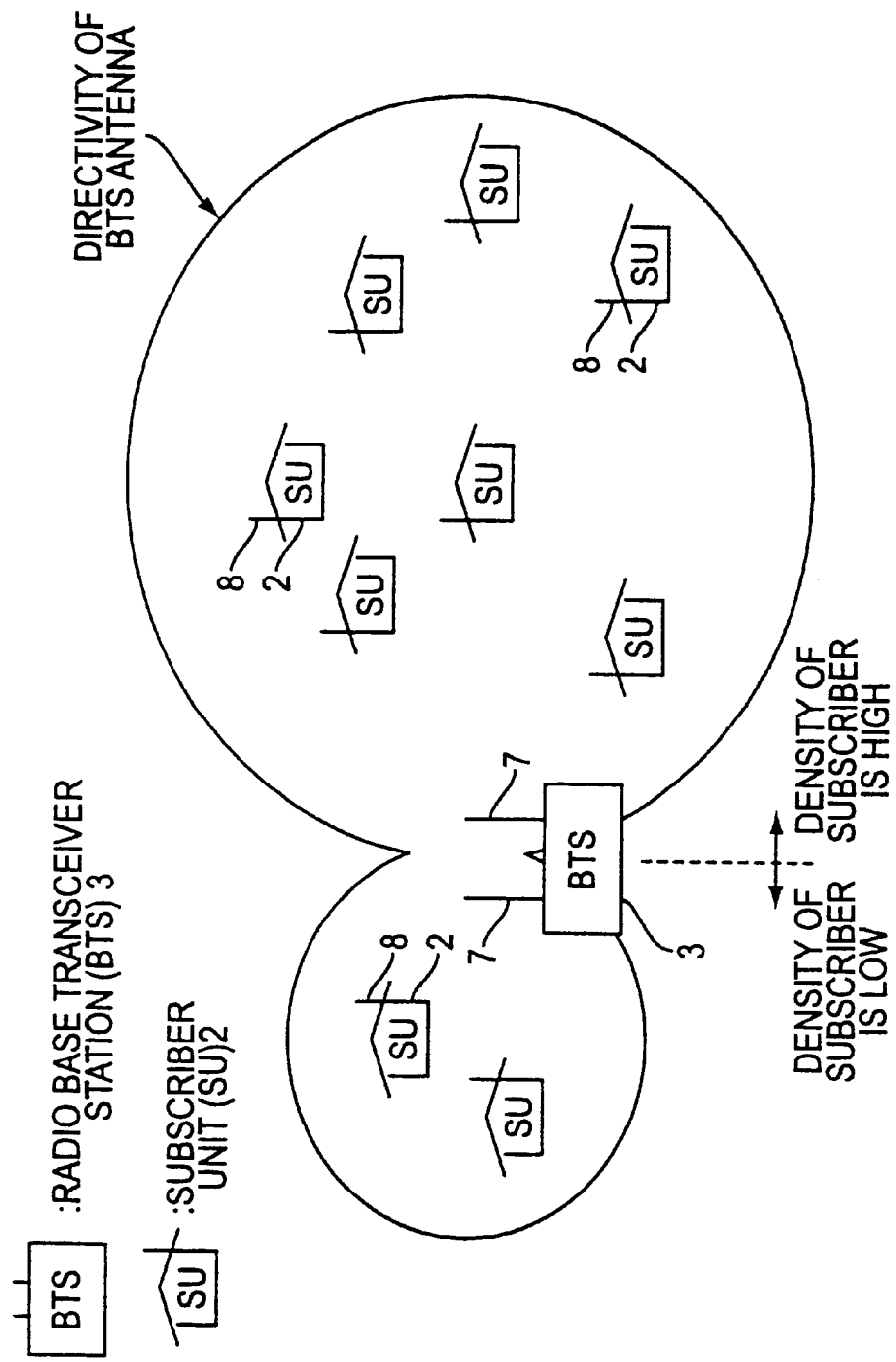
FIG. 23 is a view diagrammatically representing the functions obtained by a fifth embodiment according to the present invention.

FIG. 23 is a view diagrammatically showing the function obtained by the fifth embodiment according to the present invention. In the figure, 7 is a transmitting and receiving antenna of the base transceiver station (BTS) 3, and 8 is a transmitting and receiving antenna of the subscriber unit 2 of the subscriber SUB.

Where there is a variation in the distribution of the subscriber units 2 as shown in FIG. 23, the base transceiver station (BTS) 3 can suitably use the directional antenna 7 to improve the efficiency of the transmission power. Further, by reducing the emission power particularly in the direction in which the subscriber density is low, it can reduce the interference in that direction. Due to the reduction of the interference power, it becomes easy to utilize the same radio frequency in a radio zone of another base transceiver station (not illustrated) existing in that direction, so the efficiency of frequency utilization is enhanced. PHS systems make use of a dynamic channel assign (DCA) function where each base transceiver station autonomously selects and uses a frequency with less interference. Therefore, the effect of improvement is particularly great.

Figure 24:
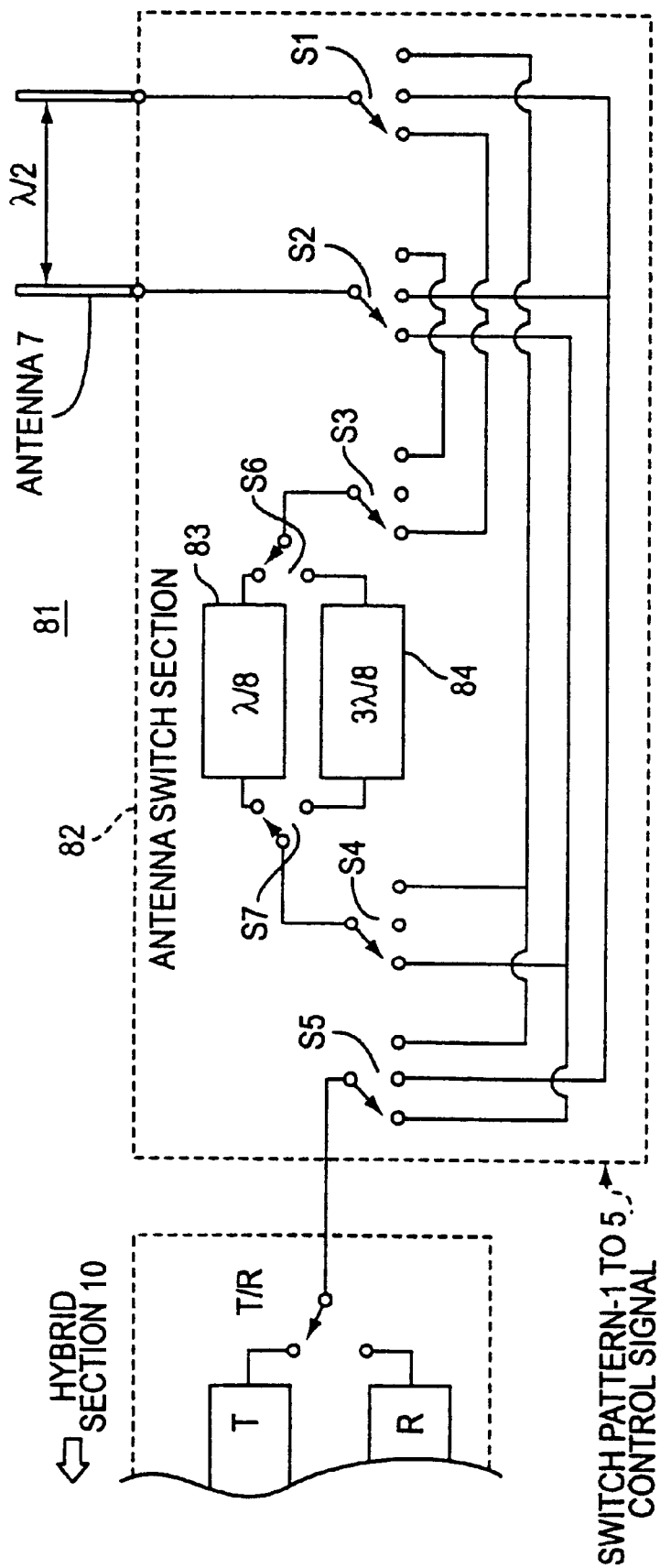
FIG. 24 is a view of an example of a variable direction transmitting and receiving antenna means characterizing the fifth embodiment.

FIG. 24 is a view of an example of the variably directional transmitting and receiving antenna means characterizing the fifth embodiment.

The variably directional transmitting and receiving antenna means 81 comprises an antenna switch section 82 serving as the feeding phase control unit and a dipole transmitting and receiving antenna 7. Here, the feeding phase control unit (hereinafter referred to as the antenna switch section) 82 comprises a $\lambda/8$ delay line 83, a $3\lambda/8$ delay line 84, pattern switches S1 to S7, and the illustrated required wirings and performs the transfer of the transmitting wave T and the receiving wave R with the hybrid section 10.

The pattern switches S1 to S7 receive the switch pattern control signal from the microprocess (MPU) 31 in each cell station (CS) 4, assume the designated contact positions, and provide the various directional patterns illustrated in FIG. 25.

FIGS. 25A to 25E are views of the various directional patterns and the switch patterns at this time. According to whether a delay of $\lambda/8$ is given to the feeding route or a delay of $3\lambda/8$ is given or no delay is given, the directional patterns as shown for example in FIG. 25A to FIG. 25E can be obtained. Note that how to obtain any directivity desired per se is something which can be realized by other well known art as well.

Taking note of the fact that the positions of the subscriber units 2 are fixed and which subscriber are present in which direction with respect to the base transceiver station (BTS) 3 can be determined, the subscriber units existing in specific directions are grouped together and a specific time division multiple access (TDMA) time slot is assigned to each group.

Figure 25B:
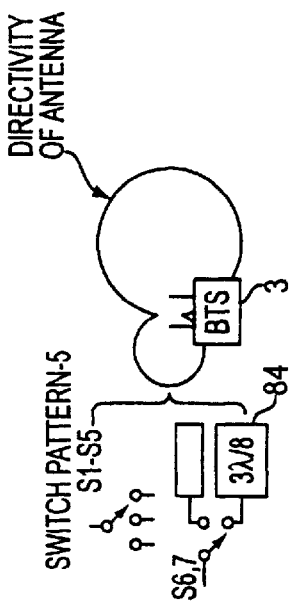
FIG. 25A to FIG. 25E are views of various directional patterns and the switch patterns at that time.
Figure 25D:
Figure 25A:
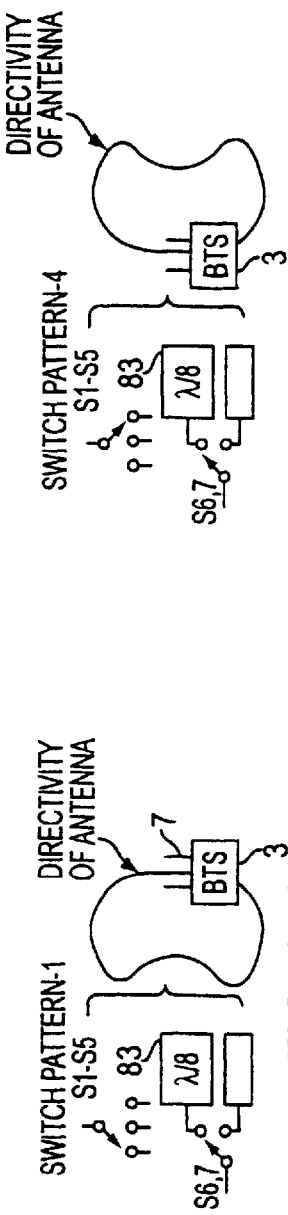
Figure 25C:
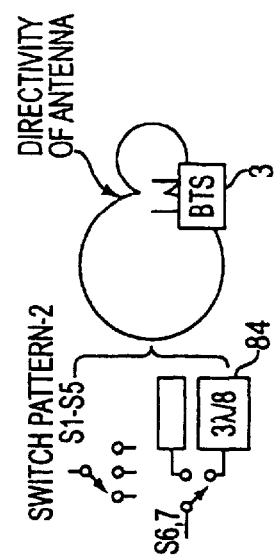
Figure 25E:
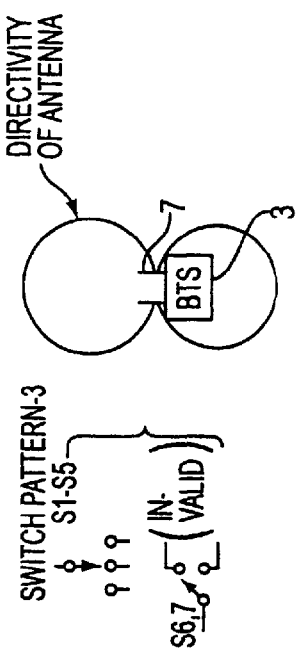
Figure 26:
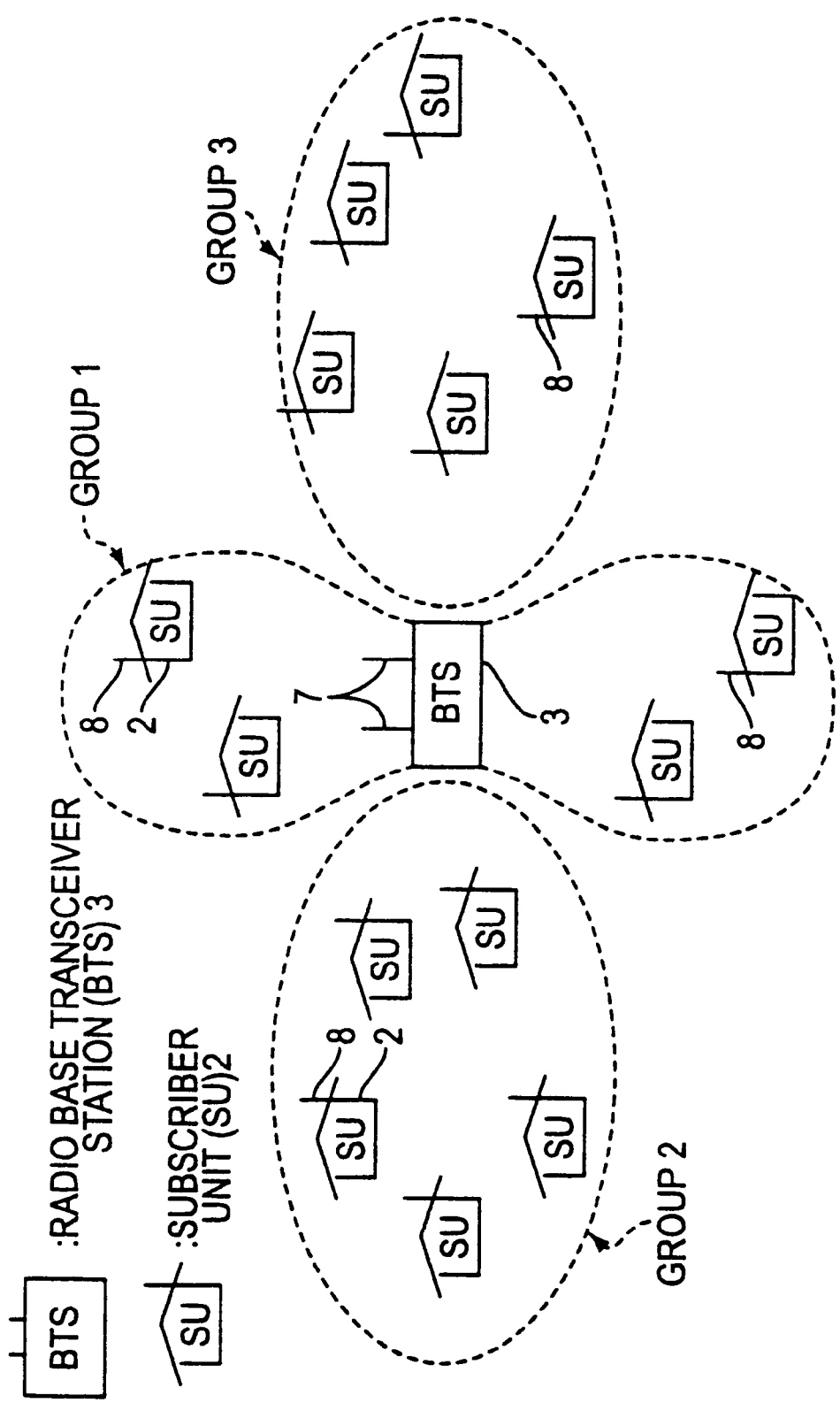
FIG. 26 is a view of an example of grouping of subscriber units under the fifth embodiment.
Figure 27:
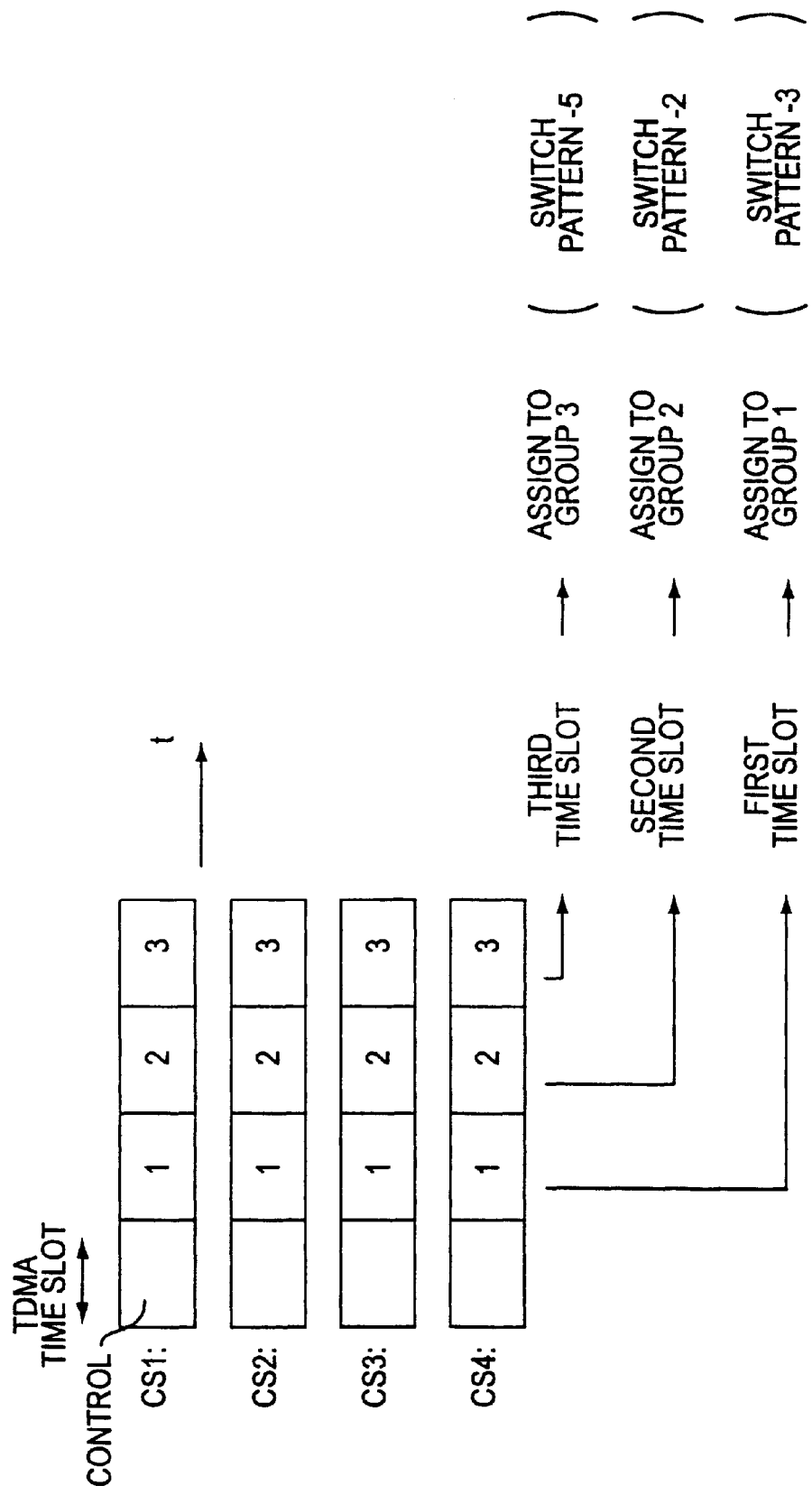
FIG. 27 is a view of an assignment of time slots under the grouping in FIG. 26.

FIG. 26 is a view of an example of the grouping of the subscriber units in the fifth embodiment. FIG. 27 is a view of the assignment of the time slots assuming the grouping in FIG. 26. Referring to these FIG. 26 and FIG. 27, the time slot 1 is assigned to the subscriber units 2 belonging to the group 1, and the time slot 2 is assigned to the subscriber units 2 belonging to the group 2. Accordingly, in the time slot 1, the switch pattern 3 of FIG. 25E is adopted, and in the time slot 2, the switch pattern 2 of FIG. 25C is adopted. Thus, the communication with the subscriber units in each group is carried out by switching the antenna directivity for every time division multiple access (TDMA) time slot. Note that, desirably the number of the subscriber units belonging to each subscriber unit group is made the same as much as possible for good balance. Therefore, depending on the geographical distribution of the subscriber units, it is also possible to use the switch patterns 1 and 4 (patterns of FIG. 25A and FIG. 25B) to average out the number of the subscriber units .

Further, the correspondence between the groups of subscriber units and the time division multiple access (TDMA) time slots does not have to be fixed and can be adaptively changed according to the geographical distribution of the subscribers calling at any particular point of time.

Further, by establishing synchronization in timing between the base transceiver stations in the radio zones and using directivities orthogonal to each other in radio zones close to each other, the interference between the radio zones can be reduced and thereby an effect of an increase of the channel capacity can be obtained.

Figure 28:
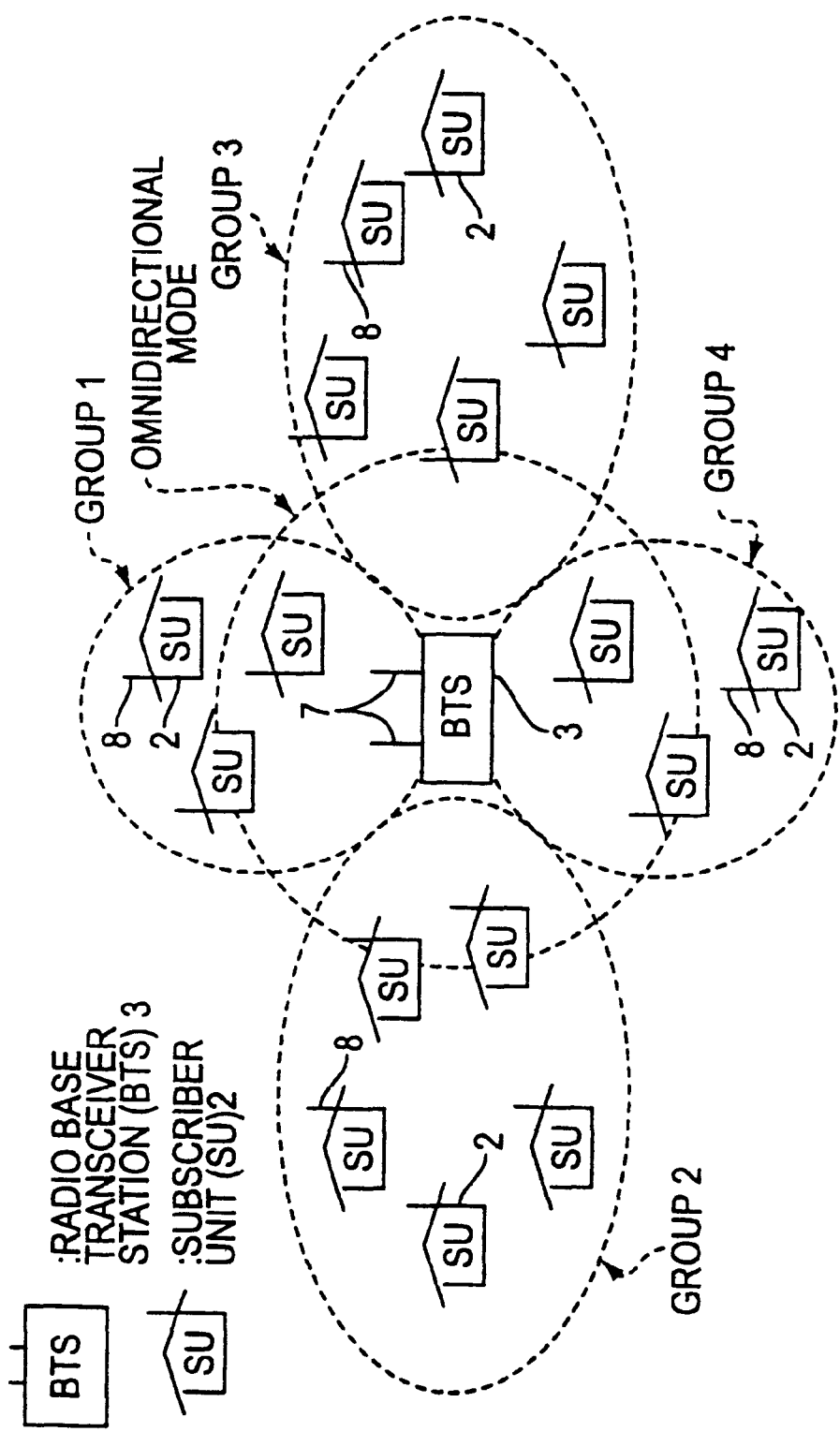
FIG. 28 is a view of another example of a directional pattern shown in FIG. 26.

FIG. 28 is a view of another example of the directional pattern shown in FIG. 26. In FIG. 26, the antenna was made directional for all of the time division multiple access (TDMA) time slots, but in the transmitting and receiving time slots for the control information by the D-channel, there are sometimes cases where an omnidirectional antenna is preferable. At this time, an omnidirectional antenna can be realized for a specific time slot by using a diversity antenna (comprised of a pair of antennas).

Figure 29:
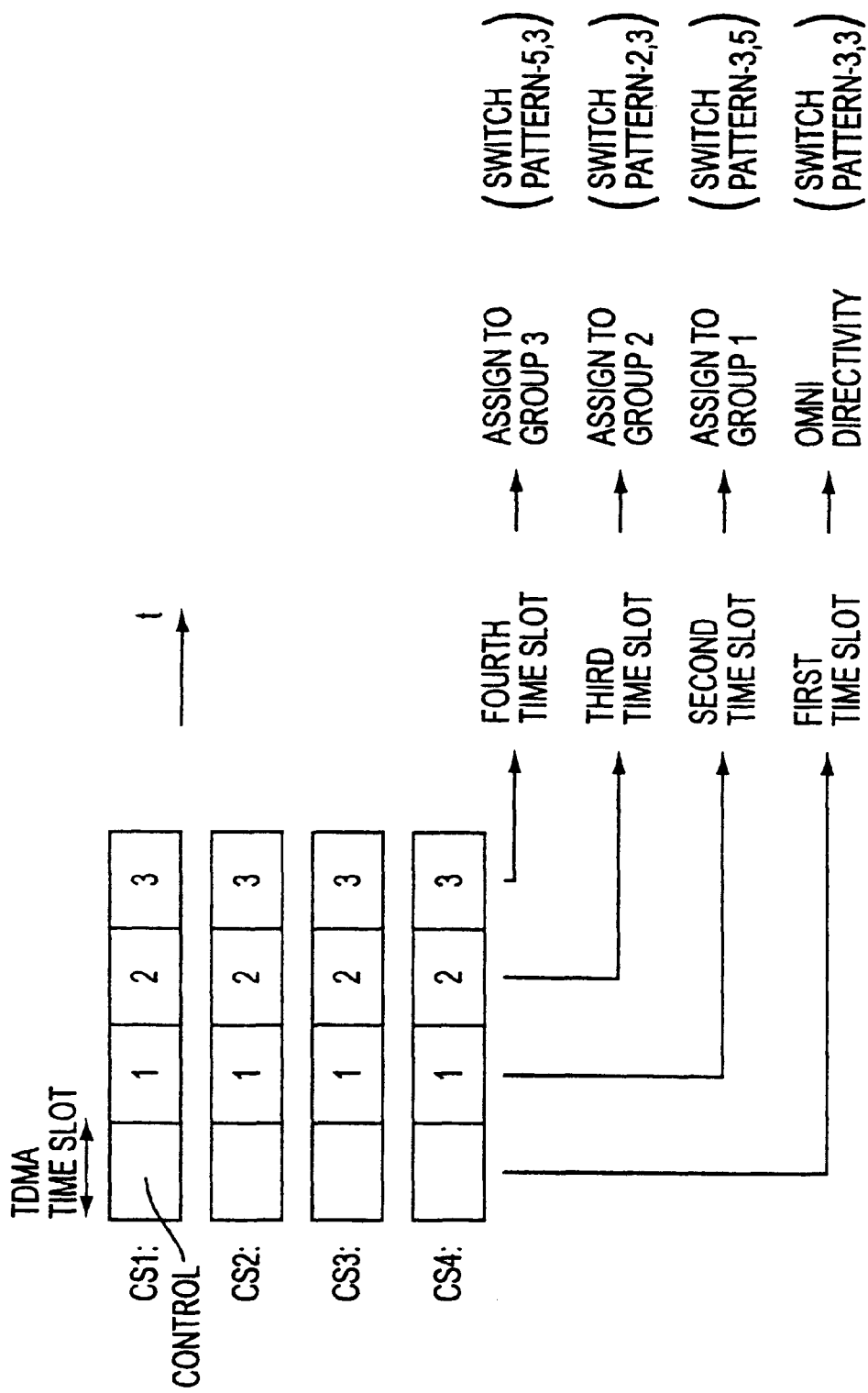
FIG. 29 is a view of the assignment of the time slots in a case where an omnidirectional pattern is also included.

FIG. 29 is a view of the assignment of the time slots in the case of inclusion of an omnidirectional pattern as well. The time slot indicated as "control" in the figure is assigned to the D-channel and is in the omnidirectional mode (FIG. 28).

Figure 30:
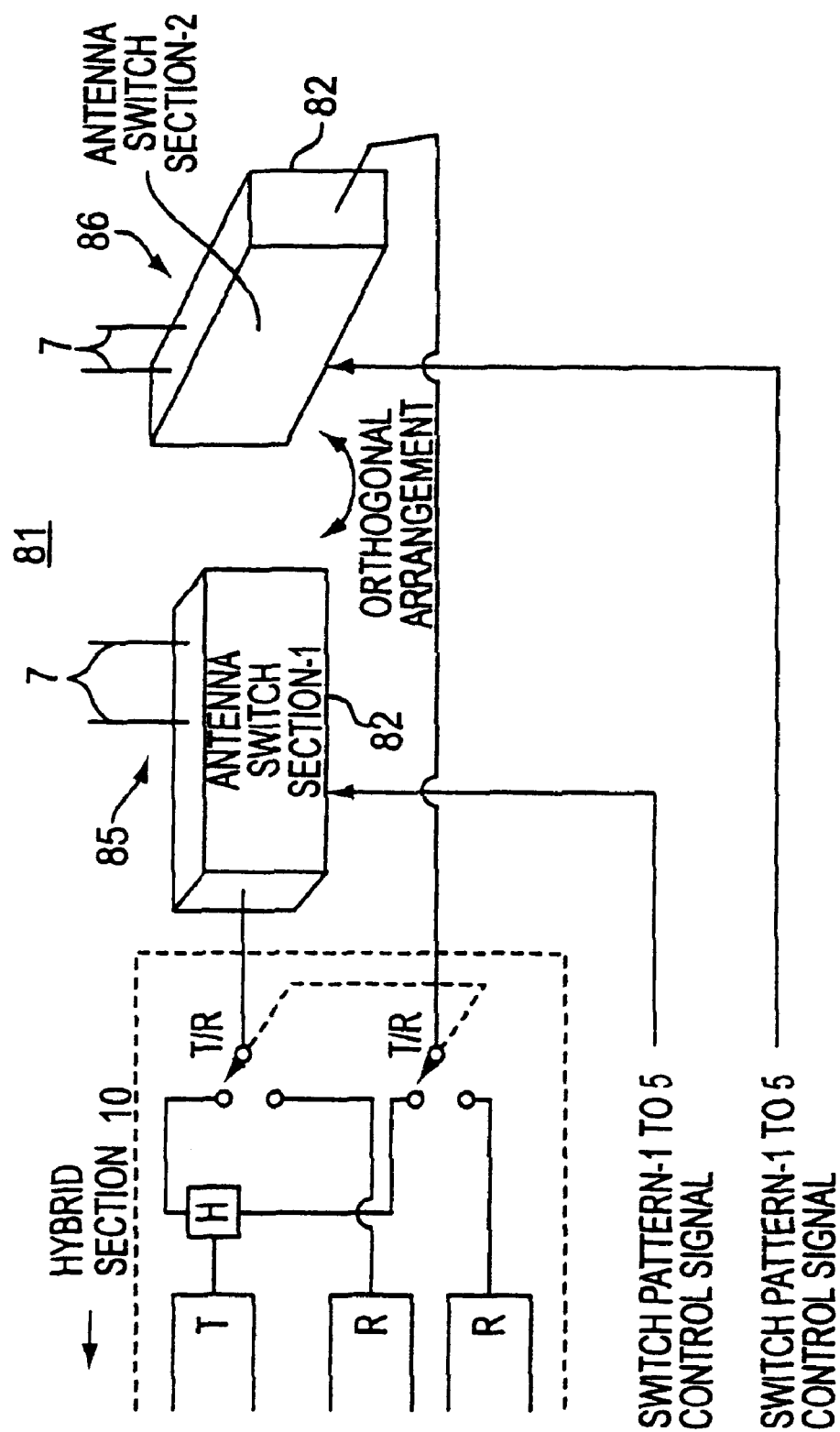
FIG. 30 is a view of an example of the variable directional antenna means capable of also handling the pattern of FIG. 29.

FIG. 30 is a view of an example of a variably directional antenna means which can be also used for the pattern of FIG. 29, As shown in the figure, the antenna switch sections −1 and −2 are provided and the power is fed simultaneously at both transmission sides. The reception side performs the usual diversity reception having different antenna gains. In the figure, the first and second variably directional transmitting and receiving antenna units 85 and 86 are constituted by sets of the antenna switch sections −1 and −2 and the transmitting and receiving antennas 7, respectively. These units 85 and 86 are arranged orthogonal to each other. Here, by the combination of the switch patterns of the antenna switch sections, the combined directional patterns as shown in FIGS. 31 to 33 are obtained.

Figure 31:
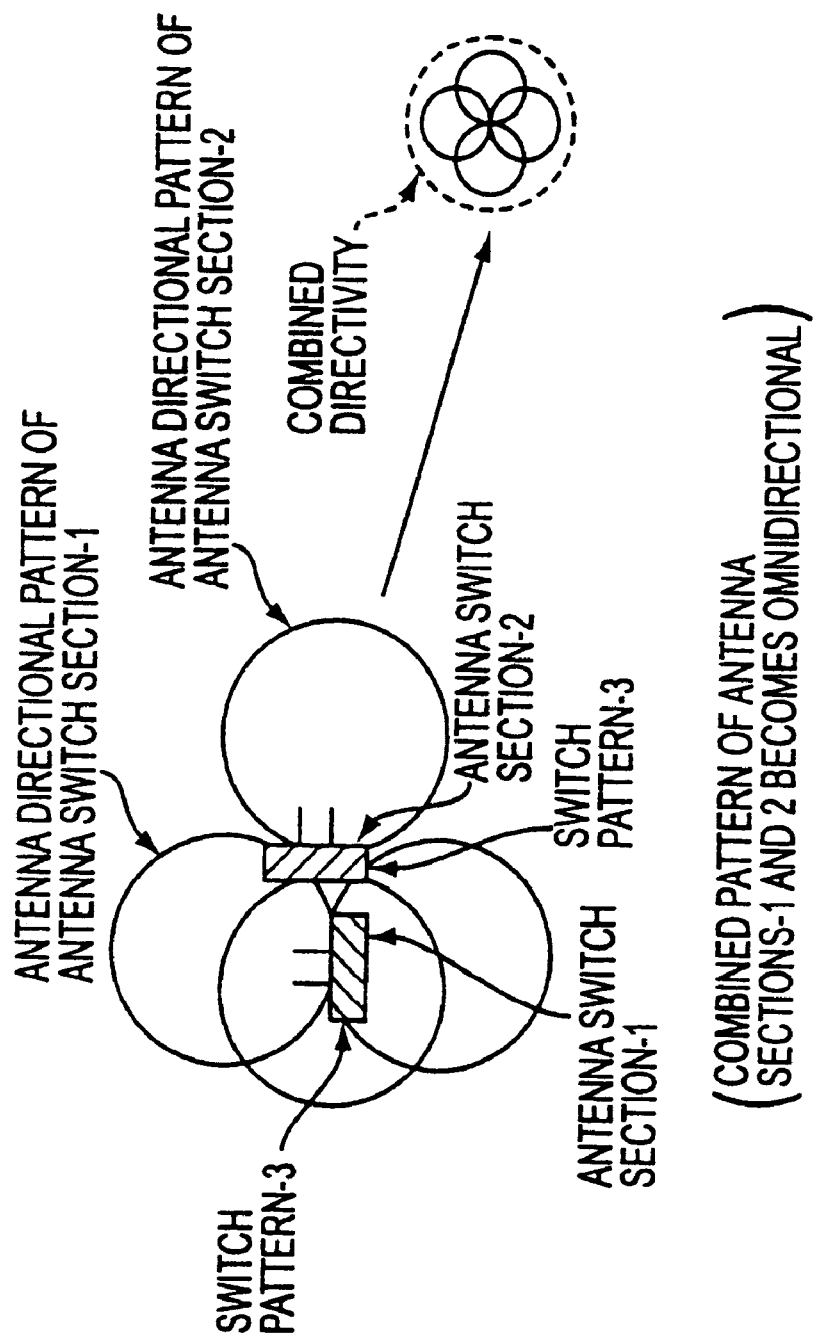
FIG. 31 is a view of combined patterns corresponding to the omnidirectional mode shown in FIG. 28.
Figure 32:
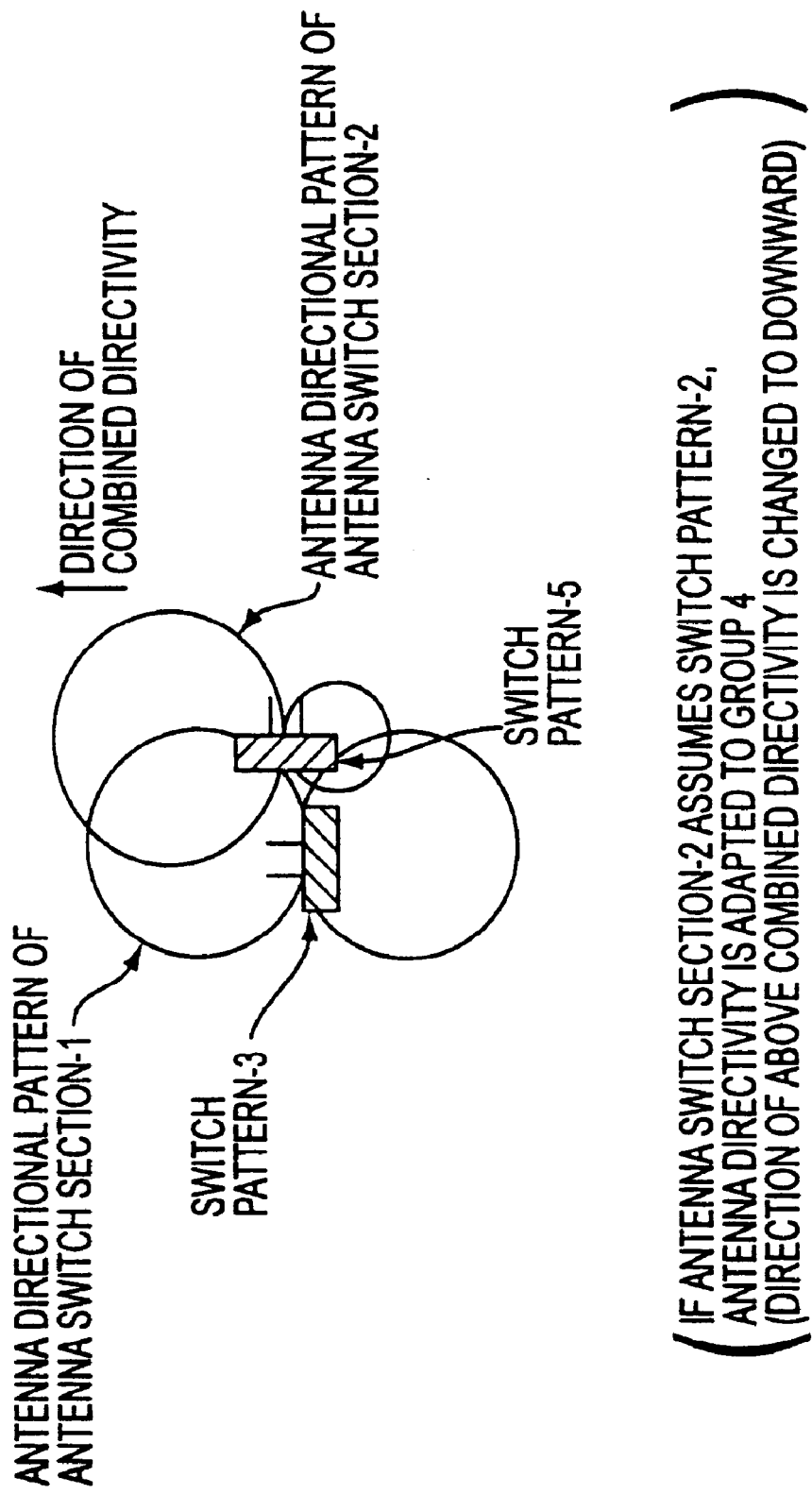
FIG. 32 is a view of combined patterns adapted to the group 1 shown in FIG. 28.
Figure 33:
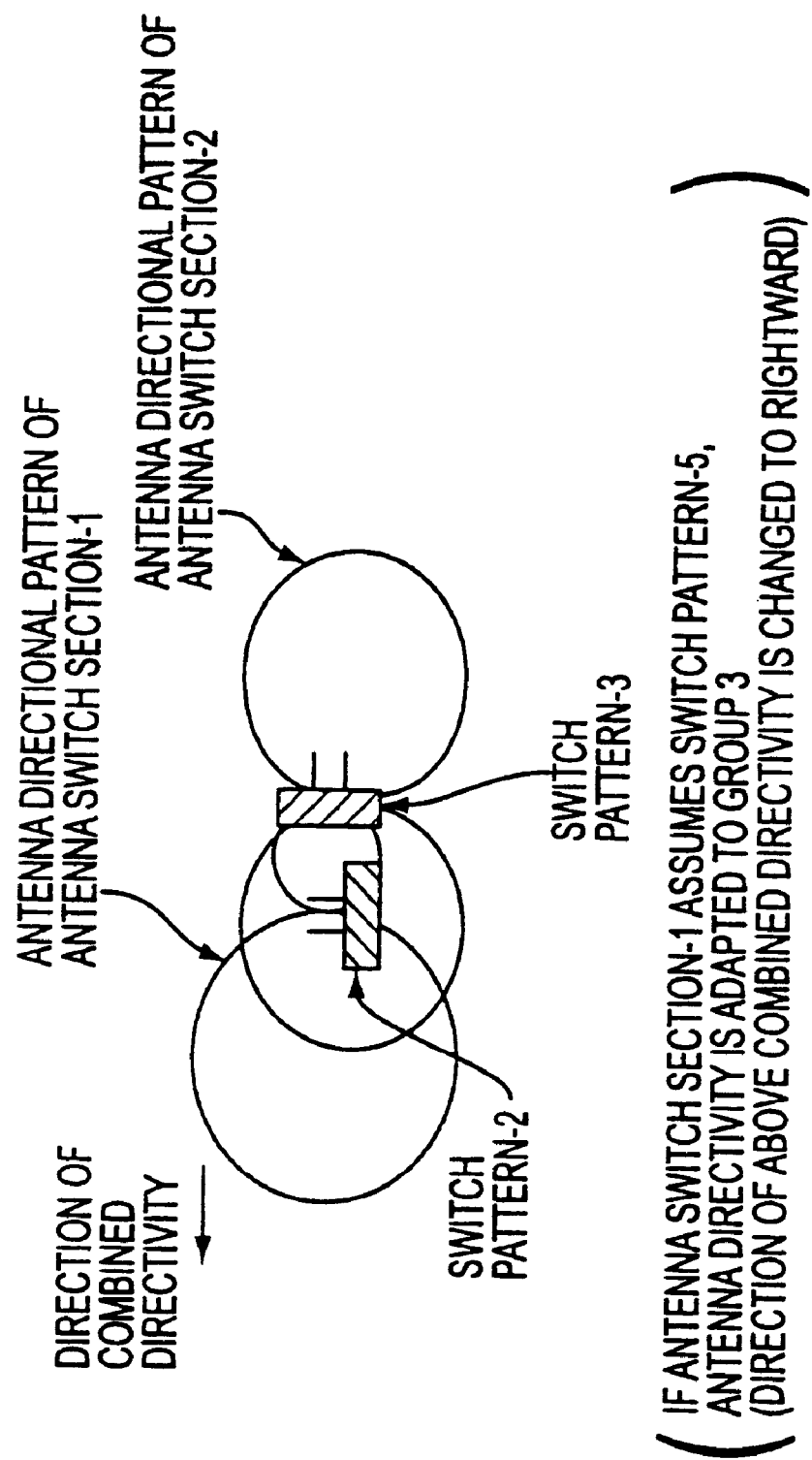
FIG. 33 is a view of combined patterns adapted to the group 2 shown in FIG. 28.

That is, FIG. 31 is a view of the combined pattern corresponding to the omnidirectional mode shown in FIG. 28, FIG. 32 is a view of the combined pattern corresponding to the group 1 shown in FIG. 28, and FIG. 33 is a view of the combined pattern corresponding to the group 2 shown in FIG. 28.

Figure 34:
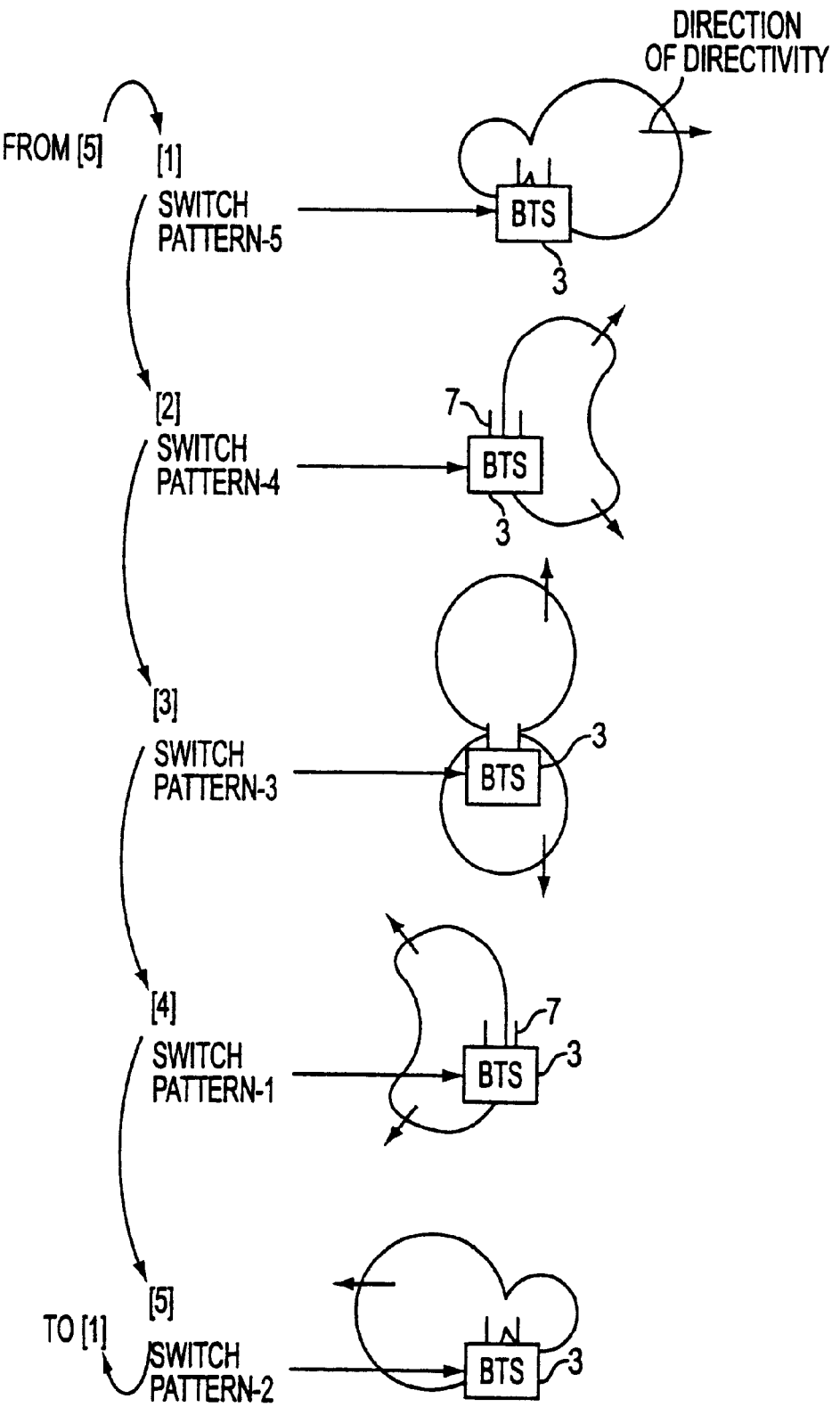
FIG. 34 is a view for explaining an example of realization of another omnidirectional pattern.

FIG. 34 is a view for explaining an example of realization of another omnidirectional pattern. This example is one of artificial realization of omnidirectivity by sequentially switching the directivity of the antenna. In a PHS system, the control information of the D-channel is transmitted to several frames at one time. Therefore, in the control information-use time slot in the first frame, the directivity of [1] of FIG. 34 is assumed and in the control-use time slot of the second frame (not always the frame immediately after the first frame), control information the same as that in the previous frame is transmitted with the directivity of [2] of the figure. In the third frame, similarly, the same control information is transmitted with the directivity of [3]. By repeating this below, the same control information can be transmitted in all directions and artificial omnidirectivity can be realized.

In short, according to the detailed example of the fifth embodiment, the base transceiver station (BTS) 3 is a base transceiver station which comprises a plurality of cell stations (CS) 4 and operates under a time division multiple access (TDMA) mode in which these plurality of cell stations (CS) 4 occupy channels individually assigned for every time slot. Here, the variably directional transmitting and receiving antenna means 81 assigns the same time slots to all of the subscriber units 2 belonging to the same group when grouping a large number of subscriber units 2 into a plurality of groups for each of the directions seen from the base transceiver station (BTS) 3. Each time slot is given directivity in each corresponding direction.

Further, the variably directional transmitting and receiving antenna means 81 comprises dipole antennas 7 and the feeding phase control unit 82 for changing over the difference in feeding phase to the dipole antennas 7 for every time slot.

Furthermore, the variably directional transmitting and receiving antenna means 81 comprises the first variably directional transmitting and receiving antenna unit 85 and the second variably directional transmitting and receiving antenna unit 86 orthogonally arranged with respect to this first variably directional transmitting and receiving antenna unit 85.

The variably directional transmitting and receiving antenna means 81 changes the directivity to omnidirectivity for every specific time slot for transferring control information between the base transceiver station (BTS) 3 and the subscriber units 2.

More detailed examples of the above-mentioned directional patterns will be given below for further study. For the explanation of same, refer to FIG. 35 to FIG. 39.

Figure 35:
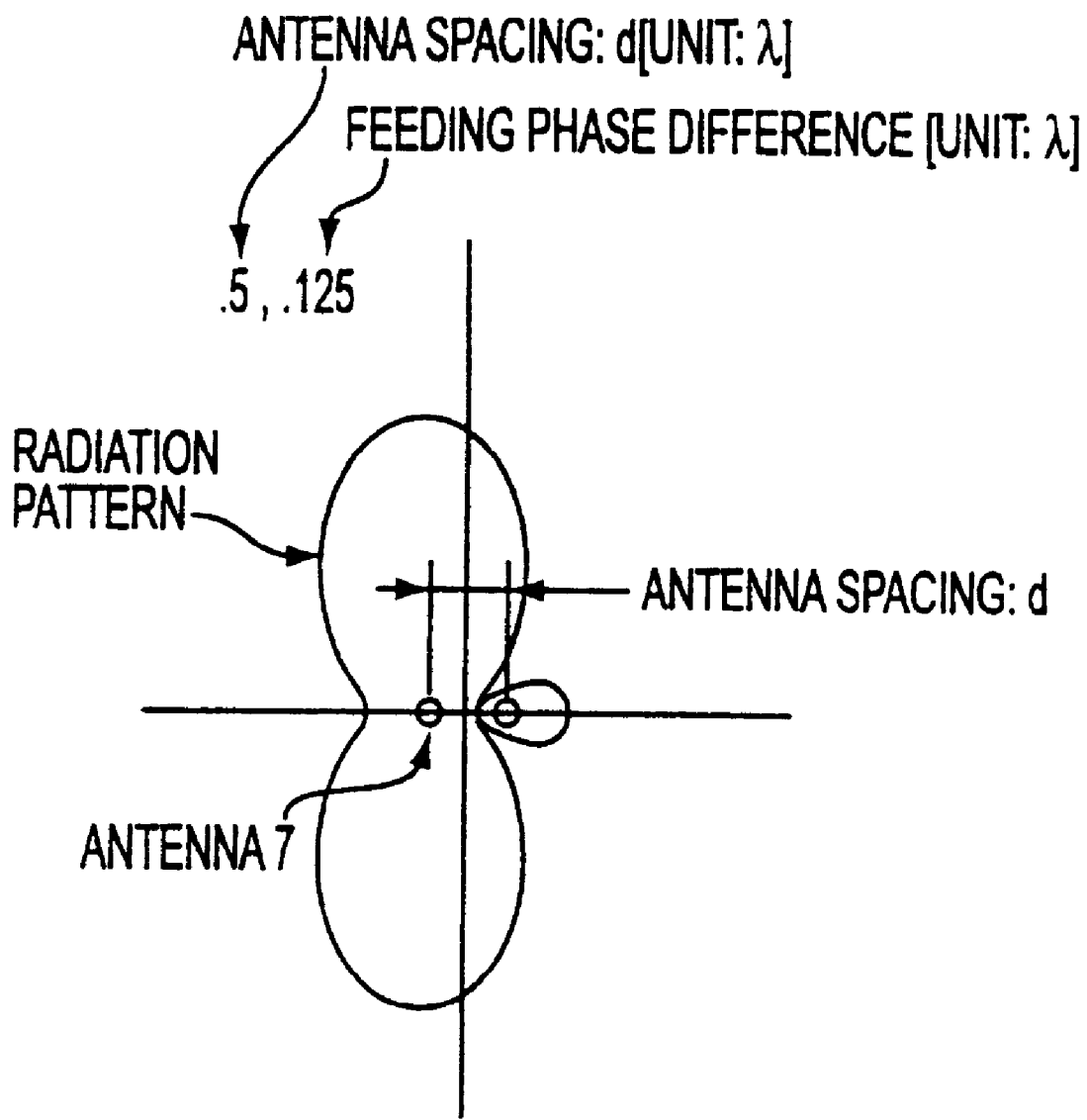
FIG. 35 is a view of an example of radiation patterns of the antenna.
Figure 36:
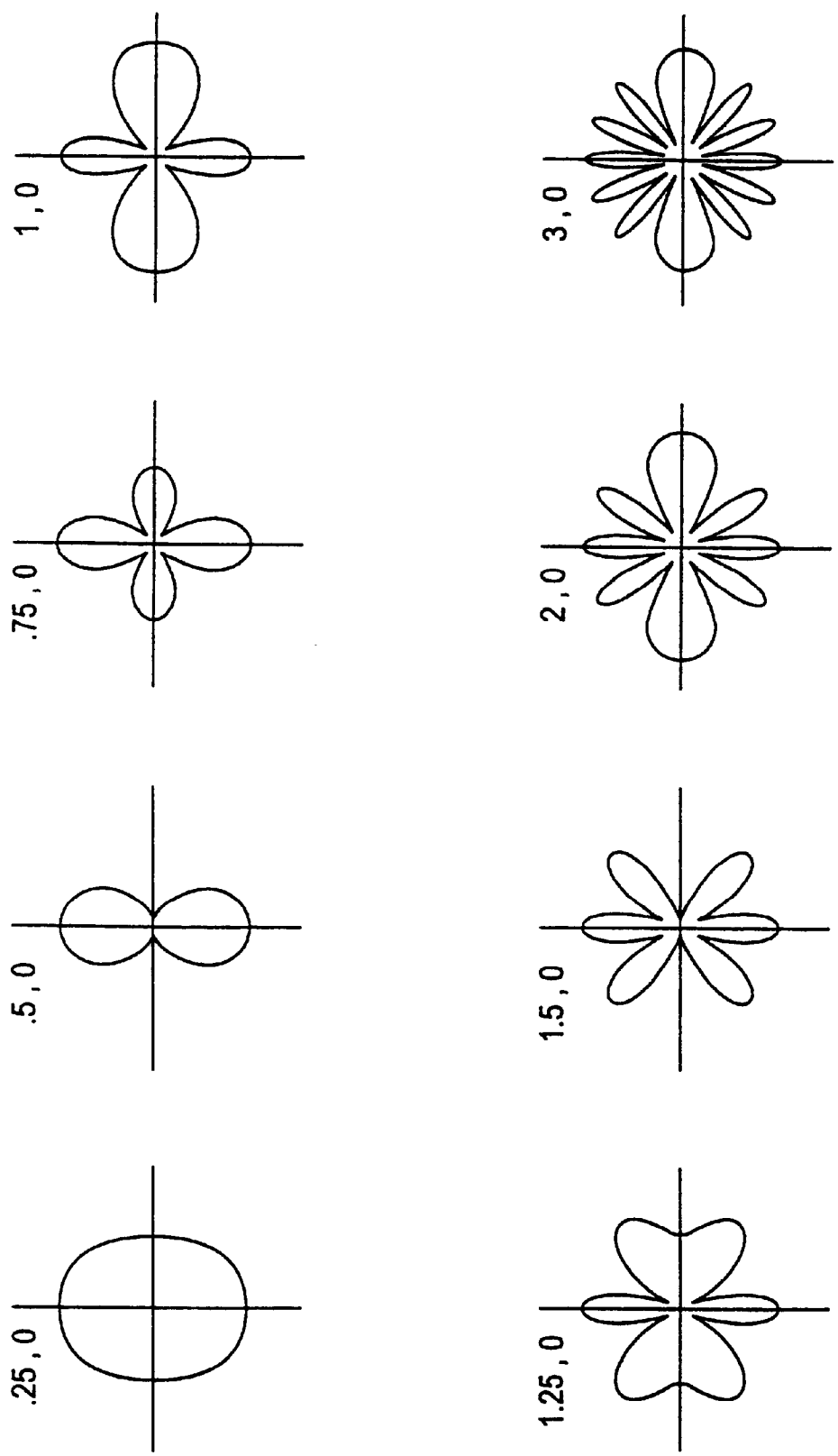
FIG. 36 is a view of various radiation patterns when the antenna spacing is changed with a zero phase difference in feeding.
Figure 37:
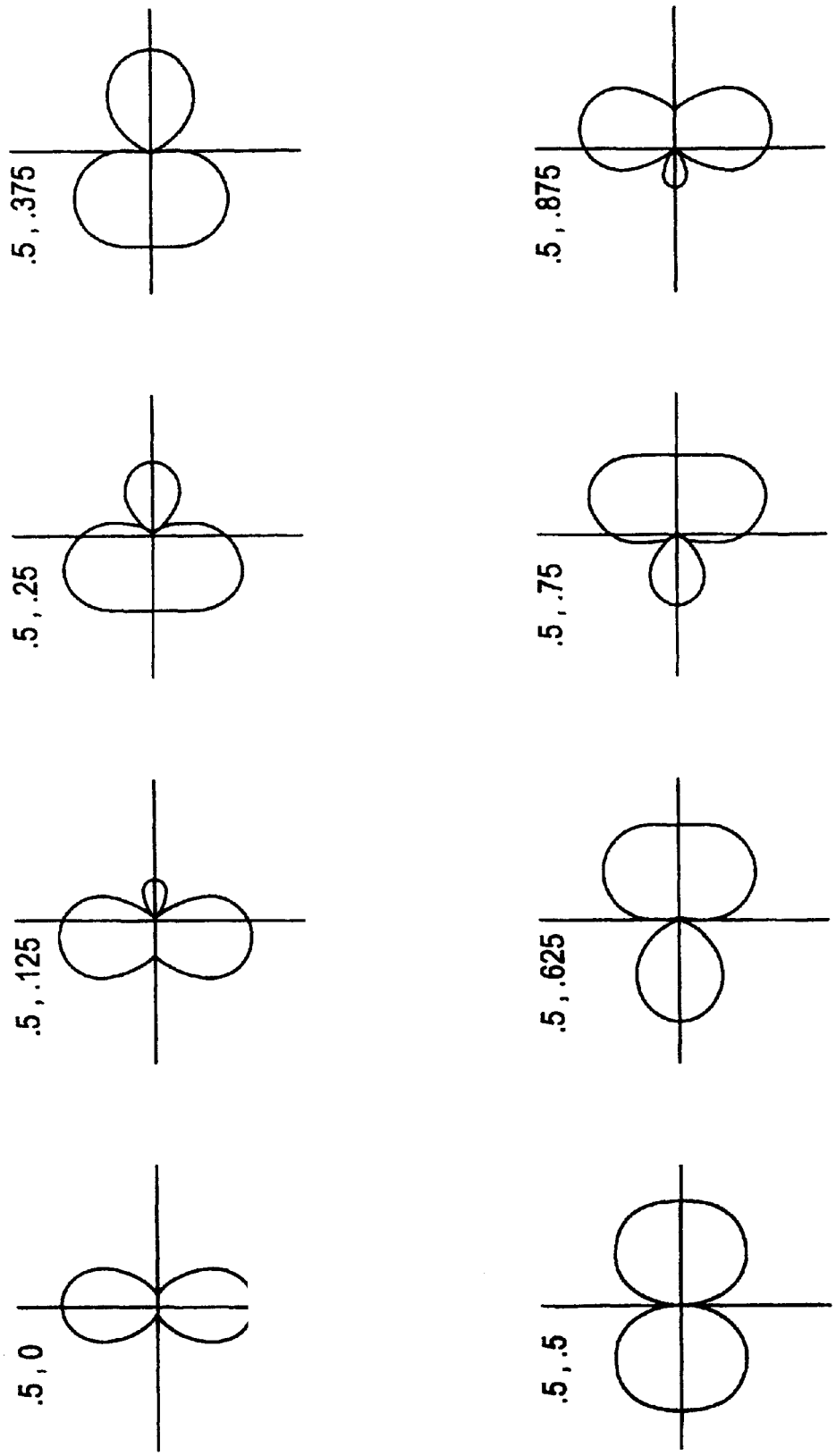
FIG. 37 is a view of various radiation patterns when the phase difference in feeding is changed when the antenna spacing is set at a first fixed value.
Figure 38:
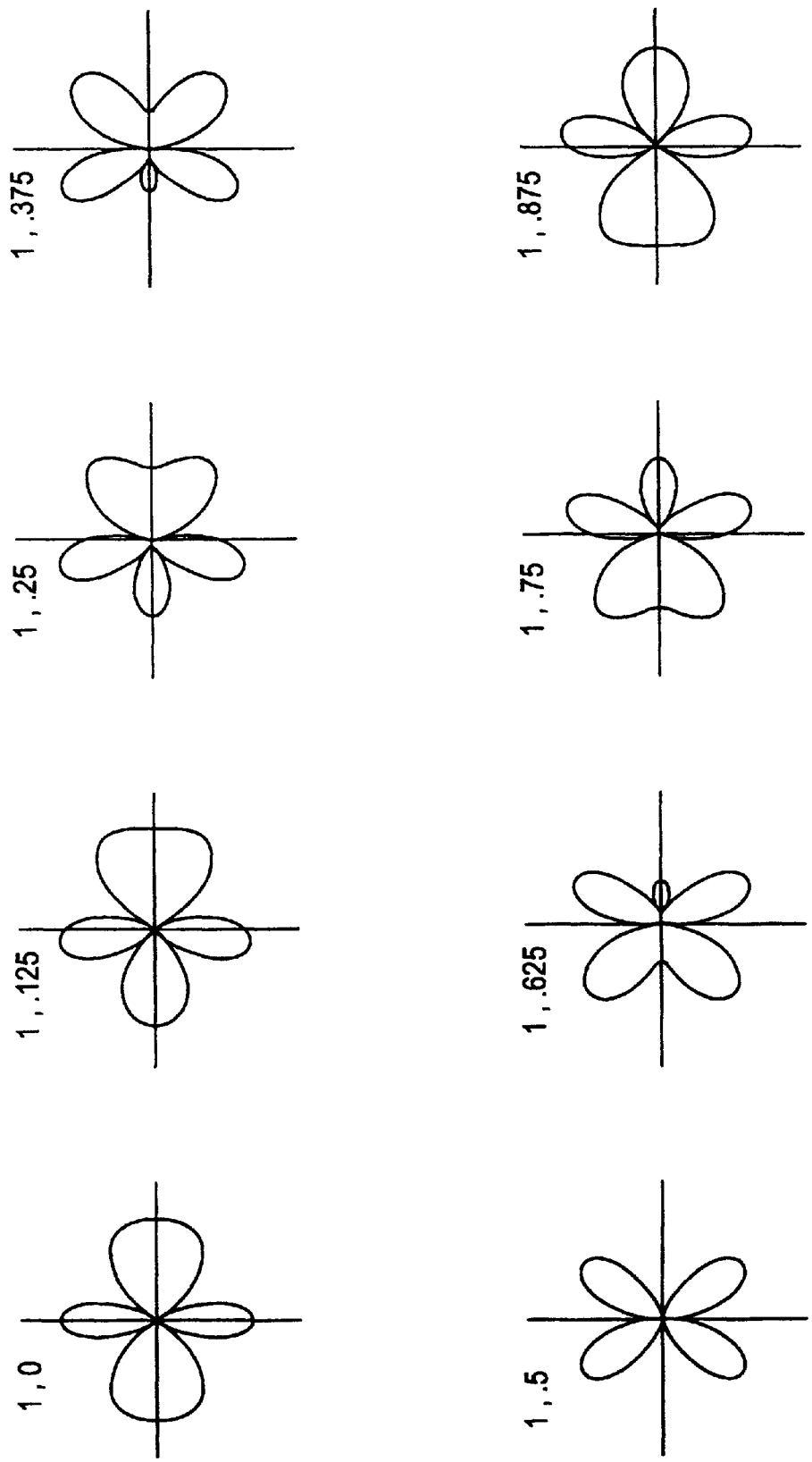
FIG. 38 is a view of various radiation patterns when the phase difference in feeding is changed when the antenna spacing is set at a second fixed value.
Figure 39:
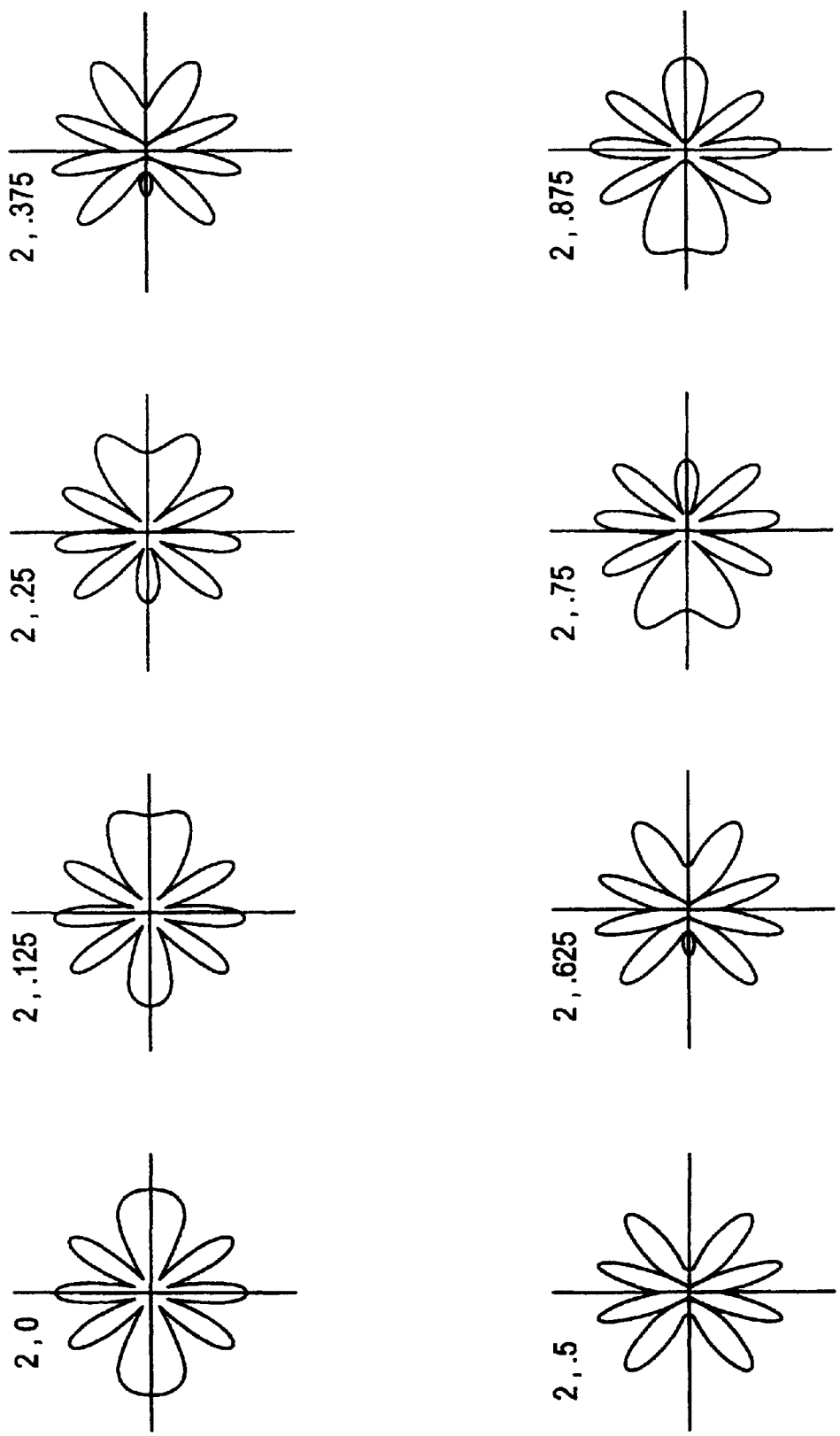
FIG. 39 is a view of various radiation patterns when the phase difference in feeding is changed when the antenna spacing is set at a third fixed value.

That is, FIG. 35 is a view of an example of the radiation pattern of an antenna; FIG. 36 is a view of various radiation patterns when changing the antenna spacing when the difference in feeding phase is 0; FIG. 37 is a view of various radiation patterns when changing the difference in feeding phase when setting the antenna spacing to a first fixed value; FIG. 38 is a view of various radiation patterns when changing the difference in feeding phase when setting the antenna spacing to a second fixed value; and FIG. 39 is a view of various radiation patterns when changing the difference in feeding phase when setting the antenna spacing to a third fixed value.

Note that the numerals on the top left of the figures show the antenna spacing d (left side) and the feeding phase difference [unit: λ] (right side). FIG. 35 shows the case where the antenna spacing d equals λ/2 (0.5) and the feeding phase difference equals λ/8 (0.125).

Considering FIG. 35 to FIG. 39, following facts (1) and (2) become clear.

(1) When the antenna spacing d is a value other than λ/2 (0.5), controllable directivity cannot be obtained. Further, with a d of less than λ/2, the pattern becomes elliptical, while with a d of more than λ/2, a large number of beams are formed and therefore even if the feeding phase difference is changed, the entire radiation pattern does not change that much.

(2) When d=λ/2, the radiation pattern continuously changes with respect to the feeding phase difference.

From the above description, the optimum antenna spacing d is λ/2 (fixed). For the feeding phase difference, as shown in the concrete example of FIG. 24, preferably the delay lines of λ/8(83), 3λ/8(84) and 0 delay are used.

Next, an explanation will be made of a sixth embodiment of the present invention. In a usual PHS network, the antenna 8 at the PHS terminal is omnidirectional, therefore, as shown in FIG. 40 mentioned later, the frequency repetition number must be made large and thus the channel capacity cannot be made larger.

Figure 40:
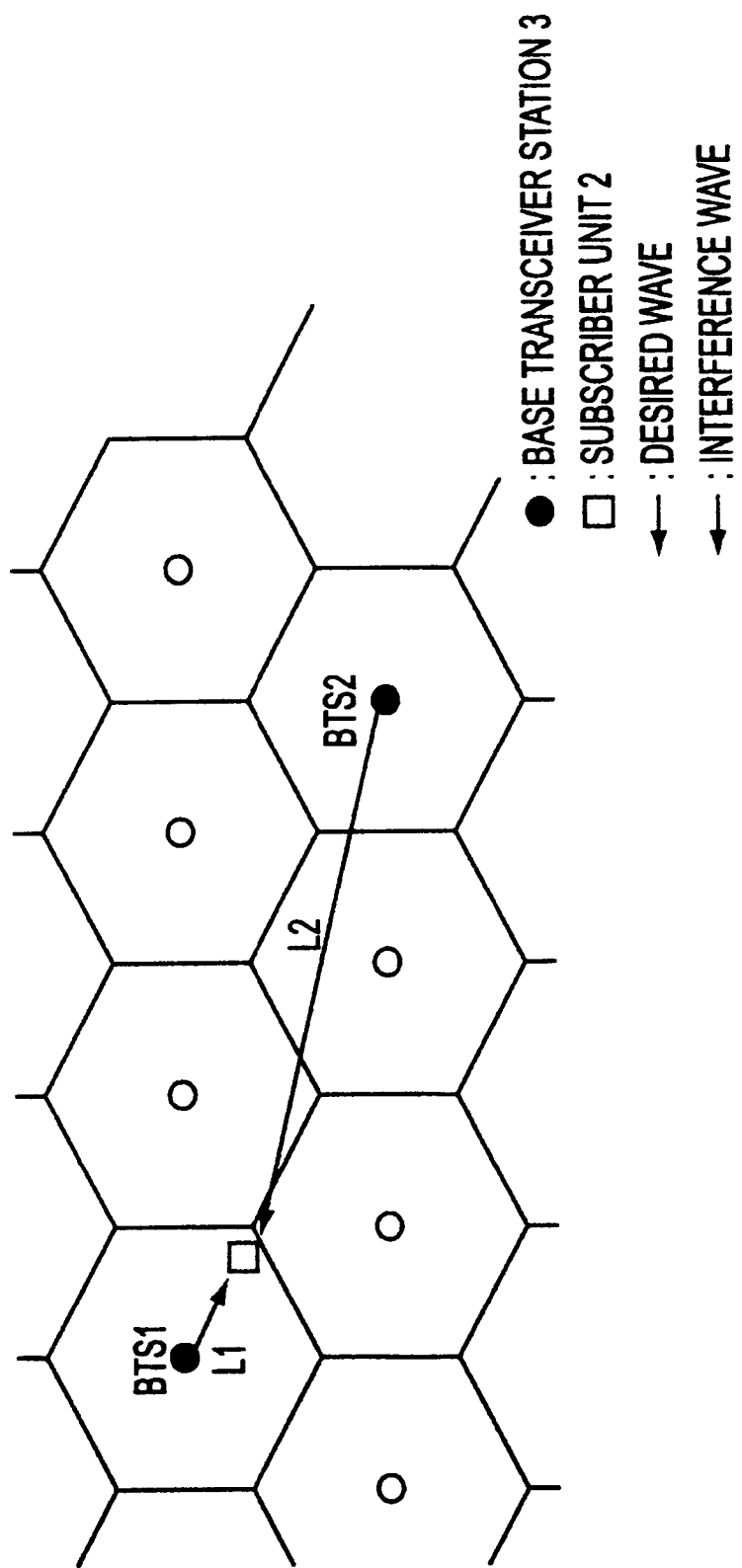
FIG. 40 is a view for explaining the relationship between a desired wave and interference wave in a general PHS network.
Figure 41:
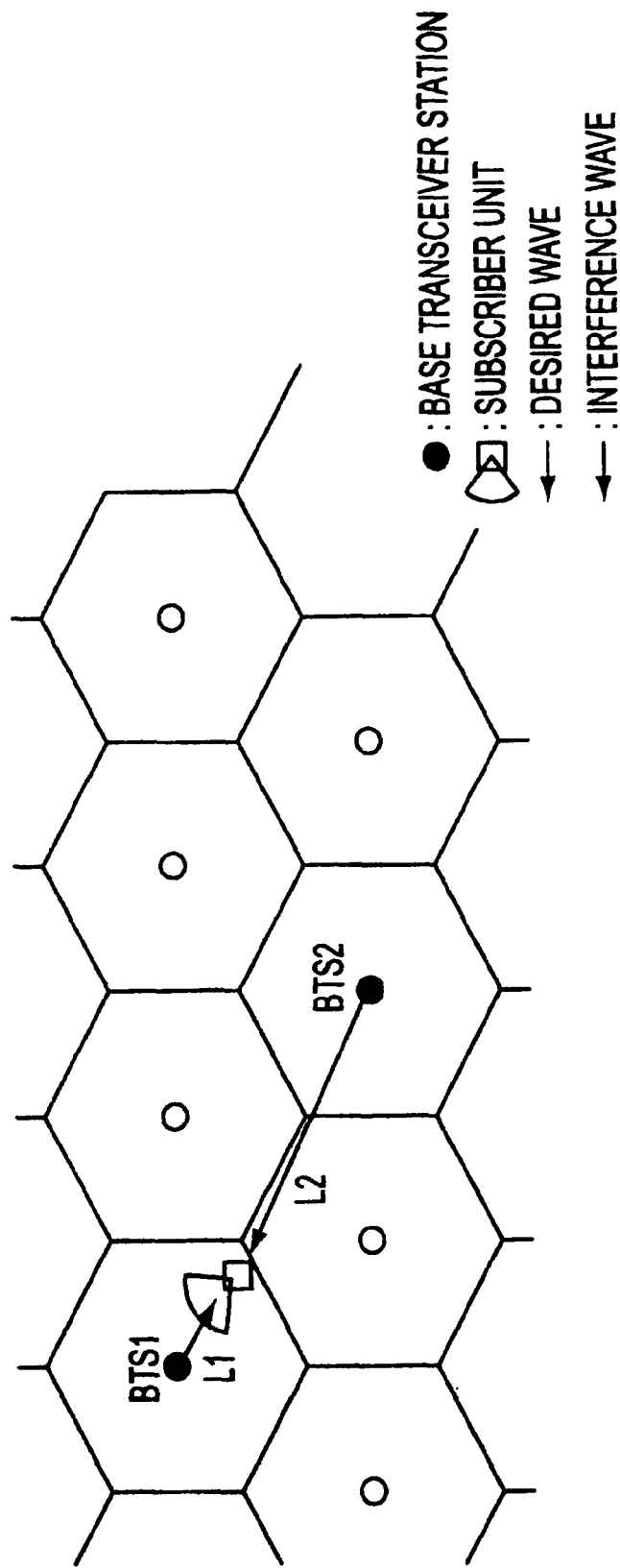
FIG. 41 is a view for explaining how the relationship between the desired wave and interference wave is improved by a sixth embodiment of the present invention.

FIG. 40 is a view for explaining the desired wave versus interference wave characteristic in a general PHS network; and FIG. 41 is a view for explaining how the desired wave versus interference wave characteristic is enhanced by the sixth embodiment of the present invention.

In a wireless local loop (WLL) system, it is possible to utilize the fact that the PHS terminals are fixed and use an directional antenna to reduce the inter-cell interference as shown in FIG. 40 and make the frequency repetition number smaller. Conventionally, where the antennas 8 of the subscriber units 2 are omnidirectional, a frequency repetition number of seven cells becomes necessary. Where the base transceiver stations BTS1 and BTS2 use the same radio frequency as in FIG. 40, the following equation stands:

$$L1 = 1$$

$$L2 = \sqrt{1^2 + (2\sqrt{3})^2} = \sqrt{13}$$

Accordingly, the ratio CIR (carrier to interference ratio) between the power of the desired wave and the power of the interference wave (note, the average value in a long zone is used) becomes as follows:

$$CIR = (\sqrt{13}/1)^\alpha = 19.5 \text{ dB}$$

where, α: distance attenuation factor (α=3.5)

As opposed to this, when the subscriber units 2 use directional antennas, even with a repetition of three cells as in FIG. 41, since L1=1 and L2=2, the ratio CIR between the power of the desired wave and the power of the interference wave becomes 10.5 dB. Here, if the F/B ratio of the antenna 8 is set to 10 dB, the ratio CIR becomes equal to 20.5 dB and a ratio CIR equivalent to that at a repetition of seven cells is obtained. Namely, with an equivalent ratio CIR, the frequency repetition number can be reduced to about a half. Accordingly, the channel capacity can be increased about two-fold.

In short, the sixth embodiment is characterized by the fact that the subscriber unit 2 to be accommodated by a base transceiver station (BTS) 3 in a PHS type wireless local loop (WLL) system 1 is provided with a transmitting and receiving antenna 8 which has a directivity oriented to the base transceiver station (BTS) 3.

The above explanation was made relating to the parts mainly concerning the subscriber side in the configuration of the base transceiver station (BTS) 3, therefore, here, a description will be made of the part relating to the public switched telephone network (PSTN) side including the subscriber exchange (LE in FIG. 67) in the configuration of the base transceiver station (BTS) 3. These parts are the multiplexing/demultiplexing unit (MUX/DMUX) 20 in FIG. 1, the multiplexing/demultiplexing unit (MUX/DMUX) 20 shown in FIG. 3, and the parts relating to the same. These related parts are the multiplexing/demultiplexing unit 20 per se and peripheral parts thereof and further the parts located on the public switched telephone network (PSTN) side from the multiplexing/demultiplexing unit (MUX/DMUX) 20, for example, preferably, the parts which should be formed in the base station controller (BSC) 5 shown in FIG. 67. The latter parts which should be formed in the base station controller (BSC) 5 will be explained in detail later as the seventh embodiment, therefore, here, the former parts, that is the multiplexing/demultiplexing unit (MUX/OMUX) 20 and the peripheral parts thereof, will be explained referring to FIG. 3.

Summarizing the matter mentioned referring to FIG. 3, the preferred type of the base transceiver station (UTS) 3 according to the present invention is as follows. Namely, the base transceiver station (BTS) 3 is preferably a base transceiver station (ETS) 3 in a wireless local loop (WLL) system 1 using a PHS system. This base transceiver station (BTS) 3 is constituted by a combination of a first base transceiver station (BTS1) 21 and a second base transceiver station (BTS2) 22. Then, these two base transceiver stations (BTS) 21 and 22 are constituted as follows.

(1) The first base transceiver station (BTS1) 21 is constituted by four cell stations (CS1 to CS4) 4 each accommodating a plurality of subscriber units 2 and a multiplexing/demultiplexing unit (MUX/DMUX) 20 performing the multiplexing and demultiplexing of the digital information transmitted and received between the cell stations (CS) 4 and the subscriber exchange LE.

(2) The second base transceiver station (BTS2) 22 has four cell stations (CS1 to CS4) 4 each accommodating a plurality of subscriber units 2, shares the multiplexing/demultiplexing unit (MUX/DMUX) 20 in the first base transceiver station (BTS1) 21, and transmits and receives the digital information between the cell stations (CS) 4 and the subscriber exchange LE.

In more detail, in the first base transceiver station (BTS1) 21, one of the four cell stations (CS1 to CS4) 4 serves as a master cell station (CS1 in FIG. 4) handling the control-use D-channel signals in addition to the speech-use B-channel signals, while the other three cell stations (CS2 to CS4 in FIG. 4) serve as slave cell stations transmitting and receiving the control-use D-channel signals by inter-processor communication with the master cell station (CS1). Note that, in FIG. 4, the inter-processor communication is communication mainly for transferring the D-channel signals with the microprocessor (MPU) 31 in each cell station (CS) and is shown as the "inter-CS communication" in the figure.

In the second base transceiver station (BTS2) 22 as well, one of the four cell stations (CS1 to CS4) 4 serves as the master cell station (CS1) handling the control-use D-channel signals in addition to the speech-use B-channel signals, while the other three cell stations (CS2 to CS3) serve as slave cell stations transmitting and receiving the control-use D-channel signals by inter-processor communication with this master cell station (CS1).

An explanation will be made next of the components in the first and second base transceiver stations (BTS) 21 and 22 to be arranged at the public switched telephone network (PSTN) side from the components mentioned before, preferably to be provided in the base station controller (BSC) 5 of FIG. 67, as the seventh embodiment.

If simply realizing the configuration of the cell station (CS) intended by the present invention without adding the improvements obtained by the present invention, the configuration as shown in FIG. 2 is obtained. In the configuration of FIG. 2, however, there arises the above problem that a large number of metal cables must be laid or a large number of antennas 7 must be provided.

To solve this problem, as mentioned above, a configuration is adopted of grouping four cell stations (CS1 to CS4) together so as to provide a coupled configuration of base transceiver stations (BTS1+BTS2) as the base transceiver station (BTS)3 (refer to FIG. 3). Here, the first base transceiver station (BTS1) (21) is provided with the multiplexing/demultiplexing unit (MUX/DMUX) connecting channels from the existing network (public switched telephone network PSTN) and the cell stations (CS) and thereby the transmission digital data is distributed to the transmission digital data to the base transceiver station BTS1 (21) and the transmission digital data to the base transceiver station BTS2 (22).

By configuring the base transceiver station (BTS) 3 in this way, when performing the function of an existing U'-interface line, that is, the function of (2B+D)×2 (FIG. 2) per cell station (CS), by expanding this cell station (CS) to eight cell stations, worth, a capacity of 8×(2B+D)×2 can be covered by a single PCM channel of 2 Mbps. Namely, (2B+D)×2×4 CS×2=32B+8D, where D=16 kbps
is made (2B+D)×2×4 CS×2=32B+2d, where d=64 kbps.
Since, in the radio zone 6, one control (D) channel is formed for four cell stations (CS) and two control (D) channels are used for eight cell stations (CS), the number of usable speech (B) channels becomes 32B−2B=30 B-channels. This is realized by the 32TS (30 ch/1 control channel/1 synchronization channel) of a 2M line (PCM line of 2 Mbps mentioned above (TS is a time slot, and 1TS corresponds to 1 channel (ch)). This is shown in FIG. 42.

Figure 42:
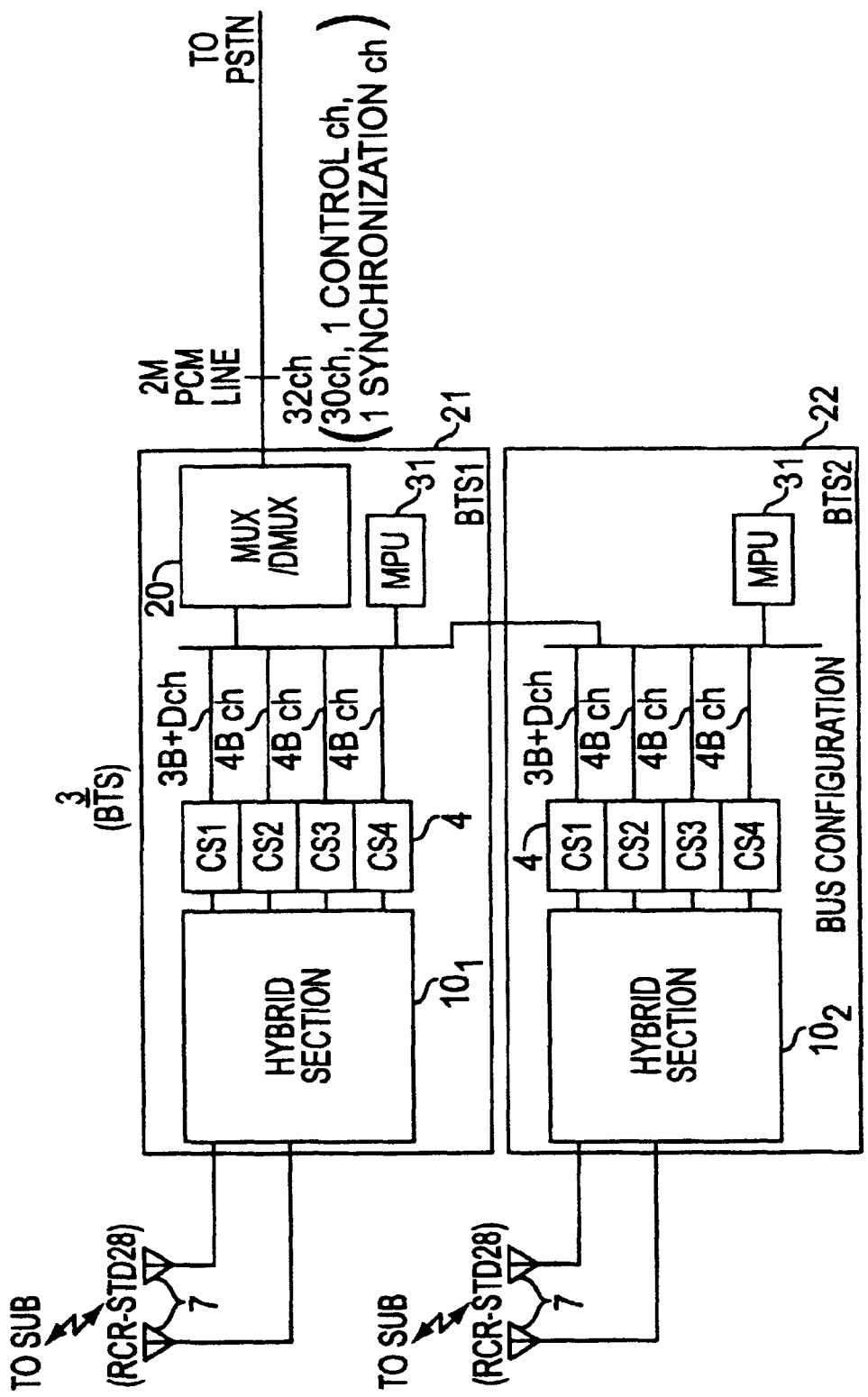
FIG. 42 is a view of a channel (Ch) configuration in information transmitted between a public switched telephone network and a base transceiver station.

FIG. 42 is a view of the channel (ch) configuration of the transmission information between the public switched telephone network (PSTN) and the base transceiver station (BTS). In the figure, "control ch" means the D-channel. Note that, in the configuration of the figure, the left and right are reversed from the configuration shown in the figures heretofore. The left side is defined as the subscriber (SUB) side, and the right side is defined as the public switched telephone network (PSTN) side, This is for making this configuration match with the configuration of FIG. 43 which will be explained next.

Figure 43:
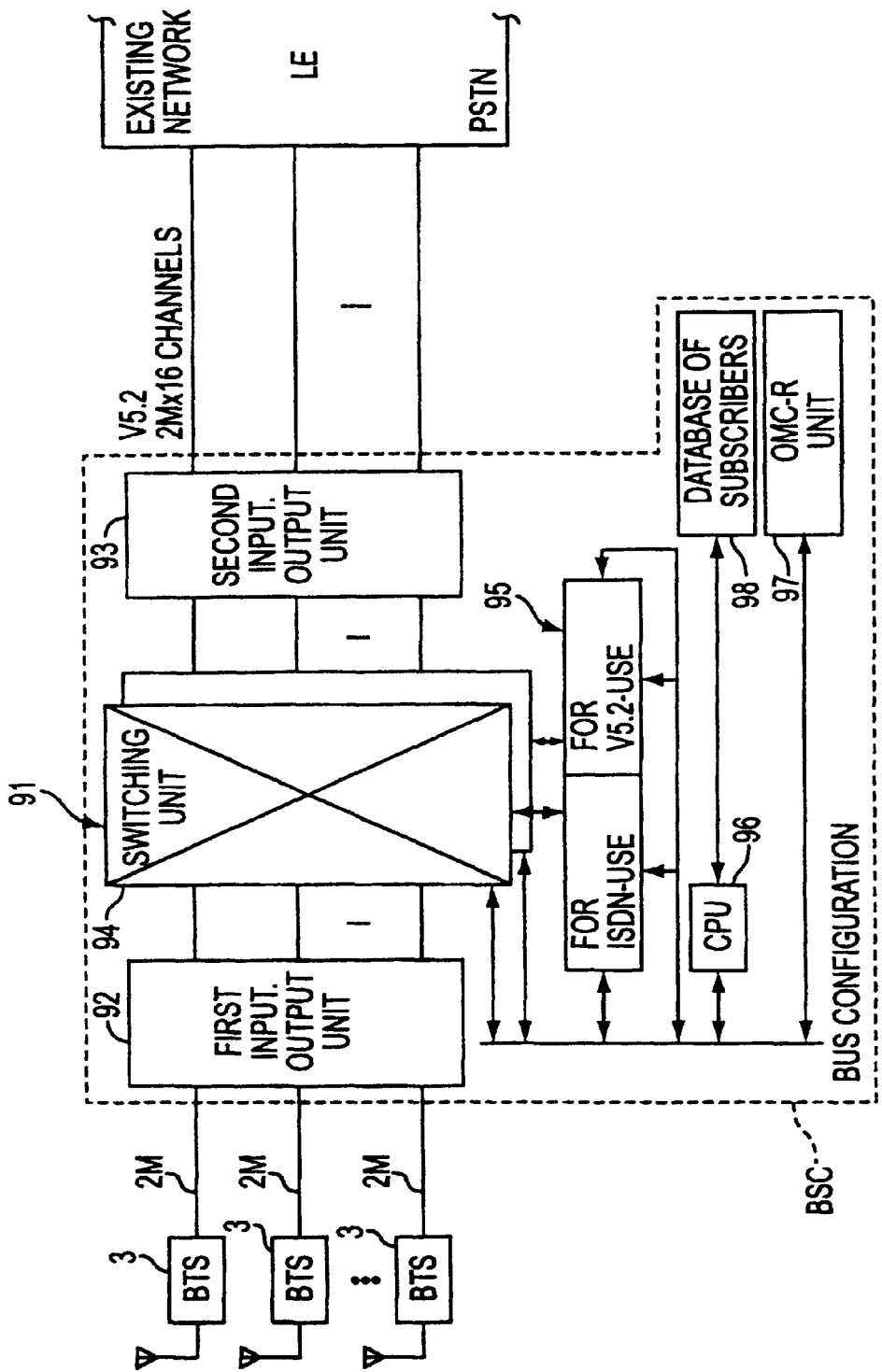
FIG. 43 is a view of a seventh embodiment according to the present invention.

FIG. 43 is a view of the seventh embodiment according to the present invention. The base transceiver station (BTS) 3 in the PHS type wireless local loop (WLL) system 1 according to this seventh embodiment is characterized in that it is connected to the public switched telephone network (PSTN) via interface converting equipment 91 for converting the protocol used in the existing public switched telephone network (PSTN) to the protocol used in the wireless local loop (WLL) system 1 and vice versa. This interface converting equipment 91 is preferably arranged in the base station controller (BSC).

Figure 44:
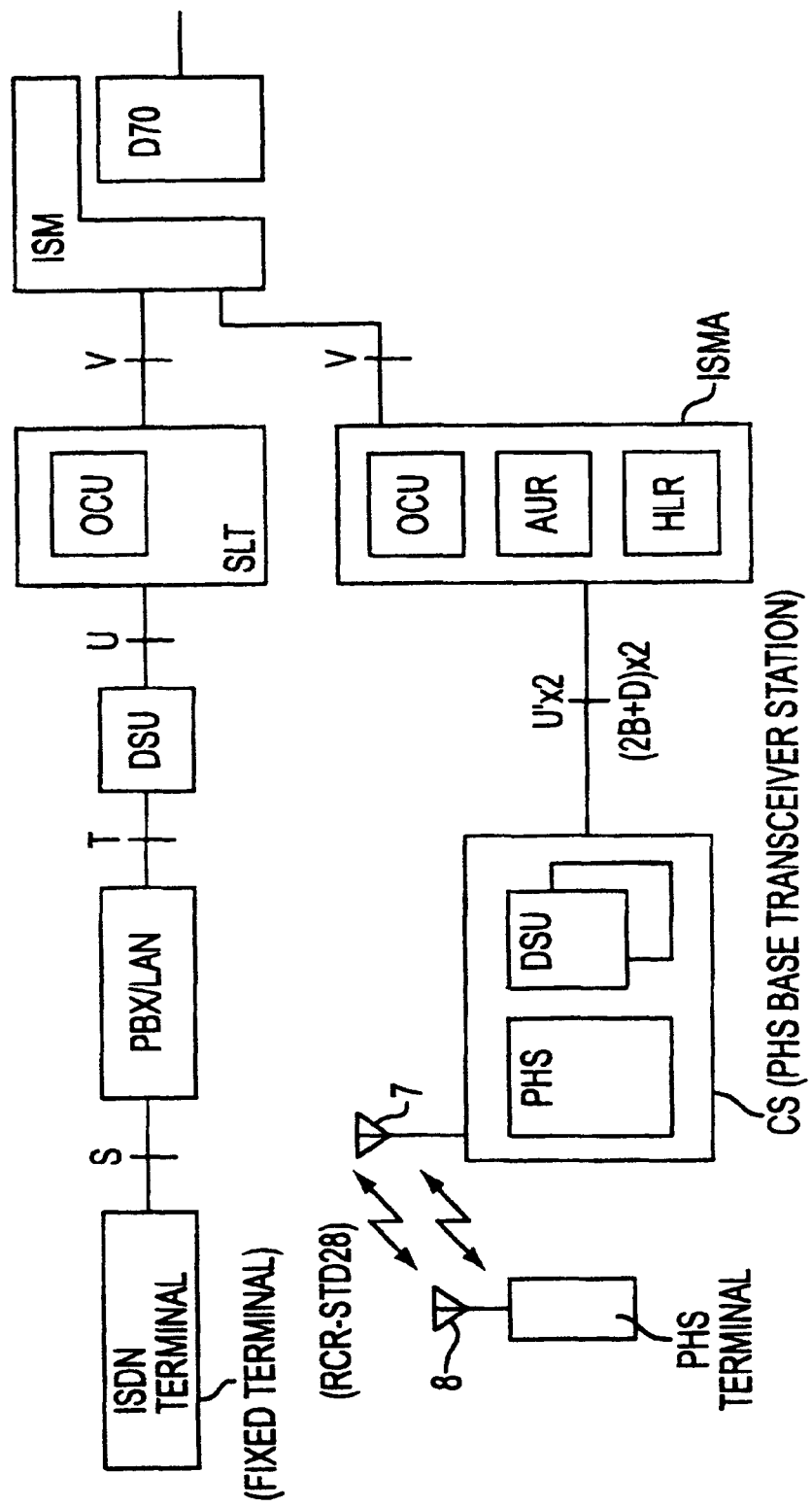
FIG. 44 is a view for explaining the configuration of the PHS networks at the present time.

Before explaining the configuration of FIG. 43 in more detail, FIG. 44 will be referred to.

FIG. 44 is a view for explaining the configuration of a current type of a PHS network. In the figure, the configurations of the parts are as follows.

ISM is an I-interface module which is added to a D70 exchange, for providing ISDN service.

ISMA is an I-interface module (ISM) adapter for connecting a cell station and I-interface module (ISM) in a PHS service.

SLT is a subscriber line terminating unit.

OCU is a unit for terminating intra-office lines,

AUR is a function unit for mobile guarantee.

DSU is a unit for terminating the metallic digital subscriber line.

HLR is a home-location register, that is, a data base recording the billing information etc, PBX/LAN is a unit for performing the line concentration and exchange processing.

Further, S, T, U, U', and V are reference points, in which S and T are ISON interfaces and U, U', and v are transmission line interfaces.

In FIG. 44, the PHS system is connected to the subscriber exchange LE (D70) through the I-interface module adapter (ISMA) and the I-interface module (ISM) and accesses the public switched telephone network (PSTN).

Where the PHS system is to be introduced as a wireless local loop (WLL) system, the first condition is that it can be connected to a public switched telephone network (PSTN), but the PHS networks of the present stage presuppose the existence of an expensive ISDN network. Therefore, in practice it is difficult to introduce the wireless local loop (WLL) system 1 into for example the developing countries.

Further, the PHS networks of the present stage provide a U'-interface line for every cell station (CS), but when considering the traffic conditions of a wireless local loop (WLL) system, two U'-interfaces×2 lines are not sufficient. The base transceiver station therefore has to accommodate a plurality of cell stations (CS).

Therefore, in order to introduce a wireless local loop (WLL) system using a PHS network into the existing public switched telephone network (PSTN), as a public switched telephone network (PSTN) in the broad sense of the term, it becomes necessary to mount a general (existing) interface in place of a U'-interface. However, the PHS network per se is based on the standard RCR-STD28, therefore the ISDN protocol must be processed.

Due to this situation, the interface converting equipment 91 shown in FIG. 43 was introduced to deal with the tasks 3) and 4). This performs the mutual conversion (processing) between the protocol of the existing public switched telephone network (PSTN) and the protocol of the ISDN upon which the PHS system is based. The protocol of the existing network is for example a V5.2 interface standardized by for example ITU-T etc.

The interface converting equipment 91 shown in FIG. 43 basically comprises the following components:

(1) A first input/output unit 92 connected to the wireless local loop (WLL) system 1 side.

(2) A second input/output unit 93 connected to the public switched telephone network (PSTN) side.

(3) A switching unit 94 inserted between the first input/output unit 92 and the second input/output unit 93.

(4) A layer 2 terminating unit 95 for terminating the digital signal from the wireless local loop (WLL) system 1 side obtained via the switching unit 94 and the digital signal of each layer 2 (retransmission control etc. as an example) from the public switched telephone network (PSTN) side, (5) A central processing unit (CPU) 96 which processes the message (call origination, call destination, etc.) of the layer 3 obtained at the layer 2 terminating unit 95, converts this to the digital data of the layer 2 again, and transmits the same via the switching unit 94 to the public switched telephone network (PSTN) side and wireless local loop (WLL) system 1 side, respectively.

Note that, the central processing unit (CPU) 96 works with the subscriber data base holding information on the individual subscribers.

More preferably, this interface converting equipment 91 is constituted including a maintenance and operating unit 97 which performs at least monitoring and control of the interface converting equipment 91 per se and the base transceiver station (BTS) 3 and management and maintenance of the subscriber information (held in the subscriber data base 98). This maintenance and operating unit 97 may be a general operation and maintenance controller (radio) (OMC-R).

More specifically, as shown in FIG. 43, the interface converting equipment 91 accommodates a plurality of base transceiver station (BTS) 3 on the subscriber line side and is constituted by first and second input/output units 92 and 93 which input and output the digital information (V5.2 and 2M) from the existing network or the base transceiver stations (BTS), an L2 terminating unit 95 for terminating the L2 (layer 2) of the digital information thereof (including V5.2 use and ISDN use), a central processing unit (CPU) 96 for processing the L3 (layer 3), a switching unit 94 for switching the digital information to the destination line according to the control information processed in the central processing unit (CPU) 96, and the maintenance and operating unit (OMC-R) 97 for performing monitoring and control of the interface converting equipment 91 and the base transceiver station (BTS) 3 and the maintenance and management of the subscriber information.

Figure 45:
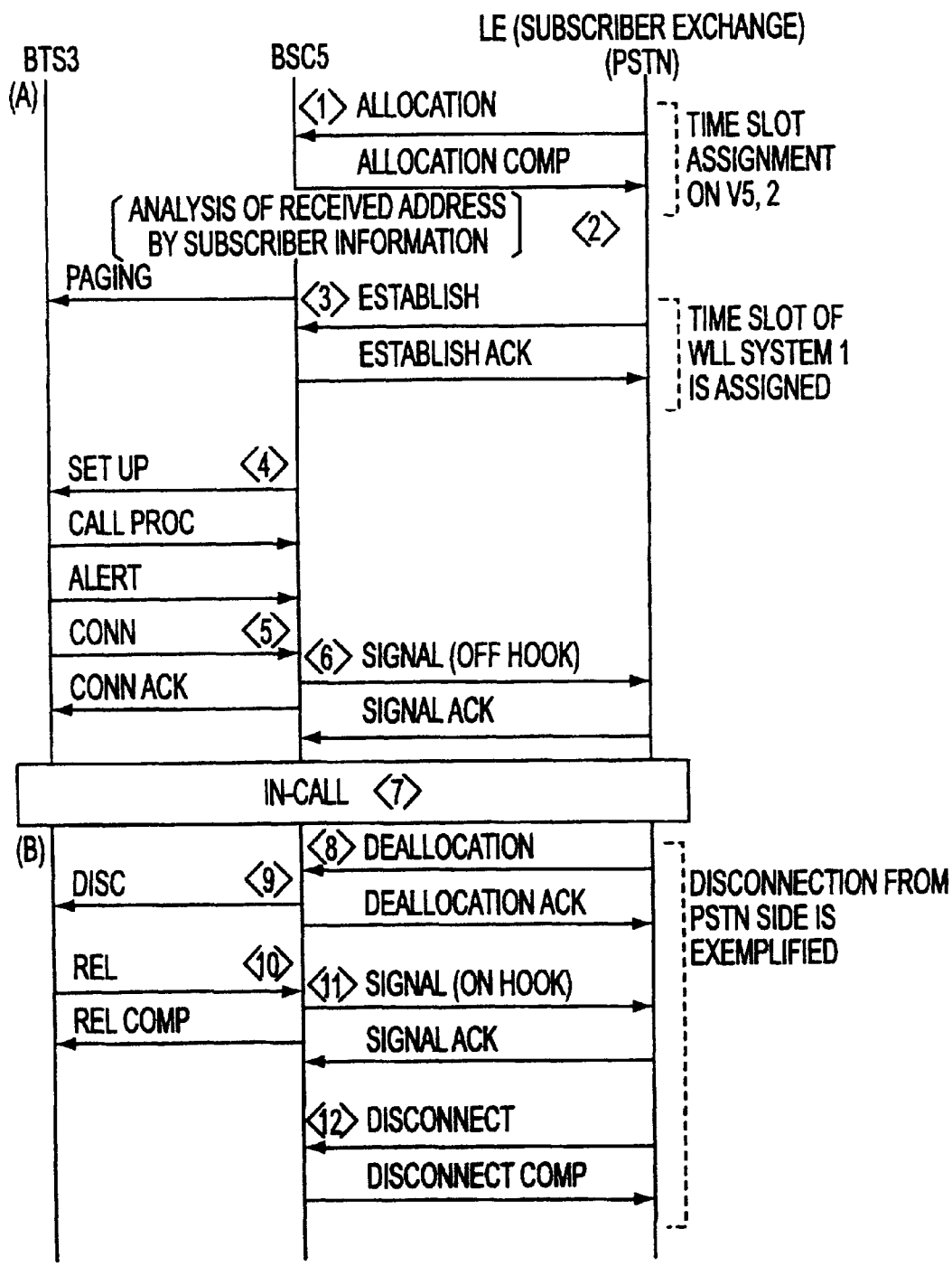
FIG. 45 is a sequence diagram of an example of call processing by a base station controller having interface converting equipment.

As the supplementary explanation of the seventh embodiment, an example of the call processing where the interface converting equipment 91 is arranged in the base station controller (BSC) 5 will be shown in FIG. 45, FIG. 45 is a sequence diagram of an example of the call processing by a base station controller (BSC) having interface converting equipment.

(A) The processing in the base station controller (BSC) S in the case of call origination from the public switched telephone network (PSTN) is as follows.

(1) A call origination message is received from the subscriber exchange (LE). At this time, the time slot (TS) on the V5.2 interface is allocated by ALLOCATION. As an example, the 14th time slot TS30 (LE No. 14-TS30) in the 16 2M PCM lines in V5.2 is allocated.

(2) The base station controller (BSC) 5 searches for the base transceiver station (BTS) 3 accommodating the call destination subscriber, At this time, the subscriber data base 98 in the base station controller (BSC) 5 is used.

(3) A request is received for establishment of communication lines in the wireless local loop (WLL) system 1. "ESTABLISH" is the request for establishment of a time slot (TS) of the subscriber side line from the base station controller (BSC) 5. As one example, the 16th time slot TS10 (BTS No. 16TS10) in the 16 2M PCM lines between the base station controller (BSC) and base transceiver station (BTS) is allocated.

(4) The calling information is transmitted to the control ch (D-channel) of the allocated 2M line. "SET UP" means the call set-up with respect to the subscriber (SUB) and transmits the destination subscriber number.

(5) A response from the call termination side (OFF HOOK of the subscriber terminal (PFIS) 2 in wireless local loop system) is received. "CONN (CONNECTION)" is the acknowledge notification from the destination side.

(6) A response (OFF HOOK) from the destination side is notified to the subscriber exchange (LE). "SIGNAL" is the OFF HOOK notification on the V5.2 interface.

(7) By setting the switching between the No. 14-TS30 on the subscriber exchange (LE) side and No. 16-TS10 on the base transceiver station (BTS) 3 side (connecting the two), the communication between the two is started.

(B) The processing at the base station controller (BSC) 5 at the time of the disconnection from public switched telephone network (PSTN) is as follows.

(8) A request is received for releasing the time slot (TS) (LE NO. 14-TS30) allocated on the V5.2 interface. "DEALLOCATION" is the release of the time slot (TS) established by "ALLOCATION".

(9) Call disconnection is requested to the subscriber terminal (2) in the wireless local loop (WLL) system 1 since the communication is ended. "DISC (DISCONNECTION)" is the request for the call disconnection.

(10) A request for call release (ON HOOK of the subscriber terminal (2) in the wireless local loop (WLL) system 1) is received. "REL (RELEASE)" is the request for the channel release and call number release.

(11) ON HOOK of the subscriber terminal (2) in the wireless local loop (WLL) system 1 is notified to the subscriber exchange (LE) side.

(12) A request is received for release of the communication time slot (BTS NO. 16-TS10) in the wireless local loop (WLL) system 1. "DISCONNECT" is the request for release of the time slot (TS) established by "ESTABLISH" and releases the allocated time slot (TS).

Paying attention to the multiplexing/demultiplexing unit (MUX/DMUX) 20 again, this will be considered in further detail as an eighth embodiment.

In the base transceiver station (BTS) 3 of FIG. 2 upon which the present invention is predicated, each cell station (CS) 4 is configured so as to enable an accommodation of (2B+D)×2 channels, i.e., an ISDN basic interface. To secure a total of eight cell stations' worth of capacity (30 telephone lines worth of capacity), an ISDN base interface×16 lines become necessary and the efficiency is poor. Therefore, by just using 2 Mbps lines as the 30 telephone lines worth of interface and realizing the base transceiver station (BTS) by completely new configuration, it is possible to secure the line capacity per se. However, a completely new design of a base transceiver station (BTS) has many demerits since none of the existing resources are actively utilized, For this reason, desirably a configuration assuming an accommodation of 2 Mbps lines is adopted, while utilizing most of functions of present stage cell stations (CS) (other than the digital network interface).

Figure 46:
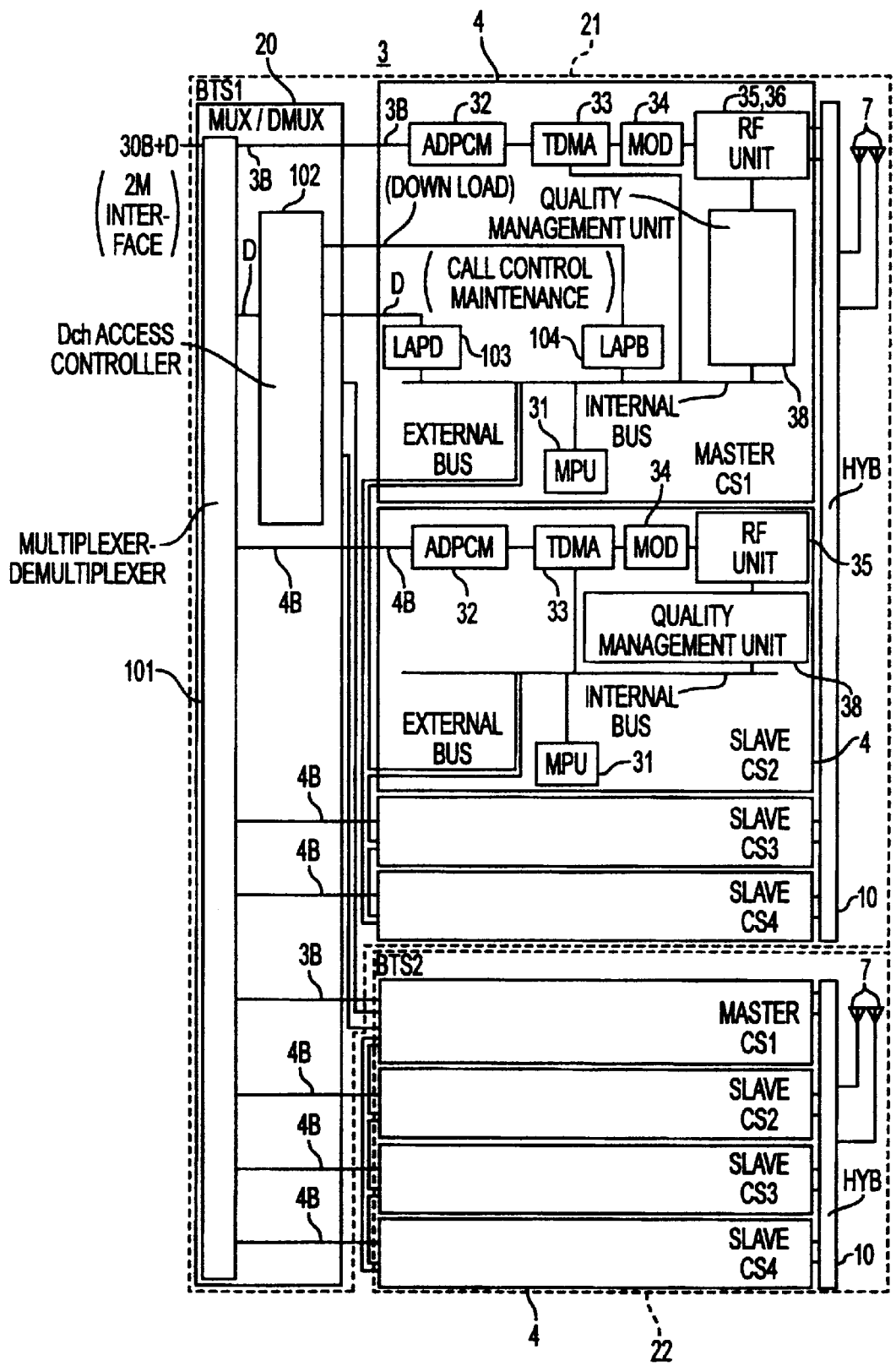
FIG. 46 is a view of an eighth embodiment according to the present invention.

FIG. 46 is a view of the eighth embodiment according to the present invention and corresponds to FIG. 4 and FIG. 5 etc. Components similar to those mentioned above are represented by the same reference numerals or symbols. The letters HYB, however, were used for the hybrid section 10 in for example FIG. 3. Further, the transmitting amplifier 35 and receiving amplifier 36 of FIG. 4 were described as RF units 35 and 36 together. Further, the component constituted by the SD selection unit 38 and the peripheral parts thereof in FIG. 4 was indicated as the quality management unit 38.

The point which should be noted in FIG. 46 is, first, that the multiplexing/demultiplexing unit (MUX/DMUX) 20 is constituted by a multiplexer/demultiplexer 101 and a D-channel (ch) access control unit 102. Further, it should be noted that components not shown in other figures are shown, that is, a LAPD processing unit 103 for a Link Access Procedure on the D-channel (LAPD) and a LAPB processing unit 104 for a Link Access Procedure Balanced (LAPB).

As shown in the figure, in this configuration, the digital network interface unit in the current cell station is eliminated and a multiplexing/demultiplexing unit (MIJX/DMUX) 20 including a Dch access control unit 102 is used.

The multiplexing/demultiplexing unit (MUX/DMUX) 20 introduces a 2M interface (30B+D) from the public switched telephone network (PSTN) side, for example, the base station controller (BSC) 5 side. The multiplexer/demultiplexer 101 separates the signals into two B-channel systems composed by both 3B×1 channels and 4B×3 channels and one D-channel system, then connects the B-channel systems to the cell stations (CS) in the base transceiver station (BTS1) 21 and the cell stations (CS) in the base transceiver station (BTS2) 22 and, at the same time, connects the D×1 channel system to the master cell station (CS1) 4 in the base transceiver station (BTS1) 21 and the master cell station (CS1) 4 in the base transceiver station (BTS2) 22 via the Dch access control unit 102.

Namely, similar processing is performed for also the digital information transferred in the reverse direction (direction of cell stations (CS) in each base transceiver station (BTS1 or BTS2)→base station controller (BSC) 5).

Further, the Dch access control unit 102, by the method mentioned later, separates the D-channel signal (64 kbps) on the base station controller (BSC) 5 side into the D-channel signals (each 16 kbps) for each master cell station CS1 side in the base transceiver stations BTS1 and BTS2.

Figure 47A:
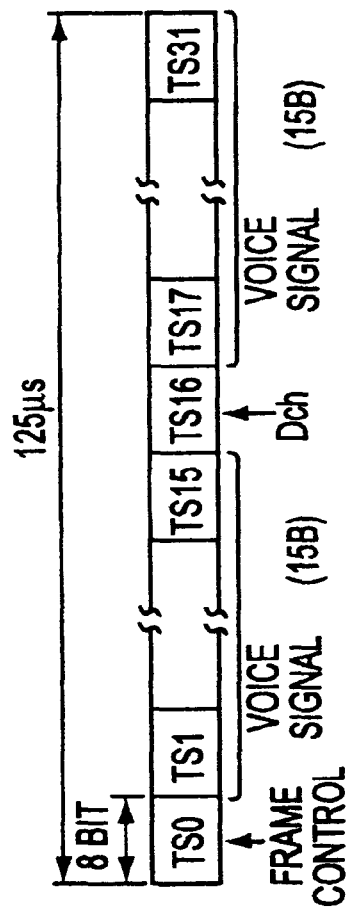
FIG. 47A is a view of a signal format of one frame under a 2M interface.
Figure 47B:
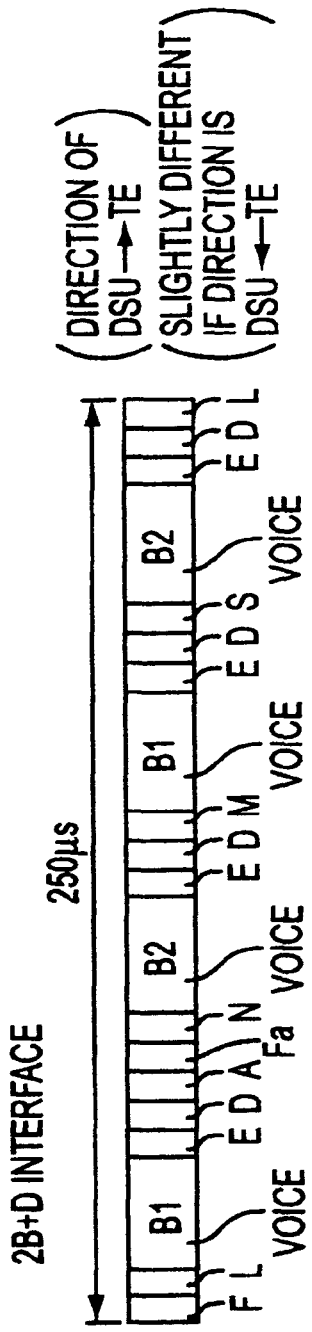
FIG. 47B is a view of the signal format under a typical 2B+D interface.

FIG. 47A is a view of an example of the signal format of one frame under an 2M interface; and FIG. 47B is a view of the signal format under a typical 2B+D interface. The signal format of FIG. 47A appears on the 2M interface at the top left of FIG. 46, and the signal format of FIG. 47B is the format of 2B+D indicated at the left end of FIG. 2. This 2B+D format is well known, so the explanation will be omitted. "DSU" indicated on right end of FIG. 47B, however, is a digital service unit (digital line terminating unit), and "TE" is a terminal equipment.

Referring to FIGS. 47A and 47B, one frame (125 $\mu$s) is composed of 32 time slots (TS0 to TS31). The data for the frame control is placed in the time slot TS0 of the header thereof, the data of the D-channel is placed in the time slot TS16 at the center, and the data of the 15+15 B-channels containing the voice and data are placed in the remaining 30 time slots (TS1 to TS15 and TS17 to TS31).

Summarizing this, in this eighth embodiment, the multiplexing/demultiplexing unit (MUX/DMUX) 20 is constituted including a multiplexer/demultiplexer 101 for demultiplexing the digital multiplex signal from the public switched telephone network (PSTN) side, for example, the base station controller (BSC) 5 or multiplexing signals into the digital multiplex signal to this public switched telephone network (PSTN) side and a D-channel access control unit 102 to be connected to this. The multiplexer/demultiplexer 101 separates the digital multiplex signal of 30B+1P, comprised by 30 B-channels (speech channels) and one D-channel (control channel) into two B-channel systems comprised of 3B×1 channel and 4B×3 channels and one D-channel system, then distributes the separated 48-channels to the three slave cell stations (CS2 to CS4) 4 provided in the first base transceiver station (BTS1) 21 and the three slave cell stations (CS2 to CS4) 4 provided in the second base transceiver station (BTS2) 22, respectively. Simultaneously, it distributes the separated 3B-channel to the master cell stations (CS1) in the first and second base transceiver stations.

On the other hand, the D-channel access control unit 102 connects the D-channel system to the master cell station (CS1) in the first base transceiver station (BTS1) and the master cell station (CS1) in the second base transceiver station (BTS2).

Figure 48:
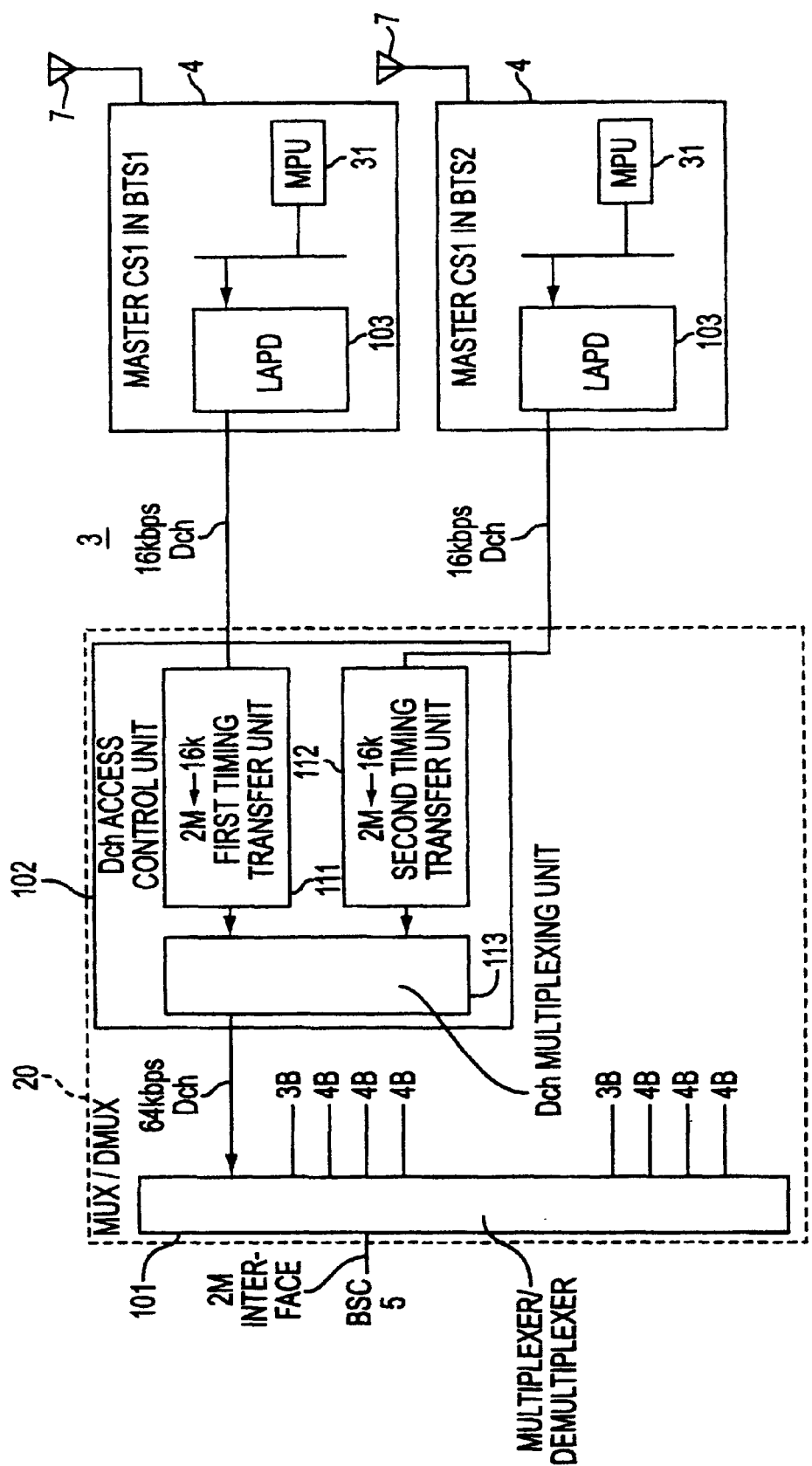
FIG. 48 is a view of a concrete example (upstream line) of a Dch access control unit 102 in FIG. 46.

FIG. 48 is a view of a concrete example (upstream line) of the Dch access control unit 102 in FIG. 46. The newly introduced components in the figure are a first timing transfer unit 111, a second timing transfer unit 112, and a D-channel (ch) multiplexing unit 113.

The figure shows the processing of the D-channel in the direction of the base transceiver station (BTS) 3→base station controller (BSC) 5 (where only the maintenance information of the cell stations (CS) 4 in FIG. 67 is communicated with the base station controller (BSC) 5). Where only the maintenance information of the cell stations (CS) 4 is communicated with the base station controller (BSC) 5, it is not necessary to add new maintenance information at the multiplexing/demultiplexing unit (MUX/DMUX) 20 (including the Dch access control unit 102) so it is sufficient if the D-channel signal from the master cell stations (CS1) in the base transceiver station (BTS1) 21 and the base transceiver station (BTS2) 22 be transferred onto the 2M interface at the prescribed timing.

The D-channel signals (16 kbps) from the master cell stations (CS1) in the base transceiver station (BTS1) 21 and base transceiver station (BTS2) 22 are transferred onto the timing of 2M at the first and second timing transfer units 111 and 112 in the Dch access control unit 102, then placed in the predetermined time slots (each corresponding to 16 kbps) assigned in the 2M interface in a fixed manner at the D-channel (ch) multiplexing unit 113 and sent to the multiplexer/demultiplexer 101 as a 64 kbps D-channel signal.

On each 2M side of the first and second timing transfer units 111 and 112 and the Dch multiplexing unit 113, the D-channel signals (each having 16 kbps) from the master cell stations (CS1) in the base transceiver station (BTS1) 21 and base transceiver station (BTS2) 22 occupy the 16 kbps time slots (in the form of a burst) on the 2 Mbps bearer speed line.

Summarizing the above configuration, the D-channel access control unit 102 multiplexes the D-channel signal at a speed s from the master cell station (CS1) 4 in the first base transceiver station (BTS1) 21 and the D-channel signal at a speed s from the master cell station (CS1) 4 in the second base transceiver station (BTS2) 22 and further multiplexes the same into the digital multiplex signal at a speed S (S>s) to the public switched telephone network (PSTN) side (base station controller (BSC) 5 side) via the multiplexer/demultiplexer 101. The speed S is 2 Mbps and the speed s is 16 kbps in the above example.

Figure 49:
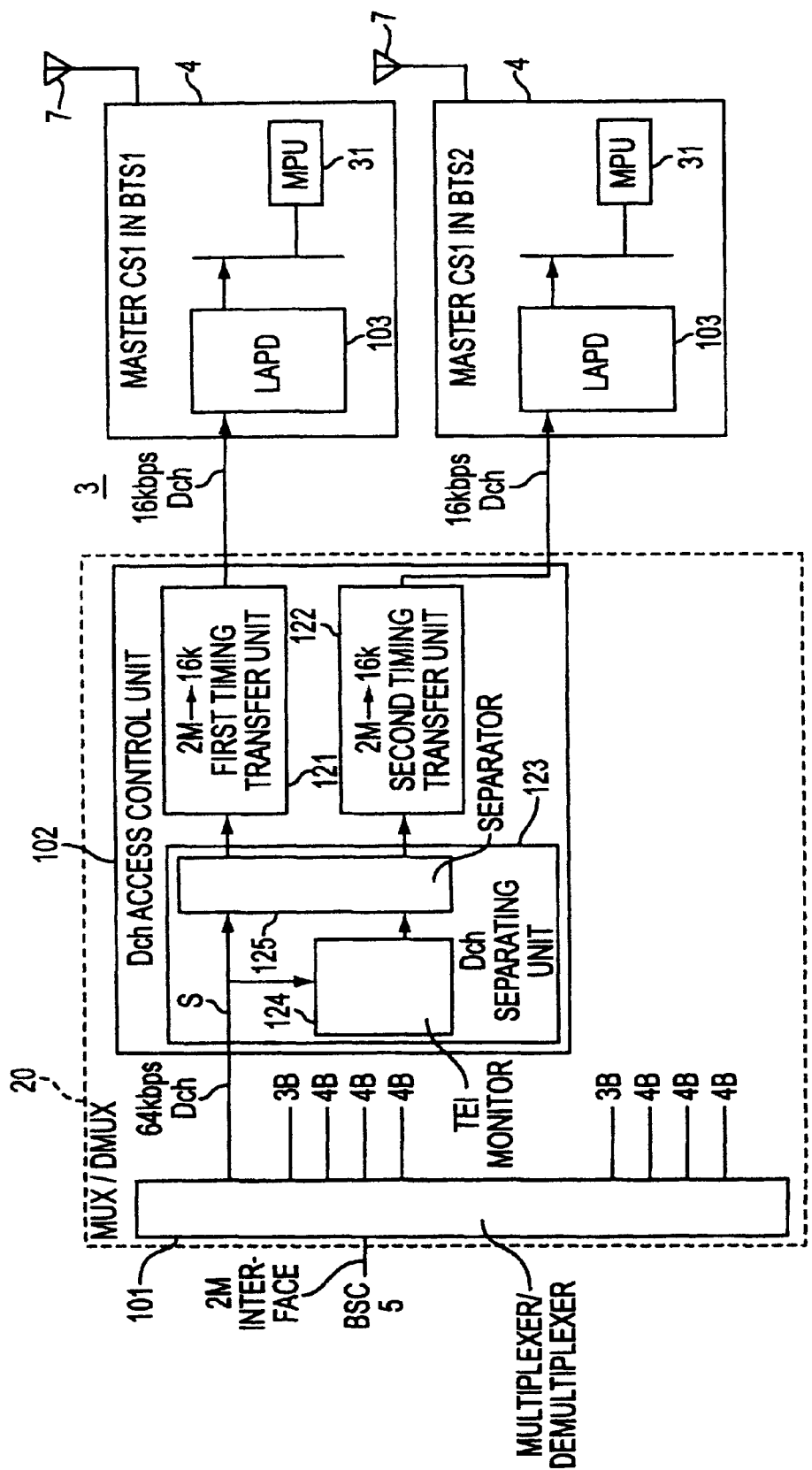
FIG. 49 is a view of a concrete example (downstream line) of the Dch access control unit 102 in FIG. 46.

FIG. 49 is a view of a detailed example (downstream line) of the Dch access control unit 102 in FIG. 46. The newly introduced components in the figure are a first timing transfer unit 121, a second timing transfer unit 122, a D-channel (ch) separating unit 123, a separator 125, and a terminal endpoint identifier (TEI) monitoring unit 124.

In the eighth embodiment, the main points, particularly those proposed through FIG. 49, are the following points (1), (2), . . . , (6).

(1) The D-channel access control unit 102 converts the D-channel signal of the speed S obtained by demultiplexing the digital multiplex signal on the public switched telephone network (PSTN) side (base station controller (BSC) 5 side) by the multiplexer/demultiplexer 101 to a first D-channel signal of the speed s and a second D-channel signal of the speed s and distributes the same to the master cell station (CS1) 4 in the first base transceiver station (BTS1) 21 and the master cell station (CS1) 4 in the second base transceiver station (BTS2) 22.

(2) The terminal endpoint identifiers (TEI) under the LAPD are allocated to the master cell station (CS1) 4 in the first base transceiver station BTS1 (21) and the master cell station (CS1) 4 in the second base transceiver station BTS2 (22) in a fixed manner. Then, the D-channel access control unit 102 separates, according to the TEI, the D-channel signal of the speed S obtained by demultiplexing from the digital multiplex signal from the public switched telephone network (PSTN) side (base station controller (BSC) 5 side) by the multiplexer/demultiplexer 101 to a first D-channel signal of the speed s and a second D-channel signal of the speed s and distributes the same to the master cell station (CS1) 4 in the first base transceiver station (BTS1) 21 and the master cell station (CS1) 4 in the second base transceiver station (BTS2) 22, respectively.

(3) The base transceiver station (BTS) 3 receives the digital multiplex signal obtained by placing the first D-channel signal oriented to the first base transceiver station (BTS1) 21 and the second D-channel signal oriented to the second base transceiver station (BTS2) 22 in the time slot of the D-channel from the public switched telephone network (PSTN) side (base station controller (BSC) 5 side) according to a predetermined timing rule. There, the D-channel access control unit 102 automatically distributes the received first D-channel signals and second D-channel signals to the first base transceiver station (BTS1) 21 and the second base transceiver station (BTS2) 22 according to the above timing rule, respectively.

(4) The time slot of the D-channel is divided into a plurality of blocks according to the above predetermined timing rule. The first D-channel signal oriented to the first base transceiver station (BTS1) 21 is assigned to the first block thereof, the second D-channel signal oriented to the-second base transceiver station (BTS2) 22 is assigned to the second block, and the other blocks are defined as empty blocks.

(5) When the base transceiver station (BTS) 3 receives a digital multiplex signal having a continuous frame configuration from the public switched telephone network (PSTN) side (base station controller (BSC) 5 side), the above predetermined timing rule is determined according to a repeating series of frames, the first D-channel signal oriented to the first base transceiver station (BTS1) 21 is placed in the time slot of the D-channel in the first frame in the series of frames, the second D-channel signal oriented to the second base transceiver station (BTS2) 22 is placed in the time slot of the D-channel in the second frame, and the time slots of the D-channel in the third frame and subsequent frames are defined as empty time slots.

(6) The D-channel access control unit 102 manages and controls the terminal endpoint identifier (TEI) in the LAP0 on the public switched telephone network (PSTN) side (base station controller (BSC) S side) and terminal endpoint identifiers (TEI) in the LAPD on each master cell station (CS1) side in the first and second base transceiver stations (BTS1 and BTS2) 21 and 22, replaces the terminal endpoint identifiers (TEI), and terminates the LAPD on the public switched telephone network (PSTN) side and the LAPD on each master-cell station side.

Referring to FIG. 49, here, the processing of the D-channel in the direction of the base station controller (BSC) 5→base transceiver station (BTS) 3 (where only the maintenance information of the cell stations (CS) 4 in FIG. 67 is transferred with the base station controller (BSC)) is shown. Basically, the D-channel equivalent to 64 kbps signal extracted from the 2M interface is allocated as D-channels each 16 kbps worth to the master cell stations (CS1) in the base transceiver station (BTS1) 21 and base transceiver station (BTS2) 22 (the above point (1)).

The processing for this allocation is different according to the method of management of the terminal endpoint identifiers (TEI) in the LAPD.

When the terminal endpoint identifiers (TEI) are allocated to the cell stations (CS) in the base transceiver station (BTS1) 21 and base transceiver station (BTS2) 22 in a fixed manner (corresponding to the above point (2)), the D-channel (ch) separating unit 123 in the Dch access control unit 102 monitors the terminal endpoint identifier (TEI) part in the signal S sent through the 2M interface by the terminal endpoint identifier (TEI) monitoring unit 124 and based on the terminal endpoint identifier (TEI) allocates the signal S to the master cell stations (CS1) in the base transceiver station (BTS1) 21 and base transceiver station (BTS2) 22. For example, when the terminal endpoint identifier (TEI)=1 (first ID), the signal is allocated to the base transceiver station (BTS1) 21, while when the terminal endpoint identifier (TEI)=2 (second ID), it is allocated to the base transceiver station (BTS2) 22. In this case, it becomes possible for the base station controller (BSC) 5 to perform its processing by a single LAPD line without particularly distinguishing between the baste transceiver station (BTS1) 21 or base transceiver station (BTS2) 22.

Where the terminal endpoint identifiers (TEI) can not be fixedly allocated (corresponding to the above point (3)), the terminal endpoint identifiers (TEI) can be automatically allocated (for example the base station controller (BSC) 5 side can automatically allocate the terminal endpoint identifiers (TEI)). In this case, the D-channel signals oriented to the master cell stations (CS1) in the base transceiver station (BTS1) 21 and base transceiver station (BTS2) 22 are placed on the 2M interface according to a predetermined certain timing rule, and the Dch separating unit 123, according to the timing rule, allocates the first and second D-channel signals Dch to the master cell stations (CS1) in the base transceiver station (BTS1) 21 and base transceiver station (BTS2) 22 via the separator 125, In this case, the base station controller (BSC) 5 has a LAPD line for each of the base transceiver station (BTS1) 21 and base transceiver station (BTS2) 22.

A slightly more detailed explanation will be given next of the case where the separation according to the terminal endpoint identifiers (TEI) by the terminal endpoint identifier (TEI) monitoring unit 124 is performed in the Dch separating unit 123.

(a) Case of fixed (or manual) allocation of the terminal endpoint identifiers (TEI) (the above point (2)).

The LAPD frames oriented to the base transceiver station (BTS1) 21 and base transceiver station (BTS2) 22 are irregularly mixed in the time slot TS16 on the 2M interface (downstream) (refer to FIG. 47A). Therefore, the Dch separating unit 102 separates them using the terminal endpoint identifiers (TEI).

(b) Case of automatic allocation of terminal endpoint identifiers (TEI) (the above point (3)).

For example, the base station controller (BSC) 5 regularly places the LAPD frames oriented to the base transceiver station (BTS1) 21 and base transceiver station (BTS2) 22 in the time slot TS16 on the 2M interface (downstream).

In the first example, the time slot TS16 is divided into 2 bits×4 blocks. The first block is used for the base transceiver station (BTS1) 21, the second block is used for the base transceiver station (BTS2) 22, the third block is used as an empty block, and the fourth block is used as an empty block (the above point (4)).

In the second example, the frames shown in FIG. 47A are regarded as one unit, four frames are regarded as one cycle, the time slot TS16 of the first frame is used for the base transceiver station (BTS1) 21, and the time slot TS16 of the second frame is used for the base transceiver station (BTS2) 22. Then, the Dch separating unit 123 separates the frames according to the above timing rule (TS position) (the above point (5)).

Figure 50:
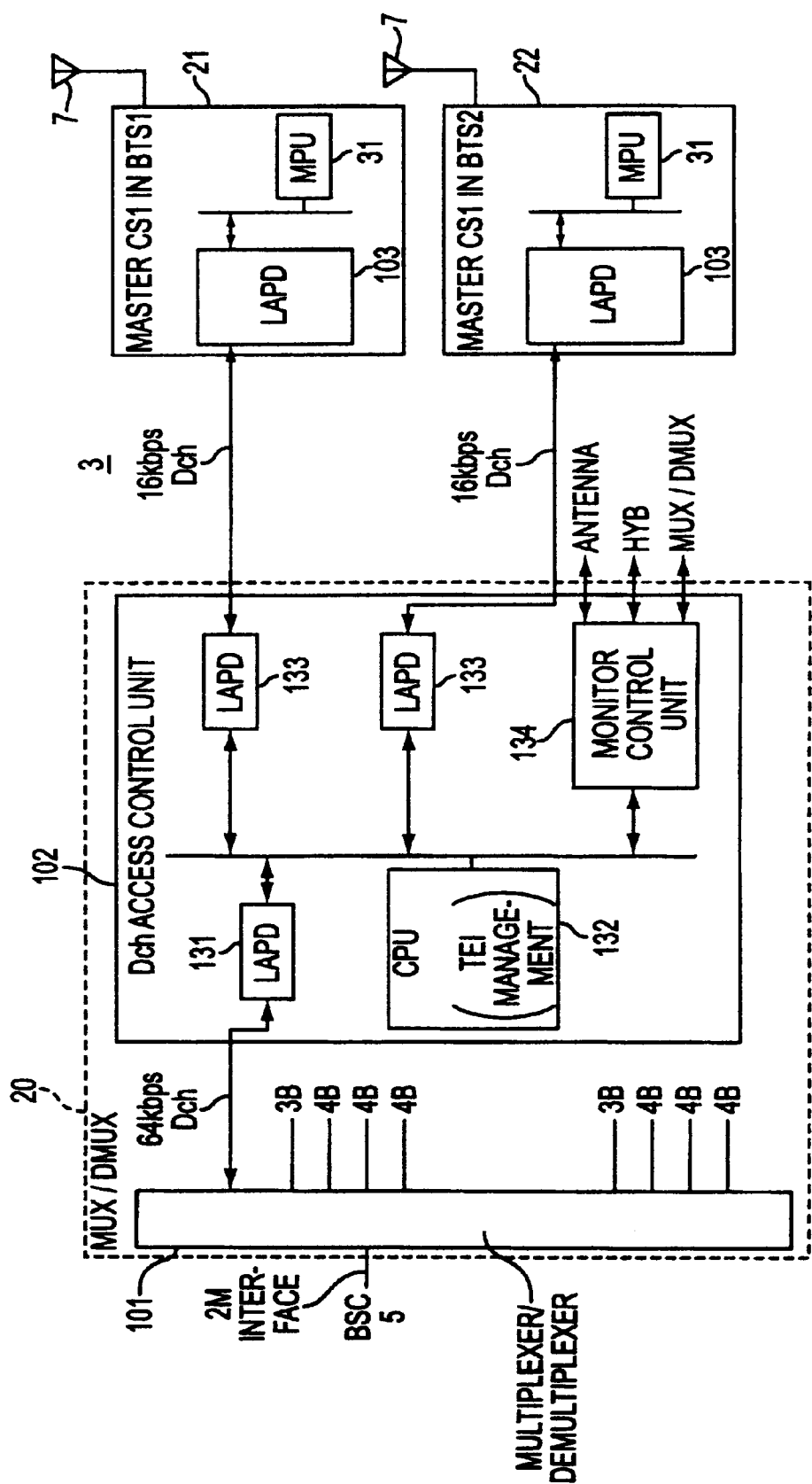
FIG. 50 is a view for explaining an expanded function of the Dch access control unit 102 in FIG. 46.

FIG. 50 is a view explaining the expanded function of the Dch access control unit 102 in FIG. 46. In the figure, the newly introduced elements are the LAPD processing units 131 and 133, the central processing unit (CPU, mainly for management of terminal endpoint identifiers (TEI)) 132, and a monitoring control unit 134.

In the eighth embodiment, the main points particularly proposed through FIG. 50 are the following points (7) and (8).

(7) The D-channel access control unit 102 once terminates the first and second D-channel signals of the speed s respectively received from the master cell station (CS1) 4 in the first base transceiver station (BTS1) 21 and the master cell station (CS1) 4 in the second base transceiver station (BTS2) 22, multiplexes the same together with the monitoring control signal containing various monitoring control information generated in the related base transceiver stations (BTS) 3, and inserts the result as the D-channel signals of the speed S (S>s) in the digital multiplex signal on the public switched telephone network (PSTN) side (base station controller (BSC) 5 side).

(8) When the base transceiver station (BTS) 3 receives the digital multiplex signal of the speed S obtained by multiplexing the first D-channel signal oriented to the master cell station (CS1) 4 in the first base transceiver station (BTS1) 21, the second D-channel signal oriented to the master cell station (CS1) 4 in the second base transceiver station (BTS2) 22, and the monitoring control signal containing various monitoring control information used in the base transceiver stations (BTS) 3 in the D-channel from the public switched telephone network (PSTN) side (base station controller (BSC) 5 side), the D-channel access control unit 102 terminates the first D-channel signal, the second D-channel signal, and the monitoring control signal, converts them to the first D-channel signal and the second D-channel signal of the speed s (S>s), and transmits the resultant data to the corresponding master cell stations (CS1) 4.

Referring to FIG. 50, in addition to the general maintenance information of the cell stations (CS), the D-channel (Dch) processing is carried out for transferring maintenance information of common part common to all cell stations (CS) 4, between the base station controller (BSC) 5 and the base transceiver station (BTS) 3, including for example the monitoring control signal of the multiplexing/demultiplexing unit (MUX/DMUX) 20, hybrid section (HYB) 10, and the antenna 7 and so on.

The Dch access control unit 102 terminates the signals of the upstream LAPD channel from the master cell stations (CS1) in the base transceiver station (BTS1) 21 and base transceiver station (BTS2) 22 at the LAPD processing units 133 and then transmits the signals including also the maintenance information of the common part collected by the monitoring control unit 134 as the new upstream LAPD channel to the base station controller (BSC) 5 side through the interface of 2M (the above point (7)).

Further, in the reverse direction (downstream), the signal from the downstream LAPD channel from the base station controller (BSC) 5 is terminated at the LAPD processing unit 131 and then separated into the maintenance information oriented to the master cell station (CS1) in the base transceiver station (BTS1) 21, the maintenance information oriented to the master cell station (CS1) in the base transceiver station (BTS2) 22, and the maintenance information of the common part under the control of the central processing unit (CPU) 132. The maintenance information oriented to the master cell station (CS1) in the base transceiver station (BTS1) 21 and oriented to the master cell station (CS1) in the base transceiver station (BTS2) 22 are transmitted to the master cell stations (CS1) in the base transceiver station (BTS1) 21 and the base transceiver station (BTS2) 22 by the LAPD processing units 133, respectively (the above point (8)).

Note that, at this time, the Dch access control unit 102 monitors and manages the terminal endpoint identifiers (TEI) for the base station controller (BSC) 5 side LAPD channel and the terminal endpoint identifiers (TEI) for the tLAPD channel oriented to the master cell stations in the base transceiver station (BTS1) 21 and base transceiver station (BTS2) 22 by the central processing unit (CPU) 132 and replaces the terminal endpoint identifiers (TEI) to enable the termination of the LAPD and the connection between the base station controller (BSC) 5 and the base transceiver stations (BTS1 and BTS2) 21 and 22 (the above point (6)).

Figure 51:
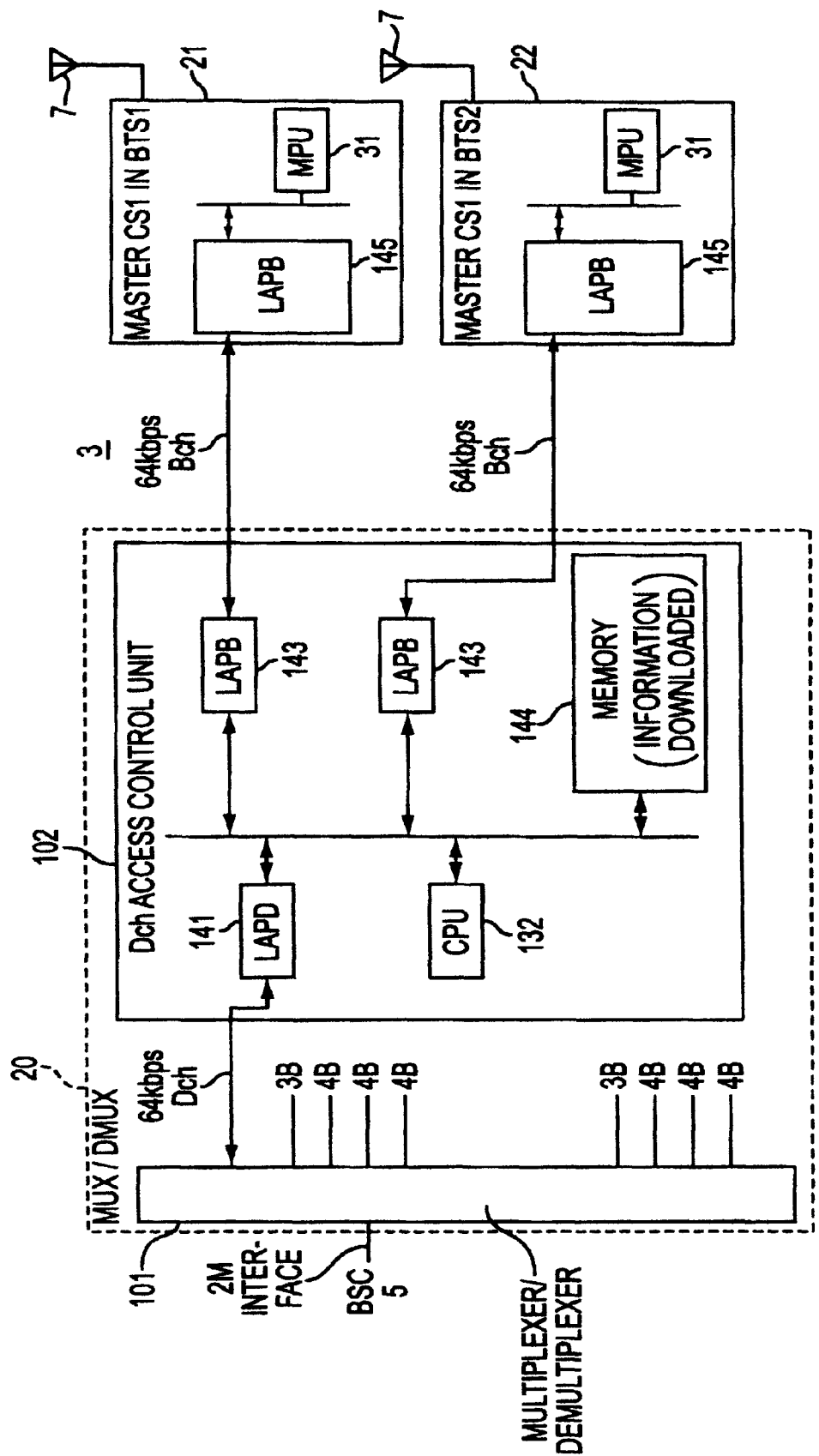
FIG. 51 is a view for explaining the function of download of software by the Dch access control unit 102 of FIG. 46.

FIG. 51 is a view for explaining the download function of the software by the Dch access control unit 102 of FIG. 46. The newly introduced components in the figure are the LAPD processing units 141 and 143, a memory (download information of software) 144, and a LAPB processing unit 145.

In the eighth embodiment, the main points proposed particularly through FIG. 51 is the next point (9).

(9) The D-channel access control unit 102 momentarily terminates the download information of the software which was placed in the D-channel of the digital multiplex signal from the public switched telephone network (PSTN) side (base station controller (BSC) 5 side) for transfer, holds the same in its memory 144, and feeds the download information to the master cell stations (CS1) 4 in the first base transceiver station (BTS1) 21 and the second base transceiver station (BTS2) 22 by the LAPB protocol. This software is fed to each cell station (CS) 4 for operating each cell station (CS) 4 by for example the subscriber exchange (LE) and is installed in each corresponding microprocessor (MPU) 31.

Note that, in general, such a download of software is carried out by using the B-channels of the downstream lines.

Referring to FIG. 51, the Dch access control unit 102 momentarily terminates the download information of software sent through the D-channel on the 2M interface from the base station controller (BSC) 5. The Dch access control unit 102 then loads it in the memory 144 and then transfers the download information to the master cell stations (CS1) in the first base transceiver station (BTS1) 21 and the second base transceiver station (BTS2) 22. In this case, the download information is transferred between the Dch access control unit 102 and the master cell stations (CS1) by the LAPB protocol which is an interface equivalent to the B-channel.

Next, an explanation will be made of a ninth embodiment. This ninth embodiment relates to the previously mentioned task 5).

As mentioned above, when constructing a base transceiver station (BTS) 3 by a plurality of cell stations (CS) 4, the base transceiver station (BTS) 3 according to the present invention defines one of the plurality of cell stations (CS) 4 as a master cell station (CS1), defines the other cell stations (CS) 4 as the slave cell stations (CS2 to CS4), and makes the master cell station (CS1) control the slave cell stations (CS2 to CS4). Here, the master cell station (CS1) plays the important roles such as controlling the channel assignment to the slave cell stations (CS2 to CS4), as a whole, connected to it and, at the same time, supplying a clock. The slave cell stations (CS2 to CS4) are connected to the master cell station (CS1), start operating after being assigned with channels by the instructions from the master cell station (CS1), and operate in synchronization with the clock of the master cell station (CS1).

In a base transceiver station (BTS) 3 constituted in this way, where a fault such as the suspension of the clock or overrun of the microprocessor (MPU) 31 occurs in the master cell station (CS1), all of the slave cell stations (CS2 to CS4) connected to it end up going down and a situation occurs in which none of the subscribers in the related radio zone (refer to for example all of the subscriber units (SU) 2 of FIG. 28) can receive any service. The ninth embodiment is designed to deal with such a problem.

The basic points of the operating method of the base transceiver station based on this ninth embodiment are as follows referring to the above FIG. 3. Namely, (1) At least one of the plurality of cell stations (CS) 4 is set as the master cell station (for example, CS1) which handles the control-use D-channel signals in addition to the speech-use B-channel signals. The remaining plurality of cell stations (CS) 4 are set as slave cell stations (for example, CS2, CS3, and CS4) controlled by the master cell station (CS1) and (2) when one of the above faults occurs in a master cell station (CS1), the base transceiver station (BTS) 3 is restored by one of the remaining plurality of cell stations (CS2 to CS4).

Thus, while the apparent traffic ends up increasing, the worst situation where the system goes down in the entire radio zone can be avoided.

Figure 52:
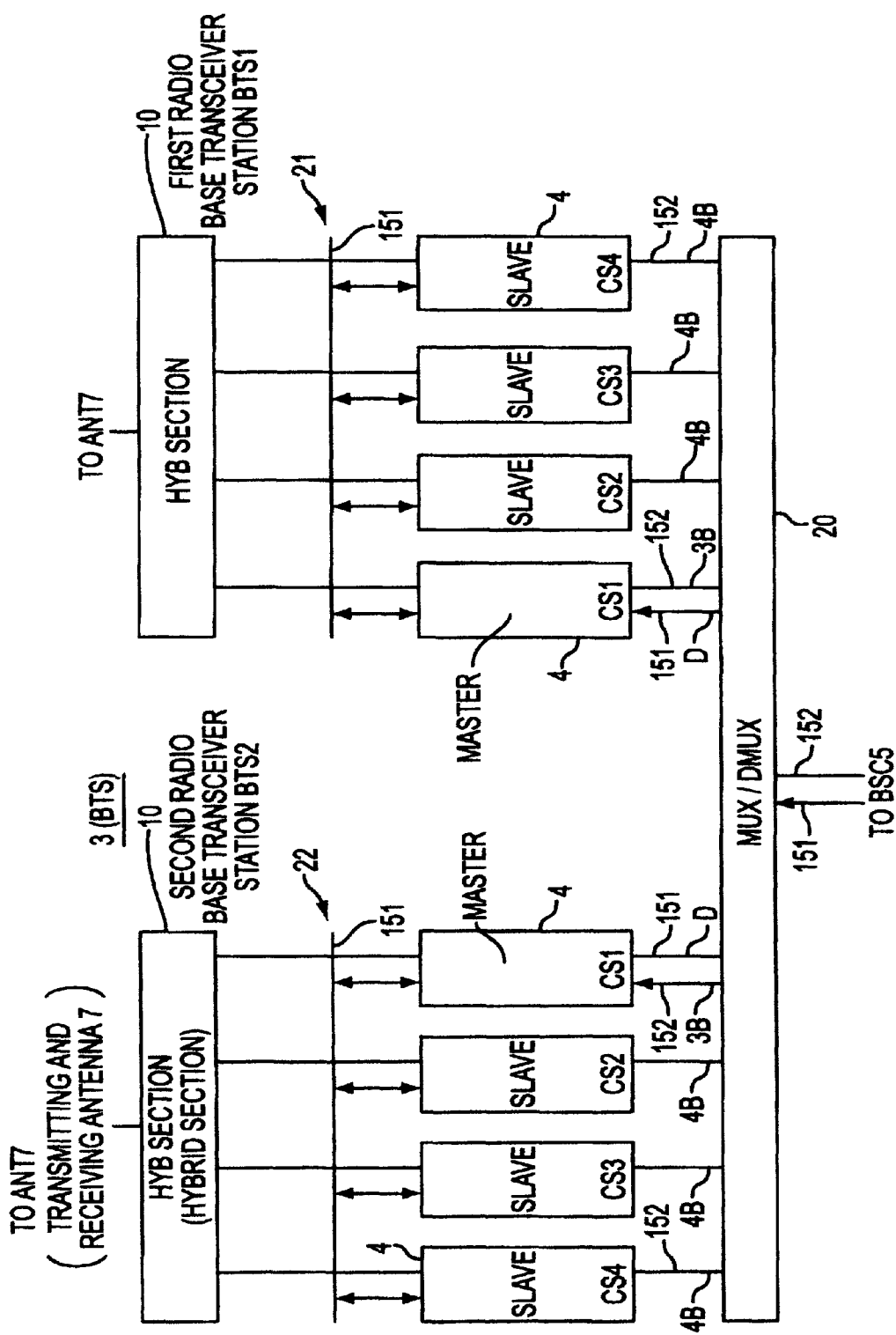
FIG. 52 is a view of a first mode of a ninth embodiment according to the present invention.

FIG. 52 is a view of a first mode based on the ninth embodiment according to the present invention. In the figure, the components indicated by the reference numerals 3, 4, 5, 10, 20, 21, and 22 are as already explained. The elements newly indicated here are a control-use D-channel path 151 and a speech (voice/data)-use B-channel path 152.

In the operating method shown in the figure,
a) when a fault occurs in a master cell station (CS1) of one of the first or second base transceiver stations (BTS1 or BTS2) 21 or 22,
b) the base transceiver station (3) is restored by just the other of the first or second base transceiver stations (BTS1 or BTS2) 21 or 22. The base transceiver station (BTS2) 22 comprising the cell stations (one of which is a master cell station) and the hybrid section (HYB) is constituted via the multiplexing/demultiplexing unit (MUX/DMUX) 20 in the base transceiver station (BTS1) 21.

Namely, the same radio zone is covered by two master cell stations (CS1). D-channel control signals are distributed to each master cell station (CS1) from the multiplexing/demultiplexing unit (MUX/DMUX) 20. The master cell station (CS1) and the slave cell stations (CS2 to CS4) are connected via the above inter-CS communication. The master cell station (CS1) controls the group of slave cell stations (CS2 to CS4) via this inter-CS communication. Next consider the case where a fault occurs in the master cell station (CS1) of the base transceiver station (BTS1) 21 and no control signal and no clock can be supplied. The group of slave cell stations (CS2 to CS4) connected to the master cell station (CS1) of this base transceiver station (BTS1) 21 become unable to operate due to the fault in the master cell station (CS1).

At this time, if the master cell station (CS1) of the other base transceiver station (BTS2) 22 is normal, the group of slave cell stations (CS2 to CS4) connected to the master cell station (CS1) in this base transceiver station (BTS2) 22 can maintain the normal functions of the system.

In a case where a fault occurs in the master cell station (CS1) in the base transceiver station (BTS2) 22 and it can no longer function normally, similarly if the master cell station (CS1) in the base transceiver station (BTS1) 21 is normal, the group of slave cell stations (CS2 to CS4) connected to the master cell station (CS1) in base transceiver station (BTS1) 21 can maintain the normal functions of the system. Accordingly, it becomes possible to continue providing service to the subscribers (SUB) in the related radio zone even if a fault occurs in a master cell station (CS1).

Figure 53:
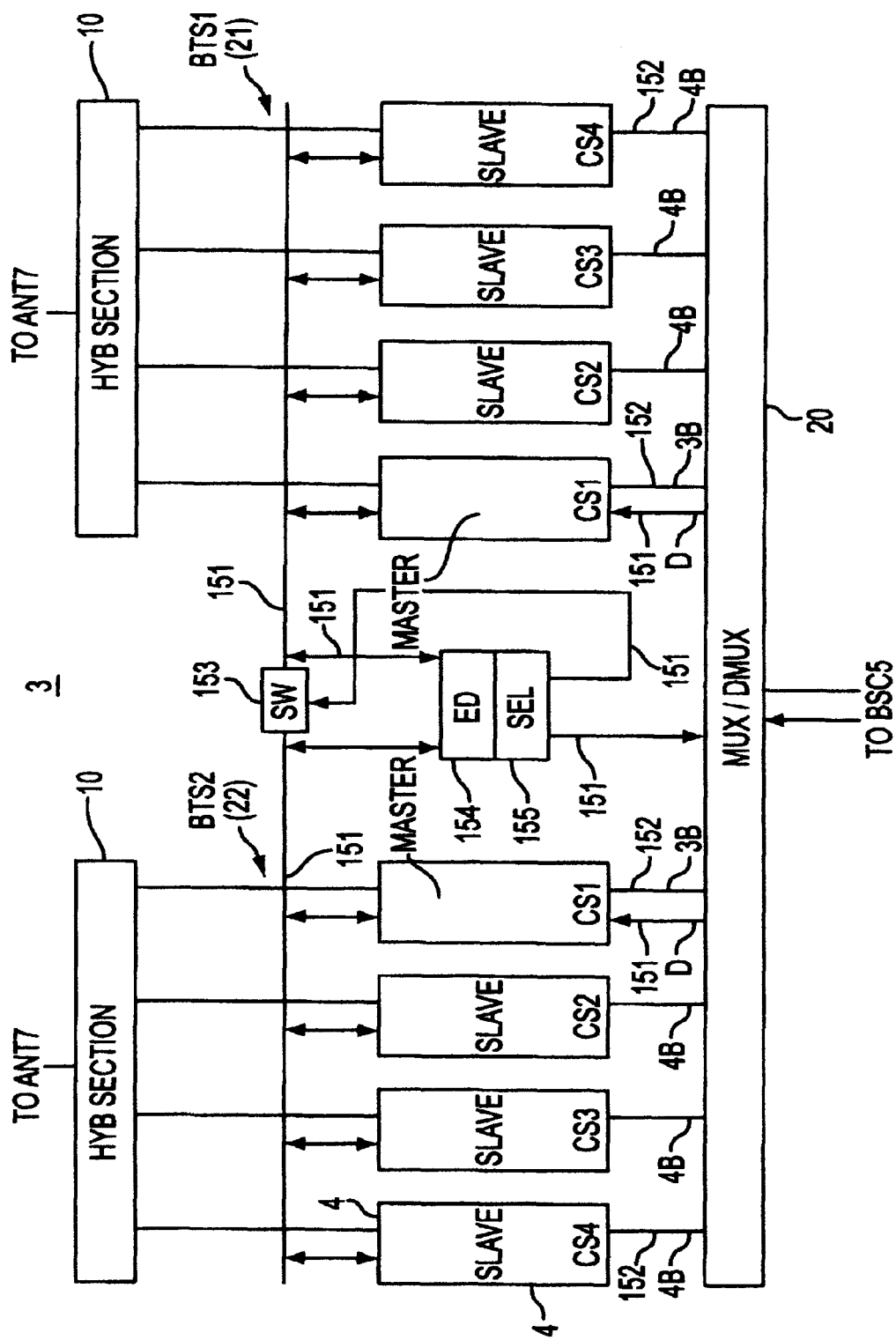
FIG. 53 is a view of a second mode of the ninth embodiment according to the present invention.

FIG. 53 is a view of a second mode based on the ninth embodiment according to the present invention. The new components in the figure are a switch (SW) 153 as one example, an error detecting unit (ED), and a selector (SEL) 155.

In this second mode,
a) when a fault occurs in the master cell station (CS1) in one of the first and second base transceiver stations (BTS1) 21 and (BTS2) 22 (for example, the first base transceiver station (BTS1) 21),
b) the master cell station (CS1) in the other (BTS2) of these first and second base transceiver stations (BTS1) 21 and (BTS2) 22 can be used to maintain the control, including that of the slave cell stations (CS2 to CS4) in the remaining base transceiver station, i.e., (BTS1) 21.

Referring to FIG. 53, the inter-CS communication use buses (151) for connecting the master cell station (CS1) and the slave cell stations (CS2 to CS4) are connected via the switch (SW) 153. The switch (SW) 153 is initially in the off state. The error detecting unit (ED) 154 is connected to the inter-CS communication-use buses and monitors the supply of the control signal and/or clock from the master cell station (CS1) for both of the base transceiver station (BTS1) 21 and base transceiver station (BTS2) 22. The selector (SEL) 155 connected to the error detecting unit (ED) 154 controls the on/off state of the switch (SW) 153 by a signal from the error detecting unit (ED) 154.

The D-channel control signals are distributed from the multiplexing/demultiplexing unit (MUX/DMUX) 20 to the master cell stations (CS1) which control the slave cell stations (CS2 to CS4) via the inter-CS communication use buses.

Next consider the case where a fault occurs in the master cell station (CS1) of the base transceiver station (BTS1) 21 and it can no longer supply the control signal and clock. The error detecting unit (ED) 154 detects that the control signal and clock for the master cell station (CS1) in the base transceiver station (BTS1) 21 have stopped and notifies this to the selector (SEL) 155, The selector (SEL) 155 receives the control signal and turns the switch (SW) 153 on. When the switch (SW) 153 is turned on, the inter-CS communication-use buses of the base transceiver station (BTS1) 21 and the base transceiver station (BTS2) 22 are connected and the control signal and clock generated by the master cell station (CS1) in the base transceiver station (BTS2) 22 will be also supplied to the group of slave cell stations (CS2 to CS4) in the base transceiver station (BTS1) 21. The slave cell stations (CS2 to CS4) of the base transceiver station (BTS1) 21 thereafter are able to continue operating under the control of the master cell station (CS1) of the base transceiver station (BTS2) 22.

Accordingly, it becomes possible to maintain the service to the subscribers (SUB) in the radio zone even if a fault occurs in a master cell station (CS1).

FIGS. 54A and 54B show a third mode based on the ninth embodiment according to the present invention, in which FIG. 54A is a view of the state before occurrence of a fault, and FIG. 54B is a view of the state after occurrence of the fault. In the figure, the component which should be noted is the backup master cell station 161.

In this third mode,
a) a backup master cell station 161 forming an active and standby pair together with the master cell station (CS1) is further added for the master cell station (CS1) and
b) when a fault occurs in the active master cell station (CS1), it is changed over to the standby master cell station 161 to continue the control. This standby master cell station only has the functions of a master cell station (CS1).

The error detecting unit (ED) 154 is connected to the inter-CS communication use buses and monitors the supply of the control signal or clock from the master cell station (CS1). The selector (SEL) 155 connected to this error detecting unit (ED) 154 transmits to multiplexing/demultiplexing unit (MUX/DMUX) 20 a switching signal for switching the destination of the D-channel signal between the master cell station (CS1) and the standby master cell station 161 in response to a signal from the error detecting unit (ED) 154.

Next consider the case where a fault occurs in the master cell station (CS1) and it can no longer supply the control signal and clock. The error detecting unit (ED) 154 detects that the control signal and clock of the master cell station (CS1) have stopped and notifies this to the selector (SEL) 155. The selector (SEL) 155 receives this notification signal and transmits a switching control signal to the multiplexing/demultiplexing unit (MUX/DMUX) 20. The multiplexing/demultiplexing unit (MUX/DMUX) 20 receives this switching control signal and switches the destination of the D-channel signal from the master cell station (CS1) to the standby master cell station 161. The standby master cell station 161 to which the D-channel signal is input is automatically activated and supplies the control signal and clock in place of the faulty master cell station (CS1). Thereafter, it becomes possible for the group of slave cell stations (CS2 to CS4) to continue operating under the control of the standby master cell station 161.

Accordingly, even in a case where a fault occurs in the master cell station (CS1), it becomes possible to maintain the service to the subscribers (SUB) in the radio zone. Further, even in a case where a fault occurs in the master cell station (CS1), a decrease of the radio channels can be prevented and the initial service quality can be secured. Note that, in this third mode, the explanation was made of the case where there was one master cell station (CS1), but it is possible, even in a case where another base transceiver station (BTS) 3 comprising one or more cell stations (one of them is a master cell station) and a hybrid section (HYB) 10 is connected via the multiplexing/demultiplexing unit (MUX/DMUX) 20 and the same radio zone is covered by two master cell station (CS1), to individually operate the base transceiver stations (BTS) 3 similar to the present third mode.

Figure 55B:
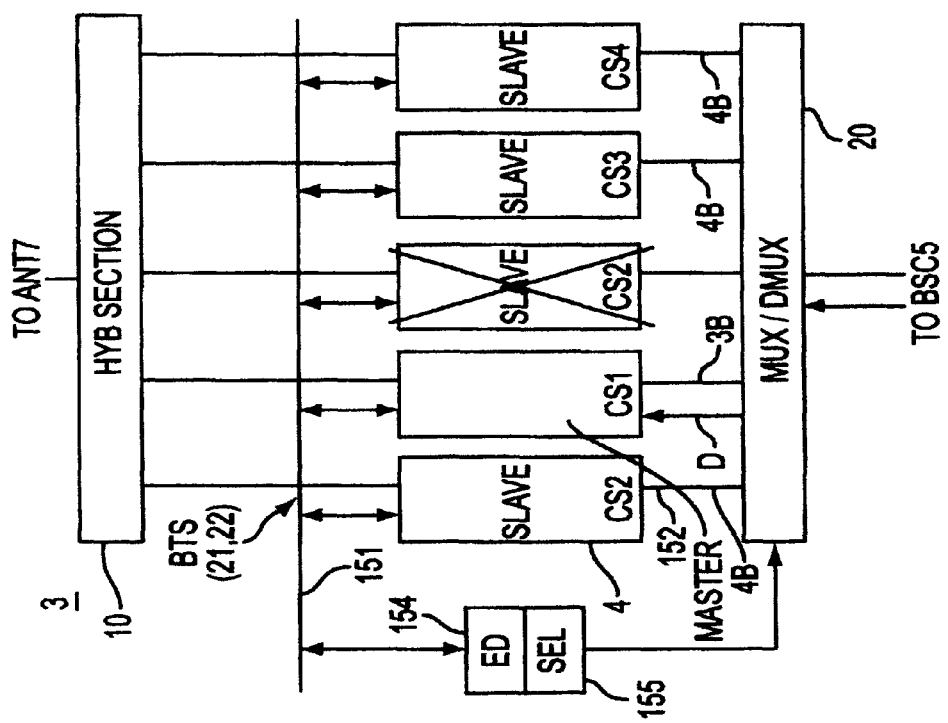
Figure 55A:
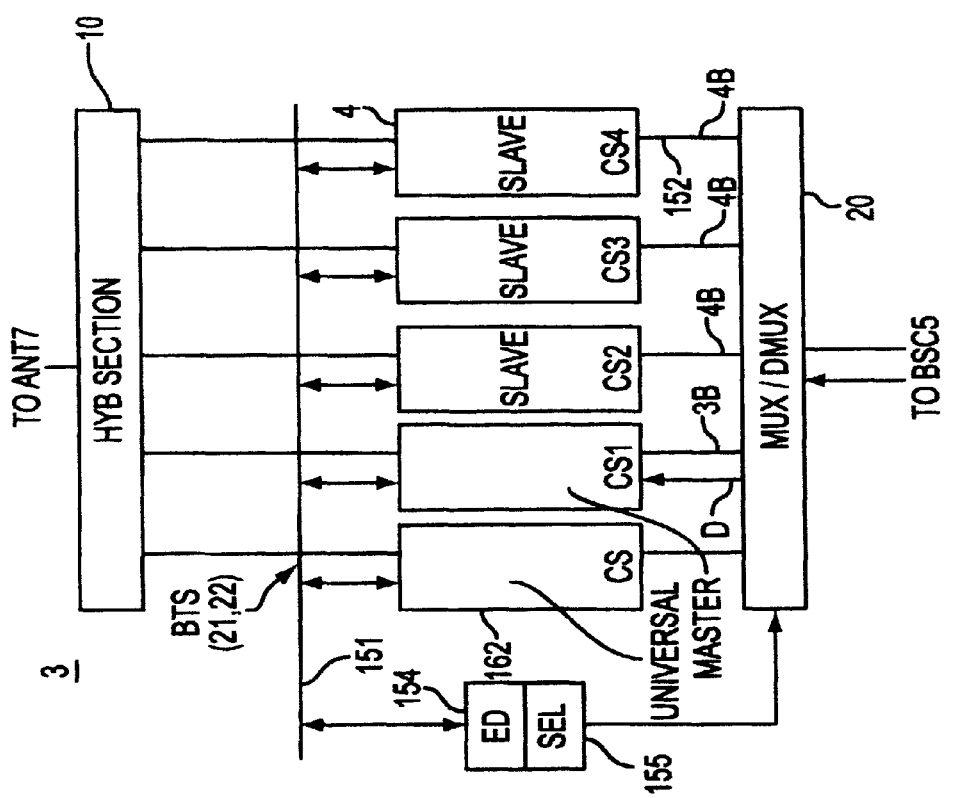

FIGS. 55A and 55B show a fourth mode based on the ninth embodiment according to the present invention, in which FIG. 55A is a view of the state before occurrence of a fault; and 55B is a view of the state after the occurrence of the fault. The component which should be noted in the figure is the universal cell station 162.

In this fourth mode,
a) a universal cell station 162 which can operate as both the master cell station (CS1) and the slave cell stations (CS2, CS3, and CS4) is additionally provided;
b) when a fault occurs in any one of the master cell station (CS1) and the slave cell stations (CS2 to CS4), c) the function of the faulty cell station is maintained by the universal cell station 162.

The base transceiver stations (BTS1 and BTS2) 21 and 22 each comprise at least one cell station (one of them being a master cell station (CS1)), a universal cell station (a cell station having both functions of a master cell station (CS1) and a slave cell station), a hybrid section (HYB) 10, and a multiplexing/demultiplexing unit (MUX/DMUX) 20 and are constituted as shown in FIGS. 55A and 55B. Further, inter-CS communication use buses are provided connecting the master cell station (CS1) and the group of slave cell stations (CS2 to CS4). The error detecting unit (ED) 154 is connected to the bus and monitors the supply of the control signal or clock from the master cell station (CS1). The selector (SEL) 155 connected to the error detecting unit (ED) 154 transmits to the multiplexing/demultiplexing unit (MUX/DMUX) 20 a signal for switching the destination of the D-channel signal between the master cell station (CS1) and the universal cell station 162 and a signal for switching the destination of the B-channel signal between the group of slave cell stations (CS2 to CS4) and the universal cell station 162 in response to a signal from the error detecting unit (ED) 154.

The D-channel control signal is supplied to the master cell station (CS1) from the multiplexing/demultiplexing unit (MUX/DMUX) 20. The master cell station (CS1) controls the group of slave cell stations (CS2 to CS4) via the inter-CS communication use buses.

Next consider the case where a fault occurs in the master cell station (CS1) and it can no longer supply the control signal and the clock. The error detecting unit (ED) 154 detects that the control signal and clock of the master cell station (CS1) have stopped and notifies this to the selector (SEL) 155. The selector (SEL) 155 receives this notification signal and transmits the switching control signal to the multiplexing/demultiplexing unit (MUX/DMUX) 20. The multiplexing/demultiplexing unit (MUX/DMUX) 20 receives the switching control signal and switches the destination of the D-channel signal from the master cell station (CS1) to the universal cell station 162. The universal cell station 162 to which the D-channel signal is input is automatically activated as the master cell station (CS1) and supplies the control signal and the clock in place of the faulty master cell station (CS1). Thereafter, it becomes possible for the group of slave cell stations (CS2 to CS4) to continue operating under the control of the universal cell station 162.

Next consider the case where a fault occurs in one of the group of slave cell stations (CS2 to CS4). Usually, the master cell station (CS1) constantly monitors the state of the slave cell stations (CS2 to CS4) for controlling the channel assignment to the slave cell stations (CS2 to CS4), so can detect the occurrence of a fault in the slave cell stations (CS2 to CS4). The master cell station (CS1) transmits an alarm for notifying the occurrence of the slave fault to the error detecting unit (ED) 154 together with the information for specifying the slave cell station in which the fault occurs. The error detecting unit (ED) 154 receives the alarm and notifies it to the selector (SEL) 155. The selector (SEL) 155 receives the notification signal and transmits a switching control signal to the multiplexing/demultiplexing unit (MUX/DMUX) 20. The multiplexing/demultiplexing unit (MUX/DMUX) 20 receives this switching control signal and switches the destination of the B-channel signal from the faulty slave cell station to the universal cell station 162. The universal cell station 162 to which the B-channel signal is input is automatically activated as the slave cell station. Thereafter, it becomes possible for the universal cell station 162 to maintain the operation in place of the faulty slave cell station.

Accordingly, it becomes possible to maintain the service to the subscribers SUB in the radio zone even if a fault occurs in the master cell station (CS1). Further, even if a fault occurs in a slave cell station, a decrease of the radio channels can be prevented and the initial service quality can be secured. Note that, in this fourth mode, the explanation was made of a case of one master cell station (CS1), but it is possible, even in a case where another base transceiver station (BTS) 3 comprising one or more cell stations (one of them is a master cell station) and a hybrid section (HYB) 10 is connected via the multiplexing/demultiplexing unit (MUX/DMUX) 20 and the same radio zone is covered by two master cell station (CS1), to individually operate the base transceiver stations (BTS) 3 similar to the present fourth mode.

Figure 56B:
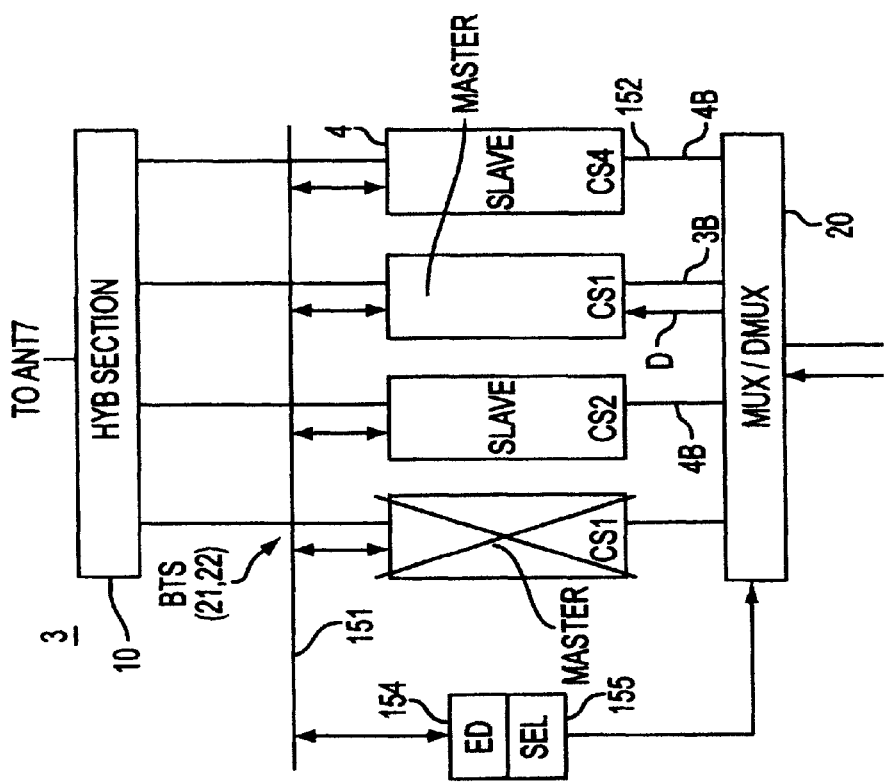
Figure 56A:
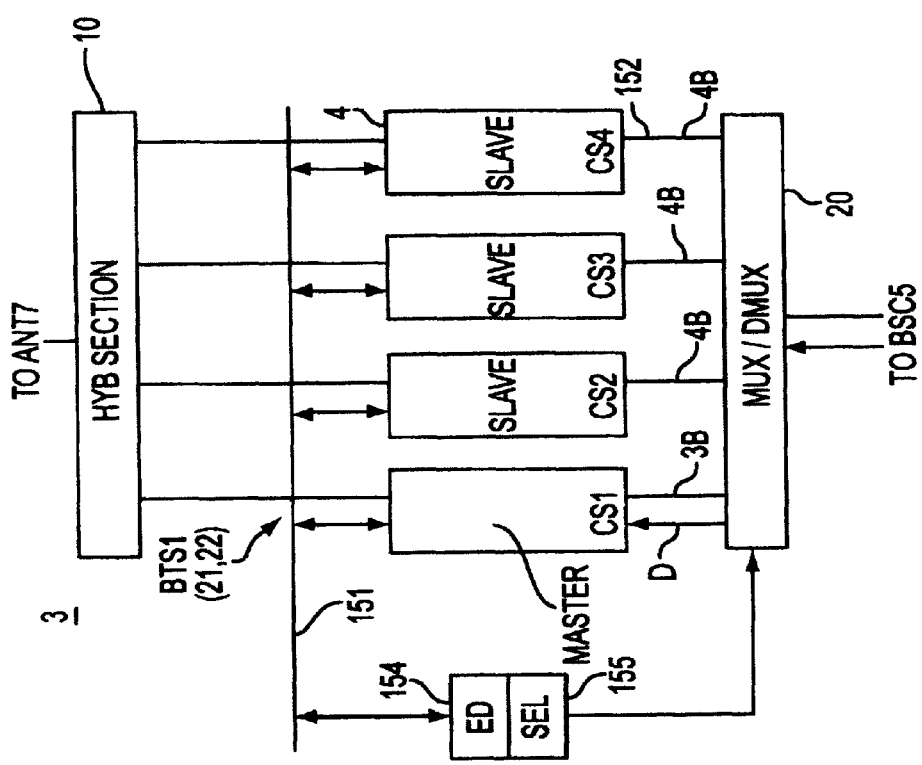

FIGS. 56A and 56B show a fifth mode based on the ninth embodiment according to the present invention, in which FIG. 56A is a view of the state before the occurrence of a fault; and 56B is a view of the state after the occurrence of the fault. There is no component which is particularly newly introduced in the figure.

In this fifth mode,
a) each of the slave cell stations (CS2, CS3, and CS4) is configured to also be provided with the function of a master cell station (CS1) and
b) when a fault occurs in the master cell station (CS1), the function of the faulty master cell station (CS1) is maintained by a selected slave cell station (one of CS2 to CS4).

Note that the present fifth mode is different from the fourth mode in the point that the role of the universal cell station 162 in the fourth mode is substituted by a slave cell station, but all items other than this point are the same as explained in detail in the fourth mode.

Figure 57:
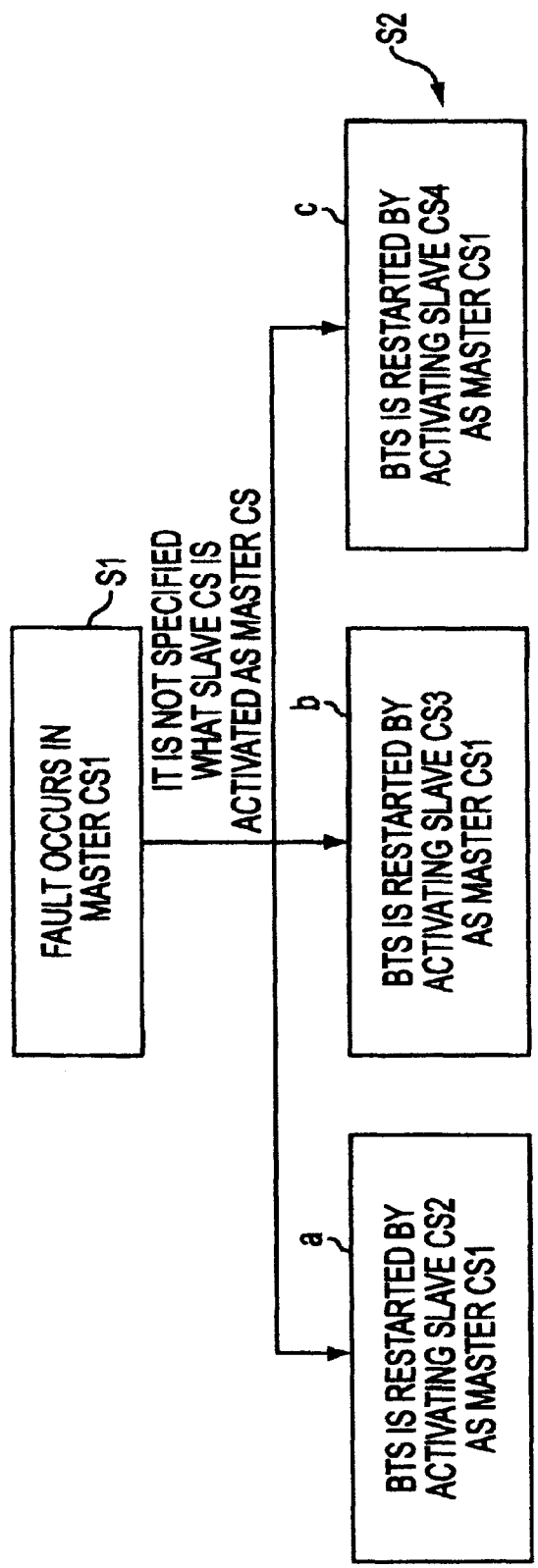
FIG. 57 is a flowchart representing a sixth mode of the ninth embodiment according to the present invention.

FIG. 57 is a flowchart of a sixth mode based on the ninth embodiment according to the present invention.

In this sixth mode, the slave cell station which takes over the function of the master cell station (CS1) in which the fault occurred in the fifth mode is arbitrarily selected from among the plurality of slave cell stations (CS2 to CS4).

In FIG. 57, at the second step S2 after the occurrence of the fault in the master cell station (CS1) (first step S1), one of the illustrated three modes a to c is set at random. After the one specific slave cell station is determined, the base transceiver station (BTS) is restarted as a whole.

Figure 58B:
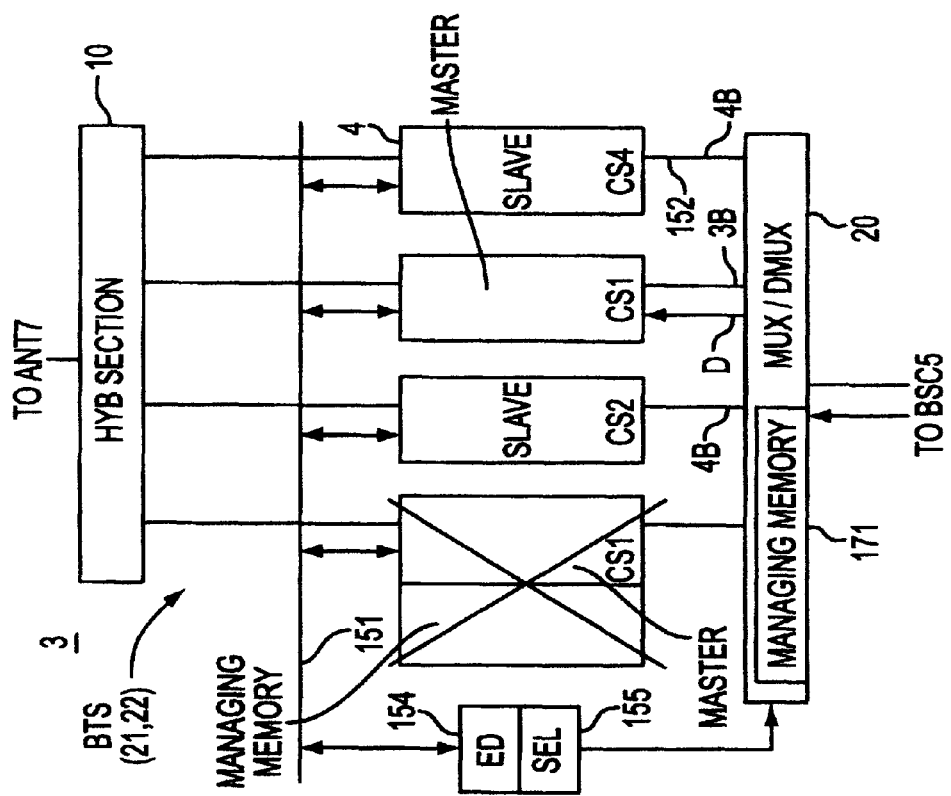
Figure 58A:
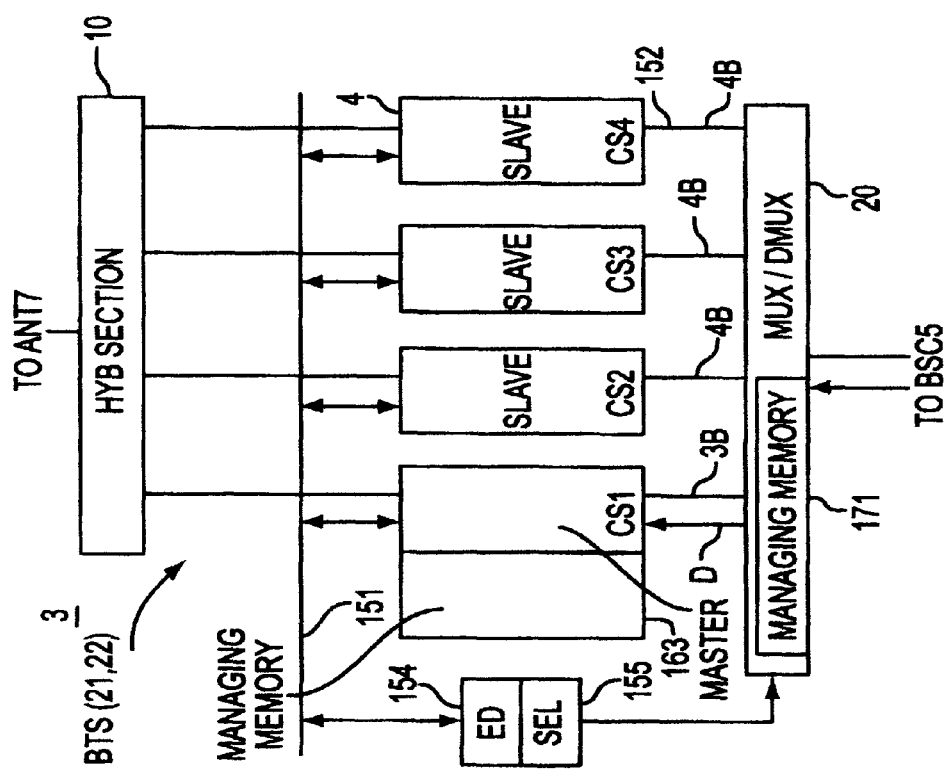

FIGS. 58A and 58B show a seventh mode based on the ninth embodiment according to the present invention, in which FIG. 58A is a view of the state before occurrence of a fault; and 58B is a view of the state after the occurrence of the fault.

The point in the figure which should be noted first is the managing memory 163. The managing memory 163 is attached to the master cell station (CS1). This managing memory 163 updates and holds the operating data for every slave cell station under the master cell station (CS1).

In this seventh mode,
a) second management information equivalent to the first management information held by the master cell station (CS1) per se is held in the managing memory 171 in the multiplexing/demultiplexing unit (MUX/DMUX) 20 in parallel,
b) the selected slave cell station (CS3 in the case of the figure) takes over the second management information from the managing memory, and c) the base transceiver station (BTS) 3 is restarted as a whole.

By this, the master cell station (CS1) can be replaced without suspension of the call being processed by the slave cell station CS3.

Figures 59A, 59B:
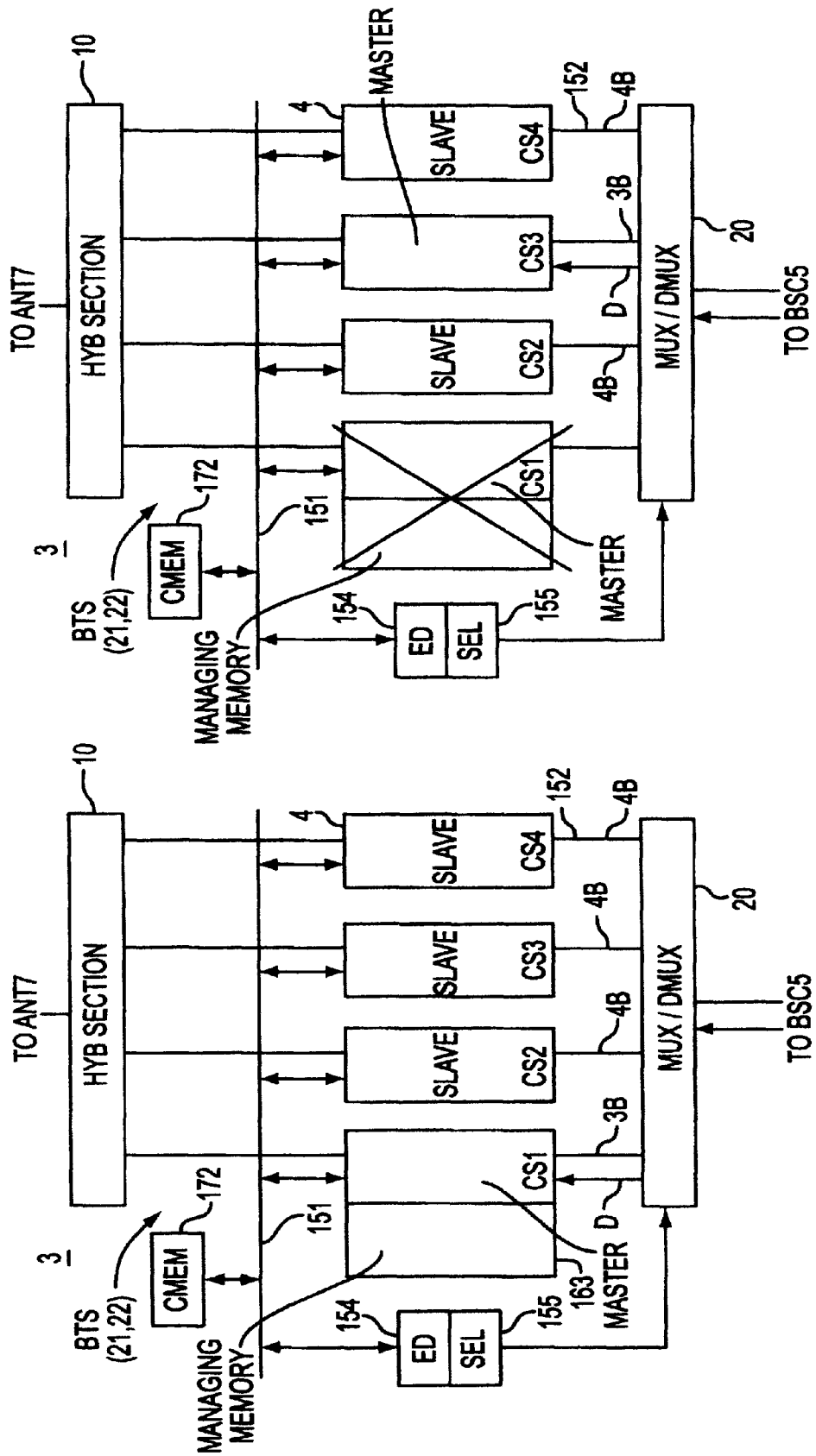

FIGS. 59A and 59B show an eighth mode based on the ninth embodiment according to the present invention, in which FIG. 59A is a view of the state before occurrence of a fault; and 59B is a view of the state after the occurrence of the fault. The component which should be noted in the figure is the common memory (CMEM) 172.

In this eighth mode,
a) Second management information equivalent to the first management information held in the managing memory 163 by the master cell station (CS1) per se is held parallelly in the common memory (CMEM) 172 shared by all of the cell stations,
b) the selected slave cell station (CS3 in the figures) takes over the second management information from the common memory 172, and
c) the base transceiver station (BTS) 3 is restarted as a whole.

By this, the switch can be made without suspending the call being processed by the slave cell station (CS3 in the example of the figure) replacing the faulty master cell station (CS1). Note that this effect is obtained also in the modes mentioned later.

Figure 60B:
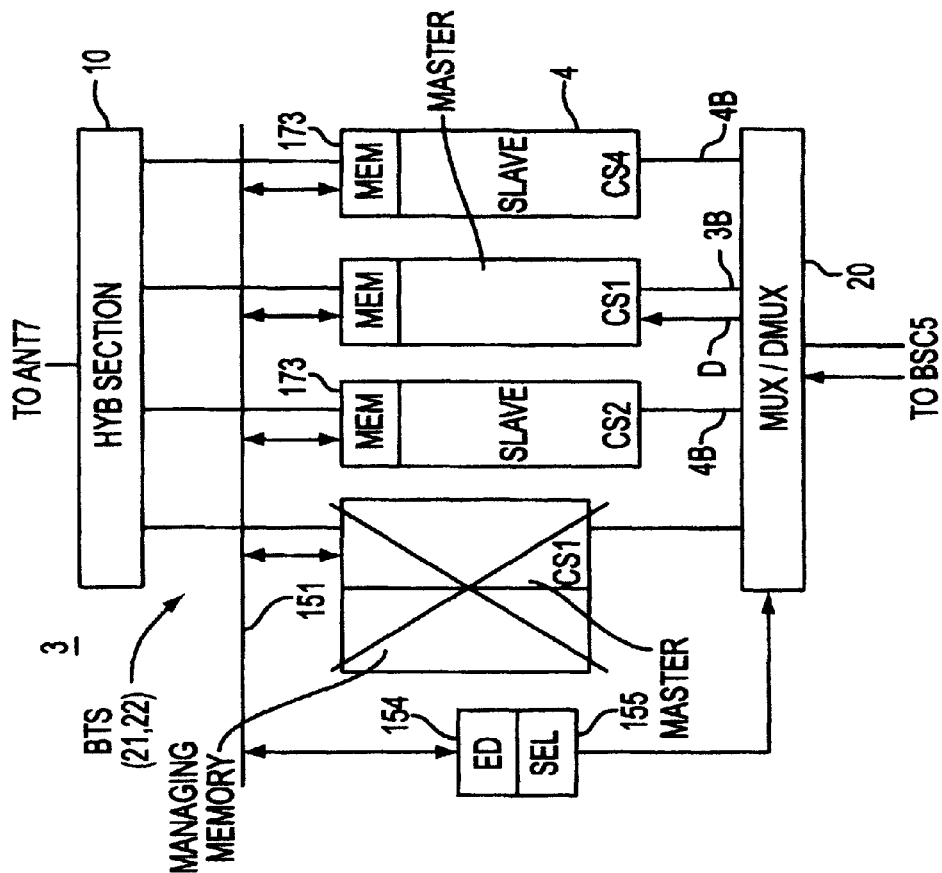
Figure 60A:
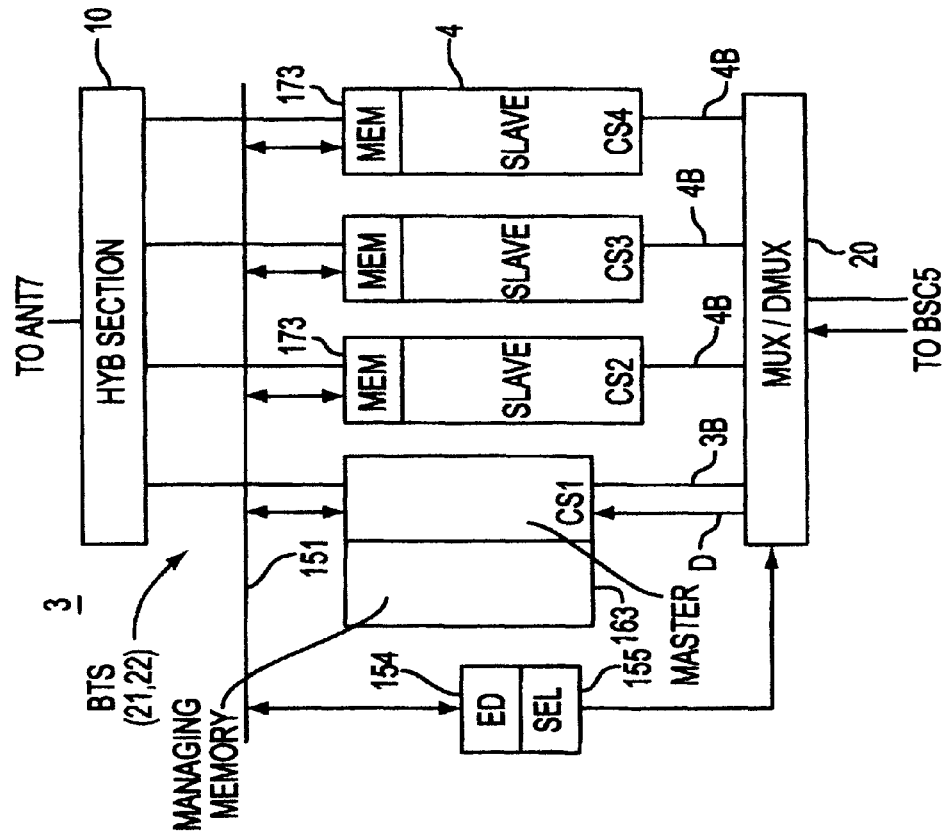

FIGS. 60A and 60B show a ninth mode based on the ninth embodiment according to the present invention, in which FIG. 60A is a view of the state before occurrence of a fault; and 60B is a view of the state after the occurrence of the fault.

Distributed memories (MEM) 173 are particularly newly introduced in the figure.

In the ninth mode,
a) Second management information equivalent to the first management information held by the master cell station (CS1) per se in the managing memory 163 is held in parallel in the distributed memories (MEM) 173 respectively provided in the slave cell stations (CS2, CS3, and CS4),
b) the selected slave cell station (CS3 in the example of the figure) fetches the second management information from its own distributed memory 173, and
c) the base transceiver station (BTS) 3 is restarted as a whole.

By this, the master cell station (CS1) can be replaced without suspending a call which is being processed by the slave cell station CS3.

Figure 61:
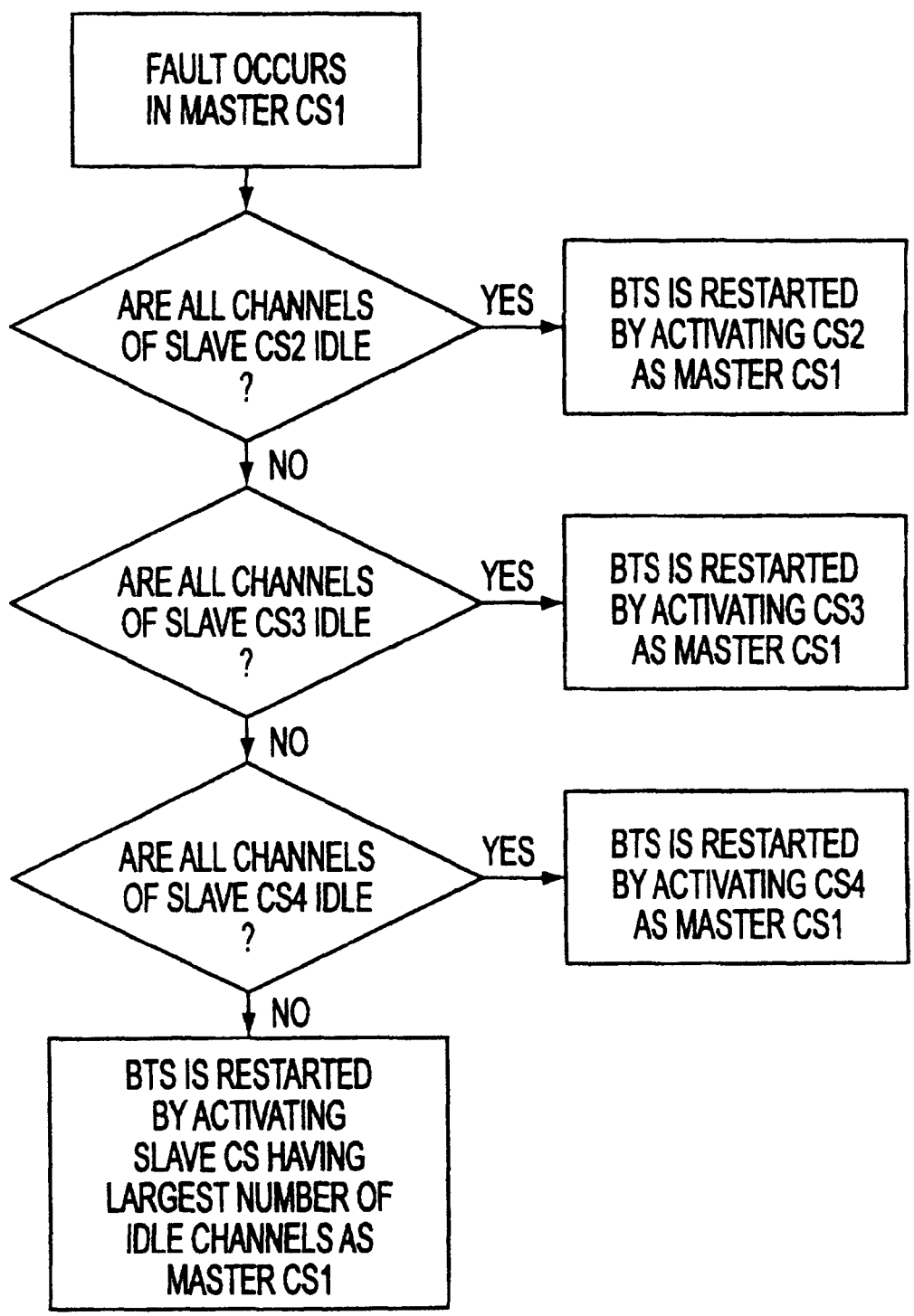
FIGS. 61 is a flowchart of a 10th mode of the ninth embodiment according to the present invention.

FIG. 61 is a flowchart of a 10th mode based on the ninth embodiment according to the present invention.

The 10th mode relates to the selection procedure in the fifth mode when selecting the slave cell station to take over from the master cell station (CS1) in which a fault occurs from among the plurality of slave cell stations (CS2 to CS4).

In the 10th mode,
a) when selecting the slave cell station to take over the function of the faulty master cell station (CS1),
b) a slave cell station where none of the channels are in use or, if there is no such cell station, the one of the cell stations having the smallest number of channels in use is selected from the plurality of slave cell stations (CS2 to CS4), and
c) the base transceiver station is restarted using the selected slave cell station as the master cell station.

FIG. 61 shows the above a), b), and c) as concrete steps. "ch" in the figure means the channel.

In this 10th mode, since the cell station management information from the master cell station (CS1) in which the fault occurs is taken over by the new master cell station, calls in progress with the other slave cell stations can be continued.

Figure 62:
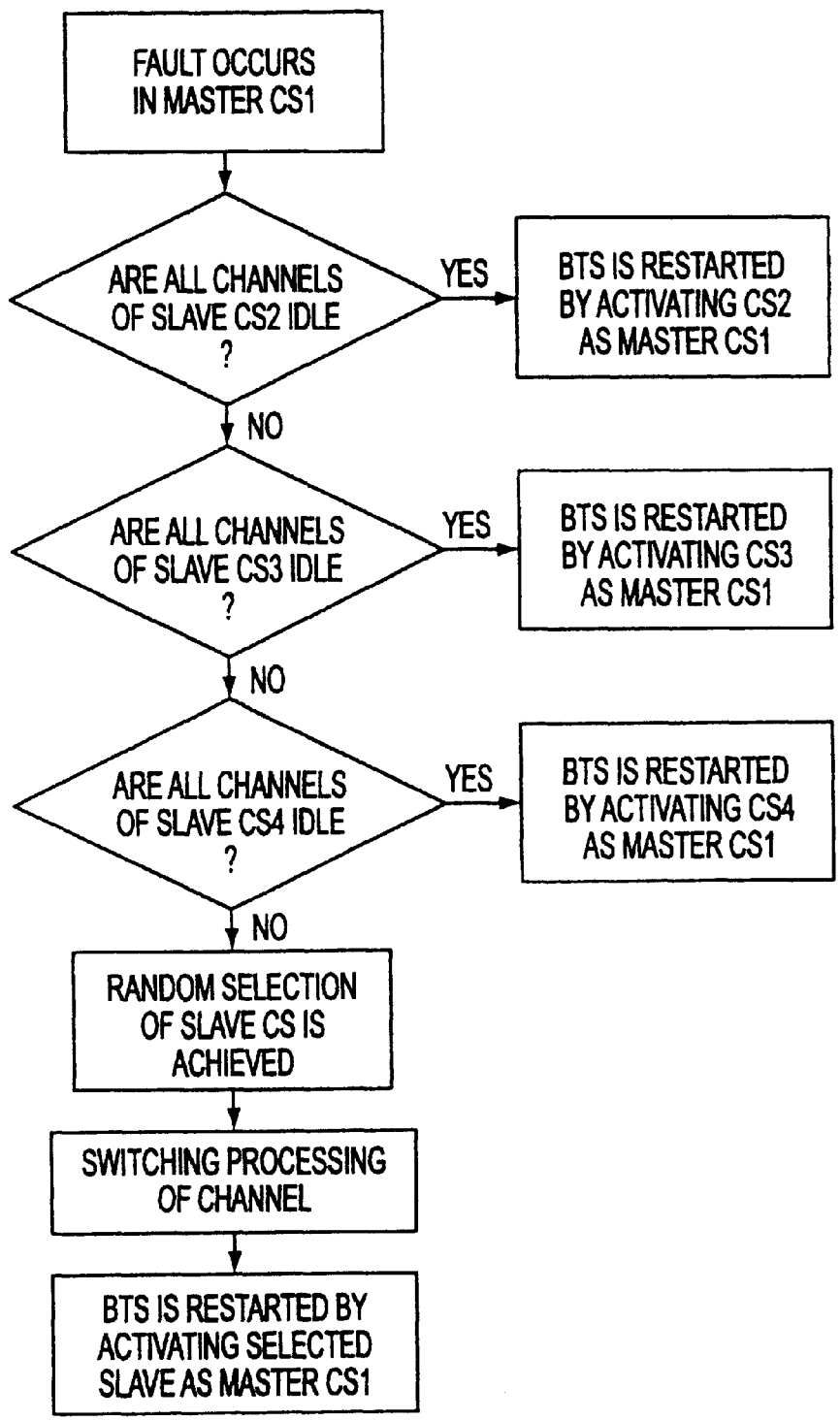
FIG. 62 is a flowchart of an 11th mode of the ninth embodiment according to the present invention.

FIG. 62 is a flowchart of an 11th mode based on the ninth embodiment according to the present invention.

In this 11th mode,
a) when selecting one of the slave cell stations (CS2 to CS4) to take over the functions of the faulty master cell station (CS1),
b) a slave cell station where none of the channels are in use is searched for from among the plurality of slave cell stations (CS2 to CS4) and it is decided if there is not even one such slave cell station,
c) when the above decision has been made, one of the plurality of slave cell stations (CS2 to CS4) is arbitrarily selected as the new master cell station (CS1) and
d) the management information held by the new master cell station (CS1) at the time of selection is taken over by anyone of the other slave cell stations which were not selected.

The above a) to d) are concretely shown in FIG. 62. The selection of slave cell station in which all of the channels are idle is carried out by for example the selector (SEL) 155.

In this 11th mode as well, since the cell station management information is taken over from the master cell station (CS1) in which the fault occurs by the new master cell station (CS1), calls in progress with the other slave cell stations can be continued.

Where there is no slave cell station in which all channels are idle, the slave cell station is selected at random. The calls in progress at the slave cell station selected at this time are switched to the other slave cell stations.

A supplementary explanation will be given of the above ninth embodiment.

1. Operation of Parts in the Embodiment

Figure 63:
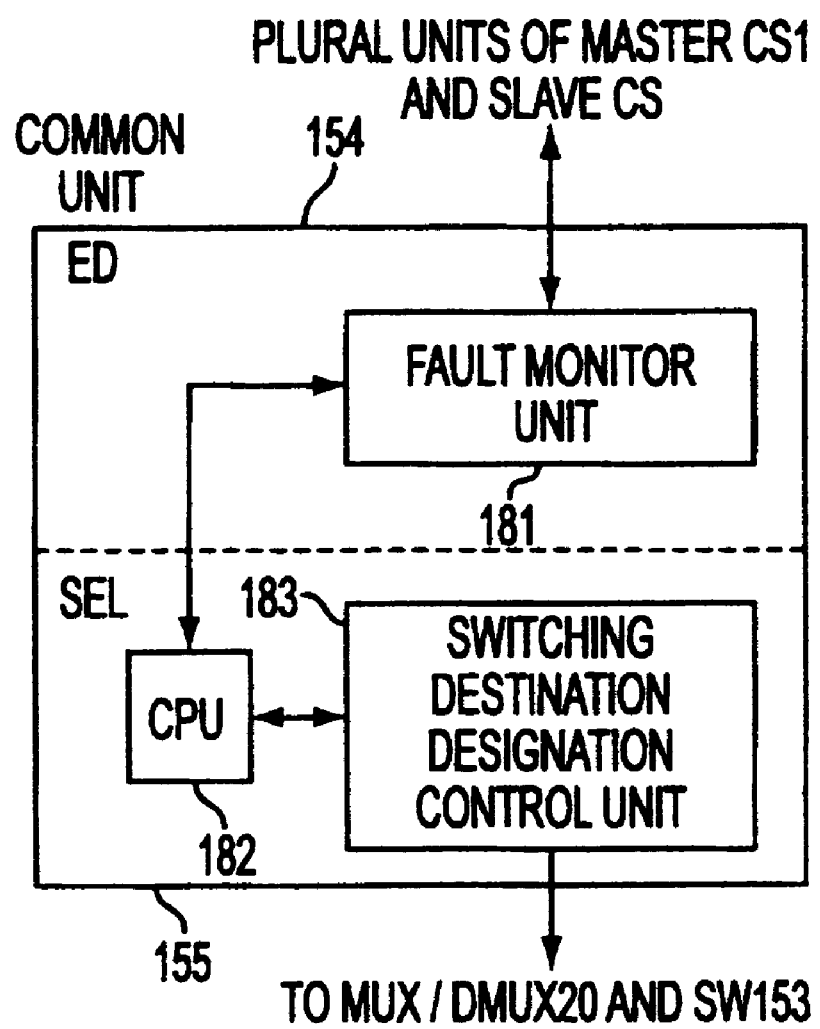
FIG. 63 is a view of a concrete example of an error detecting unit (ED) 154 and a selector (SEL) 155.

FIG. 63 is a view of a specific example of the error detecting unit (ED) 154 and the selector (SEL) 155.

(1) Error detecting unit (ED) 154

The error detecting unit (ED) 154 monitors the control signal and clock feed signal issued by the master cell station (CS1) to the slave cell stations (CS2 to CS4) at the fault monitor unit. When it cannot detect these signals for a predetermined time or more, it decides that a fault has occurred in the master cell station (CS1) and sends a cell station fault detection signal to the selector (SEL) 155. Where it is necessary to monitor the slave cell stations, it periodically issues a health check signal etc. from the fault monitor unit 181 and monitors the response to this. When it cannot detect any response for a predetermined time or more, it decides that a fault has occurred in such slave cell station.

(2) Selector (SEL) 155

The selector (SEL) 155 has a central processing unit (CPU) and decides if a fault has occurred in a cell station (CS) based on the control signal from the error detecting unit (ED) 154. It transmits a control signal containing the designation of the switching destination to the multiplexing/demultiplexing unit (MUX/DMUX) 20 from the switching destination designation control unit 183, This control signal is as follows for the different execution modes.

<1> In the second mode (FIG. 53), it is the switching control signal to the switch (SW) 153.

<2> In the third mode (FIG. 54), it is the D-channel switching command and the B-channel switching command.

<3> In the fourth mode (FIG. 55), it is a) at the time of a fault in the master cell station, the D-channel switching command and the B-channel switching command (containing the faulty CS-ID), and b) at the time of a fault in a slave cell station, the B-channel switching command (containing the faulty CS-ID).

<4> In the fifth mode (FIG. 56), it is the D-channel switching command and the fl-channel switching command (containing the switching destination CS-ID).

Figure 64:
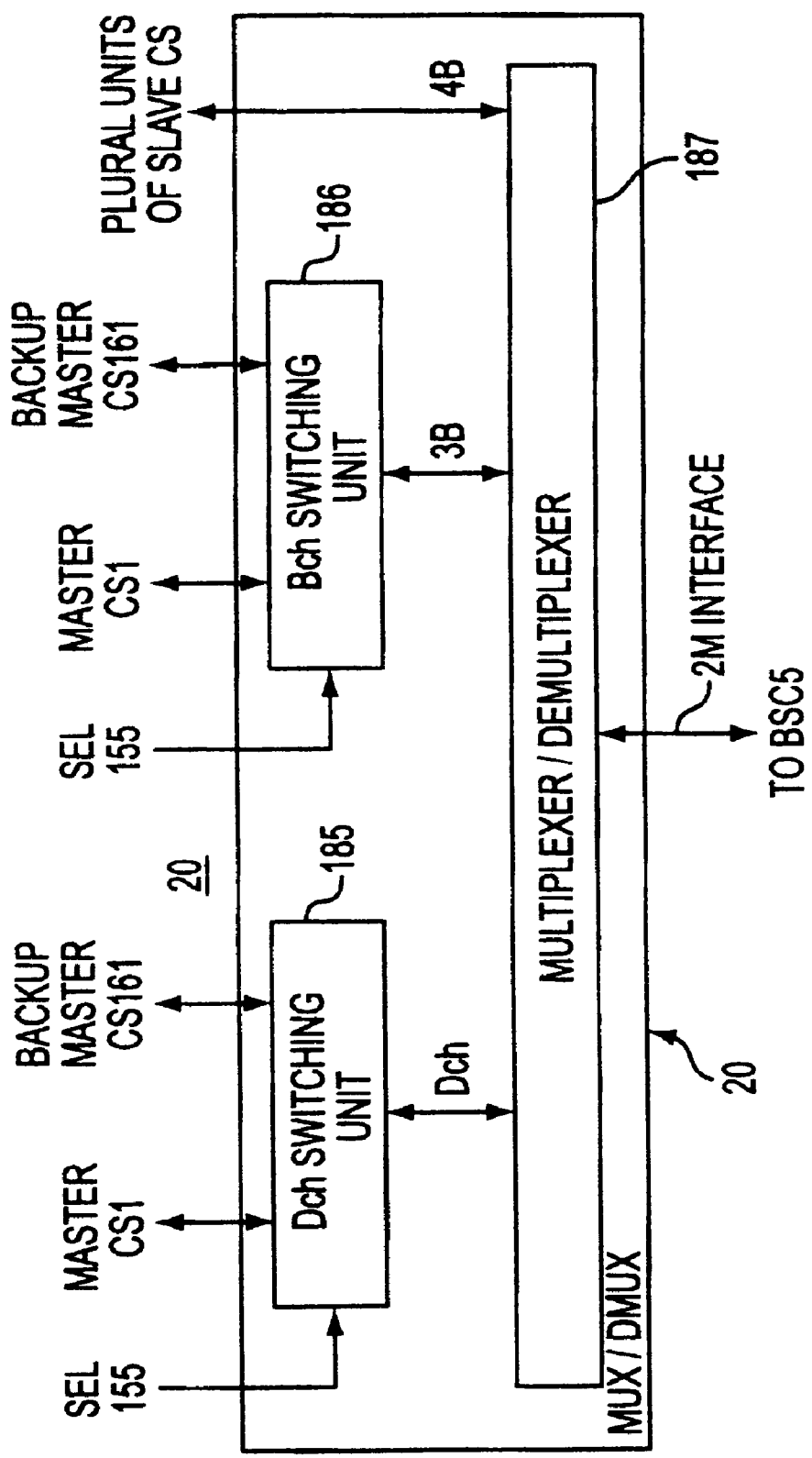
FIG. 64 is a view of a concrete example of the MUX/DMUX 20 shown in FIG. 54.

FIG. 64 is a view of a specific example of the multiplexing/demultiplexing unit (MUX/DMUX) 20 shown in FIG. 54. In the figure, when receiving the control signal from the selector (SEL) 155, the D-channel switching unit 185 alters the connection destination of the D-channel from the master cell station (CS1) to the backup master cell station 161. When receiving the control signal from the selector (SEL) 155, the B-channel switching unit 186 alters the connection destination of the 3B-channel from the master cell station (CS1) to the backup master cell station 161.

(3) Multiplexing/demultiplexing unit (MUX/DMUX) 20 in FIGS. 55A and 55B

Upon receipt of the control signal from the selector (SEL) 155, the D-channel switching unit 185 alters the connection destination of the D-channel from the master cell station (CS1) to the universal cell station 162. Upon receipt of the control signal (containing the faulty CS-ID) from the selector (SEL) 155, the B-channel switching unit 186 alters the B-channel connected to the designated cell station to the universal cell station 162.

(4) Multiplexing/demultiplexing unit (MUX/DMUX) 20 in FIGS. 56A and 56B

Upon receipt of the control signal from the selector (SEL) 155, the D-channel switching unit 185 alters the connection destination of the D-channel from the master cell station (CS1) to a slave cell station (CS3 in the example of FIG. 56). Upon receipt of the control signal from the selector (SEL) 155, the B-channel switching unit 186 alters the connection destination of the 3B-channel from the master cell station (CS1) to the slave cell station CS3. Next, the explanation of FIGS. 59A and 598 and FIGS. 60A and 60B will be supplemented.

2. Operation of FIGS. 59A and 59B

The managing memory 163 in the master cell station (CS1) is the place where the operating data of the cell stations and the control data from the public switched telephone network (PSTN) are stored (according to the existing technology). For this reason, if a fault occurs in the master cell station (CS1), all of the slave cell stations (CS2 to CS4) under this stop functioning. In order to solve this problem, the common memory (CMEM) 172 is connected to the inter-CS communication use buses to hold data equivalent to the data in the managing memory 163 in the master cell station (CS1).

If a fault now occurs in the master cell station (CS1), the error detecting unit (ED) 154 detects the fault and issues instructions to the multiplexing/demultiplexing unit (MUX/DMUX) 20 through the selector (SEL) 155 to connect the D-channel to the slave cell station to be restarted as the master cell station (CS1). The slave cell station connected to the D-channel reads the management use data written in the common memory (CMEM) 172 and starts operation as the master cell station (CS1).

3. Operation of FIGS. 60A and 60B

The managing memory 163 in the master cell station (CS1) is the place where the operating data of the cell stations and the control data from the public switched telephone network (PSTN) are stored (according to the existing technology). For this reason, if a fault occurs in the master cell station (CS1), all of the slave cell stations (CS2 to CS4) under this stop functioning. In order to solve this problem, a distributed memory (MEM) 173 is provided in each slave cell station to hold data equivalent to the data in the managing memory 163 in the master cell station (CS1).

If a fault now occurs in the master cell station (CS1), the error detecting unit (ED) 154 detects the fault and issues instructions to the multiplexing/demultiplexing unit (MUX/DMUX) 20 through the selector (SEL) 155 to connect the D-channel to the slave cell station to be restarted as the master cell station (CS1). The slave cell station to which the D-channel is connected reads the management use data written in the distributed memory (MEM) 173 and starts operation as the master cell station (CS1).

Next, a supplementary explanation will be given of FIG. 58. The base transceiver station (BTS) 3 comprising two or more cell stations (one of them acting as the master cell station (CS1) and the others acting as slave cell stations (CS2 to CS4) having functions equivalent to the master cell station (CS1)), the hybrid section (HYB) 10, and the multiplexing/demultiplexing unit (MUX/DMUX) 20 is constituted as shown in FIG. 60.

Further, inter-CS communication use buses are provided connecting the master cell station (CS1) and the group of slave cell stations (CS2 to CS4). The error detecting unit (ED) 154 is connected to the inter-CS communication use buses and monitors the supply of the control signal or clock from the master cell station (CS1). The selector (SEL) 155 connected to the error detecting unit (ED) 154 transmits to the multiplexing/demultiplexing unit (MUX/DMUX) 20 a signal for switching the destination of the D-channel signal between the master cell station (CS1) and the slave cell station (CS3 in FIG. 58) in response to a signal from the error detecting unit (ED) 154. The D-channel control signal is fed from the multiplexing/demultiplexing unit (MUX/DMUX) 20 to the master cell station (CS1). The master cell station (CS1) controls the group of slave cell stations (CS2 to CS4) via the inter-CS communication use buses.

Now consider the case where a fault occurs in the master cell station (CS1) and it can no longer supply the control signal and clock. The error detecting unit (ED) 154 detects that the control signal and clock of the master cell station (CS1) have stopped and notifies this to the selector (SEL) 155. The selector (SEL) 155 receives the control signal and transmits a switching control signal to the multiplexing/demultiplexing unit (MUX/DMUX) 20. The multiplexing/demultiplexing unit (MUX/DMUX) 20 receives the switching control signal and switches the destination of the D-channel signal from the master cell station (CS1) to one of the slave cell stations. The slave cell station to which the D-channel signal was input is automatically restarted as the master cell station (CS1) and supplies the control signal and clock in place ot the faulty master cell station (CS1). The operating data of the slave cell stations under the master cell station (CS1) which had been managed by the faulty master cell station (CS1) is taken over from the managing memory 171 provided in the multiplexing/demultiplexing unit (MUX/DMUX) 20 by the new master cell station (CS1). Thereafter, it becomes possible for the other slave cell stations to continue operation under the control of the new master cell station (former slave cell station).

Accordingly, it becomes possible to maintain the service to the subscribers SUB in the radio zone even in a case where a fault occurs in the master cell station (CS1).

To end the explanation of the ninth embodiment, a more specific explanation will be given of the configuration of the multiplexing/demultiplexing unit (MUX/DMUX) 20.

The managing memory 163 in the master cell station (CS1) is the place where the operating data of the slave cell stations (CS2 to CS4) and the control data from the public switched telephone network (PSTN) are stored (according to the existing technology). For this reason, if a fault occurs in the master cell station (CS1), all of the slave cell stations under this stop functioning. In order to solve this problem, the managing memory 171 is constituted in addition to the D-channel switching unit 185 (FIG. 64) to hold data equivalent to the data in the managing memory 163 in the master cell station (CS1). All of the control data transferred over the D-channel is stored in this managing memory 171.

If a fault now occurs in the master cell station (CS1), the error detecting unit (ED) 154 detects the fault and issues instructions to the multiplexing/demultiplexing unit (MUX/DMUX) 20 through the selector (SEL) 155 to connect the D-channel to the slave cell station to be restarted as the master cell station (CS1). The slave cell station to which this D-channel is connected reads the management use data from the managing memory 171 added to the D-channel switching unit 185 and starts operation as the master cell station (CS1).

Finally, a 10th embodiment will be explained.

Figure 65:
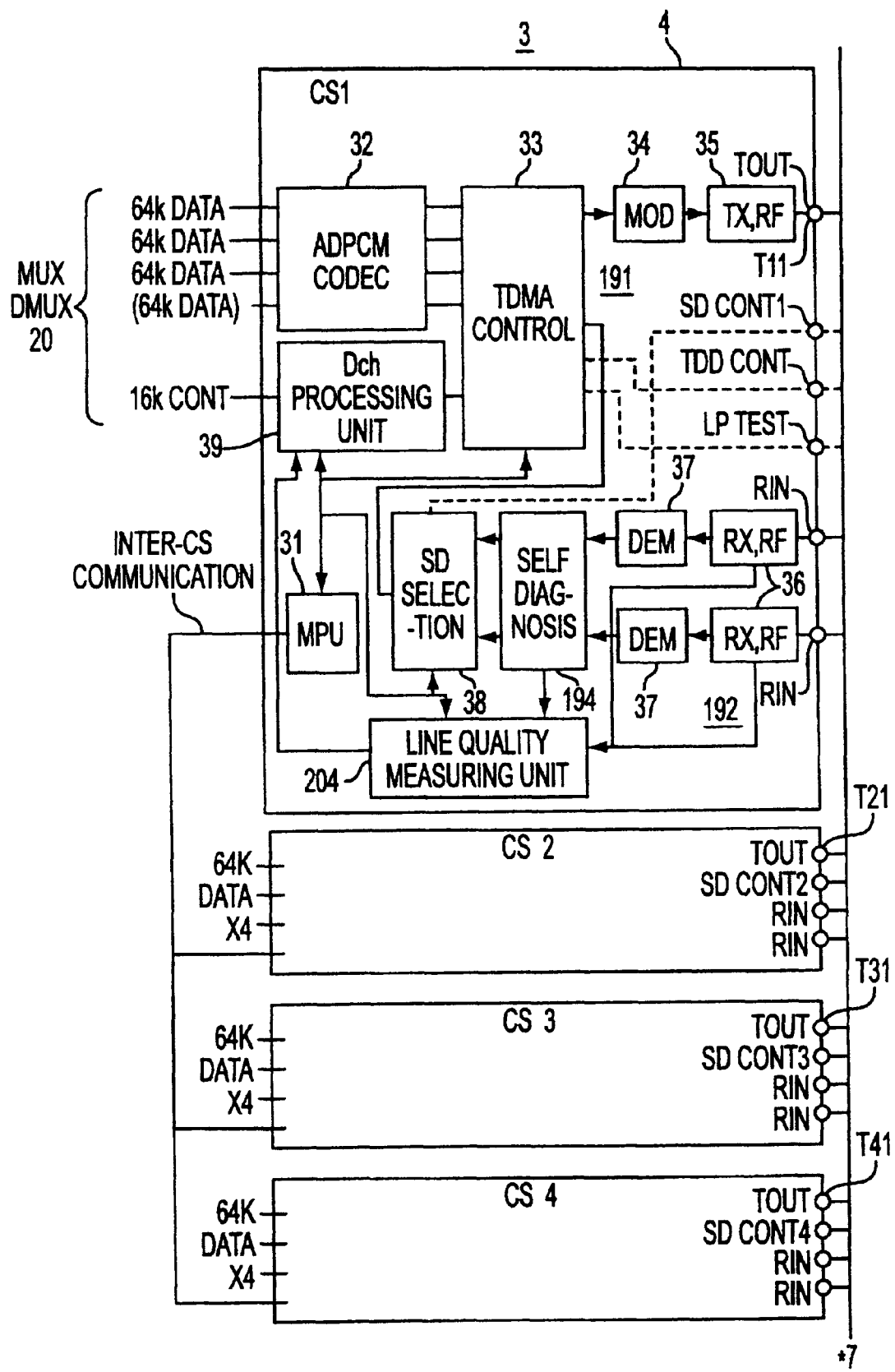
FIG. 65 is a view of a first part of a 10th embodiment according to the present invention.
Figure 66:
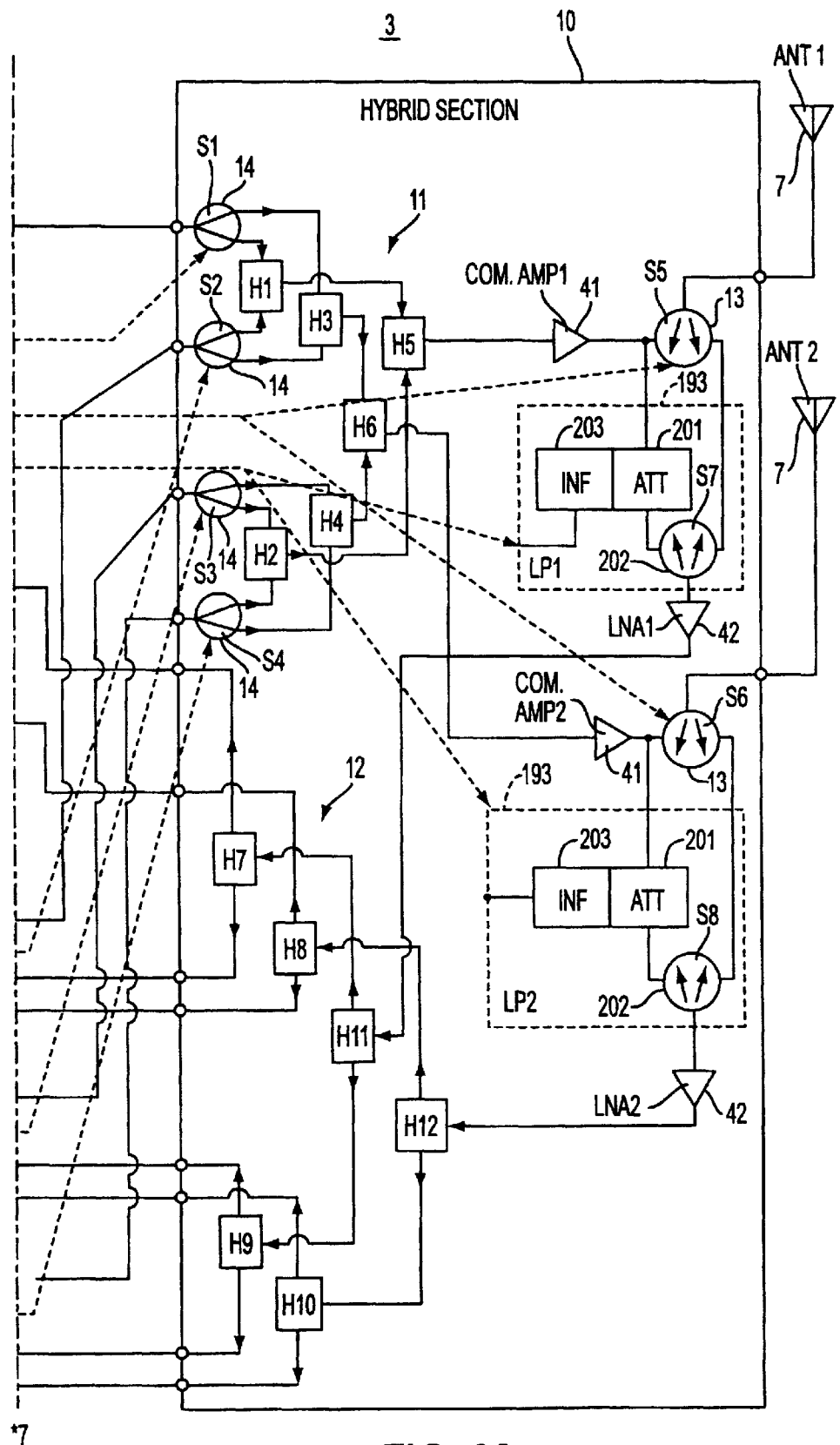
FIG. 66 is a view of a second part of the 10th embodiment according to the present invention.

FIG. 65 and FIG. 66 are views of parts of the 10th embodiment according to the present invention. Note that way of viewing these figures is in similar to that of FIGS. 4, 5, 7, 8, 9, 10, 12, 13, etc.

The components particularly introduced in the figures are indicated by the reference numerals 193, 194, etc.

The 10th embodiment relates to the above task 6) (improvement of reliability of base transceiver station (BTS)) and is basically constituted as follows. The base transceiver station assumed here is a base transceiver station (BTS) 3 in a PHS type wireless local loop (WLL) system 1 provided with (1) a plurality of cell stations (CS) 4 each having a radio transmission unit 191, a radio reception unit 192, and a time division multiple access (TDMA) control unit 33 controlling the transmitting and receiving operation under a time division multiple access (TDMA) mode, (2) a multiplexing/demultiplexing unit (MUX/DMUX) 20 performing the transfer of the digital signal between the plurality of cell stations (CS) 4 and the public switched telephone network (PSTN) by a digital multiplex signal, and (3) a hybrid section (HYB) 10 for performing the transmission and reception of the digital signals between the plurality of cell stations (CS) 4 and the subscribers SUB via the common transmitting and receiving antenna 7. Here, it has a) a loopback means 193 for performing the loopback of the transmission signal output from the radio transmission unit 191 in each cell station (CS) 4 to the subscriber SUB side from the output side of the hybrid section (HYB) 10 toward the radio reception unit 192 in the cell station (CS) 4 and b) a self-diagnosis means 194 performing management of the transmission quality by monitoring the loopback signal.

A further detailed explanation will be made of FIG. 65 and FIG. 66 below.

An attenuator (ATT) 201 in the loopback means 193 provided between the transmission combining output terminal (output to the COM·AMP1) of the hybrid H5 or H6 and the input end (input of the LNA1 or LNA2) is connected with a switch (SW) 202. Upon instruction from the time division multiple access (TDMA) control unit 33, the transmitting wave inside the cell station is looped back to the receiver side located inside the cell station and the transmission quality (frame error etc.) of the cell station is monitored during operation to perform self-diagnosis.

Contrary to this, in the conventional method of diagnosis of a base transceiver station, dedicated terminal equipment is prepared and communication is performed with the base transceiver station by manual operation to measure the speech status. In the wireless local loop (WLL) system 1, however, the number of the base transceiver stations is expected to become enormous, so this is not practical.

According to the 10th embodiment, the functions of the radio transmission unit 191 and the radio reception unit 192 can be checked by automatic measurement by remote control due to the provision of the loopback means 193 in the hybrid section 10. Namely, loopback means (LP1 and LP2) 193 combining the variable attenuator (ATT) 201 and the loopback switches (S7 and S8) 202 are provided at the output ends of the common transmitting amplifiers (COM·AMP1 and COM·AMP2) 41 of the hybrid section (HYB) 10. The loopback signal obtained by the loopback of the transmitting wave inside the cell station is supplied to the input ends of the low noise amplifiers (LNA1 and LNA2) 42 forming the common receiving amplifier.

The start command of the loopback test is transmitted from the maintenance and monitor unit in for example the base station controller (BSC) 5 through a 16K data line, passes through the D-channel processing unit 39, and is first given to the microprocessor (MPU) 31 in the cell station (CS1). By the instruction of this microprocessor (MPU) 31, the switching by the switch 202 in the loopback means (LP1 and LP2) 193 is performed and the amount of attenuation at the variable attenuator (ATT) 201 is limited through a TDMA control unit 33. Note that, reference numeral 203 shows an interface (INF) with the time division multiple access (TDMA) control unit 33.

The present loopback test can be executed in call (during operation) with the subscriber unit 2. During the transmission burst timing, the switch S7 and switch S8 are connected to the loopback side to measure the quality of the loopback transmitting wave.

The variable attenuator (ATT) 201 sets the reception level between the maximum and minimum of the prescribed range, measures the reception level and line quality (parity error) by the self-diagnosis means 194 to perform the self-diagnosis, and therefore can determine abnormalities of the apparatus etc. early.

The above reception level measurement is carried out at the receiving amplifier (RX·RF) 36. The line quality is measured by measuring the parity check bit of the signal from the demodulator (DEM) 37 at the line quality measurement unit 204. The result thereof is returned from the D-channel processing unit 39 to the maintenance and monitor unit through the 16K data line. Note that, at the reception signal burst timing, the switches S7 and S8 are connected to the reception side to receive signals from the subscriber unit 2.

As explained in detail above, according to the present invention, the following effects are exhibited.

1) The number of the transmitting and receiving antennas 7 is reduced and a small-size base transceiver station (3) can be realized.

2) A base transceiver station which is equivalently expanded in service area under the same power and which can reduce the interference with the adjoining stations can be realized.

3) A base transceiver station enabling a wireless local loop (WLL) system (1) to be easily installed in an existing public switched telephone network (PSTN) can be realized.

4) ISDN functions can be inexpensively realized in the base transceiver station.

5) A base transceiver station capable of easily providing backup against faults without the usual complete duplex configuration such as active system and standby system is realized.

6) A base transceiver station capable of maintaining a high transmission quality and reliability is realized.

What is claimed is:

1. A base transceiver station in a wireless local loop system using a mobile communication system operated under a time division duplex (TDD) mode, comprising:

a plurality of cell stations for accommodating subscriber units each comprising a plurality of terminals and a hybrid section comprising a multistage power combiner which is arranged between said plurality of cell stations and two transmitting and receiving antennas having a space diversity (SD) configuration and which combines the transmitting powers from the plurality of cell stations and feeds the combined power to one of said two transmitting and receiving antennas, a multistage power distributor which distributes the power received from one of said two transmitting and receiving antennas to said plurality of cell stations, a space diversity switch (SD·SW) which combines said transmitting powers toward one of said two transmitting and receiving antennas, and a time division duplex (TDD) switch which alternately switches said one transmitting and receiving antenna between transmission use and reception use based on the time division duplex (TDD) mode, said base transceiver station being provided with a common transmitting amplifier which operates in a time division multiple access (TDMA) mode in which said plurality of cell stations occupy channels individually allocated for every time slot and which is provided on the output side of said multistage power combiner common to said plurality of cell stations, and a common receiving amplifier provided on the input side of said multistage power distributor common with respect to said plurality of cell stations, and where the base transceiver station further includes a bias changing means which gives a bias of a level in proportion to the number of said channels in use for every said time slot to at least one amplifier between said common transmitting amplifier and said common receiving amplifier.

2. A base transceiver station in a wireless local loop system using a mobile communication system operated under a time division duplex (TDD) mode, comprising:

a plurality of cell stations for accommodating subscriber units each comprising a plurality of terminals and a hybrid section comprising a multistage power combiner which is arranged between said plurality of cell stations and a single transmitting and receiving antenna and which combines the transmitting powers from the plurality of cell stations and feeds the combined power to said transmitting and receiving antenna, a multistage power distributor which distributes the power received from said transmitting and receiving antenna to said plurality of cell stations, and a time division duplex (TDD) switch which alternately switches said transmitting and receiving antenna between transmission use and reception use based on the time division duplex (TDD) mode, said base transceiver station being provided with a common transmitting amplifier which operates in a time division multiple access (TDMA) mode in which said plurality of cell stations occupy channels individually allocated for every time slot and which is provided on the output side of said multistage power combiner common to said plurality of cell stations, and a common receiving amplifier provided on the input side of said multistage power distributor common with respect to said plurality of cell stations, and where the base transceiver station further includes a bias changing means which gives a bias of a level in proportion to the number of said channels in use for every said time slot to at least one amplifier between said common transmitting amplifier and said common receiving amplifier.

3. A base transceiver station according to claim 1 or 2, wherein:

said base transceiver station is provided with a plurality of transmitting amplifiers for every plurality of said cell stations and where the base transceiver station further includes a transmission gain changing means which detects said transmitting power at the point nearest the input end of said transmitting and receiving antenna and gives a transmission gain in accordance with the result of detection to said transmitting amplifiers.

4. A base transceiver station according to claim 3, wherein:

said base transceiver station operates in a time division multiple access (TDMA) mode in which said plurality of cell stations occupy channels individually allocated for every time slot and, at the same time, the plurality of cell stations operate while alternately repeating cycles of the transmission frame and reception frame as a whole based on said time division duplex (TDD) mode and where said transmission gain changing means makes the transmitting amplifiers of said plurality of cell stations sequentially output a constant transmitting output measurement-use burst for every said time slot in each cycle of said reception frame to obtain the transmission gain in accordance with said detection result for every transmitting amplifier and gives the transmission gains to said transmitting amplifiers until the end of the cycle of the subsequent transmission frame.

5. A base transceiver station according to claim 1 or 2, wherein:

said base transceiver station is provided with a common transmitting amplifier which is provided on the output side of said multistage power combiner common to said plurality of cell stations and where the base transceiver station further includes a transmission gain adjusting means which adjusts the transmission gain of the common transmitting amplifier so that the level of said transmitting output on the input end of said transmitting and receiving antenna is maintained at a value determined in correspondence with the number of the time slots being used in a state where the input level at the input end of said common transmitting amplifier becomes the same level for all of said plurality of cell stations.

6. A base transceiver station in a wireless local loop system using a mobile communication system operated under a time division duplex (TDD) mode, comprising:

a plurality of cell stations for accommodating subscriber units each comprising a plurality of terminals and a hybrid section comprising a multistage power combiner which is arranged between said plurality of cell stations and a single transmitting and receiving antenna and which combines the transmitting powers from the plurality of cell stations and feeds the combined power to said transmitting and receiving antenna and, a multistage power distributor which distributes the power received from said transmitting and receiving antenna to said plurality of cell stations, wherein said base transceiver station is provided with a common transmitting amplifier which operates in a time division multiple access (TDMA) mode in which said plurality of cell stations occupy channels individually allocated for every time slot and which is provided on the output side of said multistage power combiner common to said plurality of cell stations and a common receiving amplifier provided on the input side of said multistage power distributor common with respect to said plurality of cell stations and where the base transceiver station further includes a bias changing means which gives a bias of a level in proportion to the number of said channels in use for every said time slot to at least one amplifier between said common transmitting amplifier and said common receiving amplifier.

7. A based transceiver station in a wireless local loop system using a mobile communication system comprising a base transceiver station and a large number of fixed subscriber units which are distributed around the base transceiver station, are accommodated in the base transceiver station, and have a mobile terminal, wherein said base transceiver station determines a frequency to be used under a dynamic channel assign mode and is provided with a variably directional transmitting and receiving antenna means by which the transmitting and receiving wave is given a variable directivity in accordance with the distribution of said large number of fixed subscriber units with respect to said base transceiver station, and wherein said variably directional transmitting and receiving antenna means is fixedly operative in a directivity thereof once the distribution of said fixed subscriber units with respect to said base transceiver station is determined and the directivity is determined accordingly to match the determined distribution of the fixed subscriber units.

8. A base transceiver station according to claim 7, wherein:

said base transceiver station comprises a plurality of cell stations and operates under a time division multiple access (TDMA) mode in which the plurality of cell stations occupy channels individually assigned for every time slot and where said variably directional transmitting and receiving antenna means, when grouping said large number of subscriber units for each direction seen from said base transceiver station and assigning the same time slot for all of the subscriber units belonging to the same group, imparts directivity oriented to each corresponding direction for respective time slots.

9. A base transceiver station according to claim 8, wherein:

said variably directional transmitting and receiving antenna means changes said directivity to omnidirectivity for every specific time slot for transferring control information between said base transceiver station and said subscriber units.

10. A base transceiver station according to claim 7, wherein said variably directional transmitting and receiving antenna means has a dipole antenna and a phase control unit which switches the difference in feeding phase to the dipole antenna for every said time slot.

11. A base transceiver station according to claim 7, wherein said variably directional transmitting and receiving antenna means comprises:

a first variably directional transmitting and receiving antenna unit and a second variably directional transmitting and receiving antenna unit arranged at a right angle with respect to the first variably directional transmitting and receiving antenna unit.

12. A base transceiver station in a wireless local loop system using a "personal handy-phone system" (PHS) provided with:

a first base transceiver station including four cell stations each accommodating a plurality of subscriber units and a multiplexing/demultiplexing unit for multiplexing or demultiplexing digital signals transmitted and received between the cell stations and a subscriber exchange and a second base transceiver station, combined as one body with said first base transceiver station, which includes four cell stations each accommodating a plurality of subscriber units and transmits and receives digital signals between the cell stations and said subscriber exchange by commonly using said multiplexing/demultiplexing unit in said first base transceiver station, wherein in said first base transceiver station, one of said four cell stations is a master cell station handling control-use D-channel signals in addition to speech-use B-channel signals and the other three cell stations are slave cell stations transmitting and receiving the control-use D-channel signals by inter-processor communication with the master cell station; and in said second base transceiver station, one of said four cell stations is a master cell station handling control-use D-channel signals in addition to speech-use B-channel signals and the other three cell stations are slave cell stations transmitting and receiving the control-use D-channel signals by inter-processor communication with the master cell station.

13. A base transceiver station according to claim 12, wherein said multiplexing/demultiplexing unit comprises a multiplexer/demultiplexer which demultiplexes the digital multiplex signal from the public switched telephone network (PSTN) side or multiplexes received signals into the digital multiplex signal to the public switched telephone network (PSTN) side and a D-channel access control unit connected to this;

at said multiplexer/demultiplexer, a 30B+1D digital multiplex signal comprised of 30 B-channels (speech channels) and one D-channel (control channel) is separated into two B-channel systems comprising 3B×1 channels and 4B×3 channels and one D-channel system and the separated 4B-channels are distributed to three said slave cell stations provided in said first base transceiver station and three said slave cell stations provided in said second base transceiver station and, at the same time, the separated 3B channels are distributed to said master cell stations in said first and second base transceiver stations; and said D-channel access control unit connects said D-channel system to the master cell station in said first base transceiver station and the master cell station in said second base transceiver station.

14. A base transceiver station according to claim 13, wherein:

said D-channel access control unit multiplexes a D-channel signal of a speed s from said master cell station in said first base transceiver station and a D-channel signal of a speed s from said master cell station in said second base transceiver station and further multiplexes the same to a digital multiplex signal of a speed S (S>s) to said public switched telephone network (PSTN) side via said multiplexer/demultiplexer.

15. A base transceiver station according to claim 13, wherein:

said D-channel access control unit converts a D-channel signal of a speed S obtained by demultiplexing from the digital multiplex signal on said public switched telephone network (PSTN) side by said multiplexer/demultiplexer to a first D-channel signal of a speed s and a second D-channel signal of a speed s and distributes them to said master cell station in said first base transceiver station and said master cell station in said second base transceiver station.

16. A base transceiver station according to claim 13, wherein:

terminal endpoint identifiers (TEI) in a LAPD are fixedly allocated to said master cell station in said first base transceiver station and said master cell station in said second base transceiver station; and said D-channel access control unit separates a D-channel signal of a speed S obtained by demultiplexing from the digital multiplex signal from said public switched telephone network (PSTN) side by said multiplexer/demultiplexer to a first D-channel signal of a speed s and a second D-channel signal of a speed s according to said terminal endpoint identifiers (TEI) and distributes them to said master cell station in said first base transceiver station and said master cell station in said second base transceiver station.

17. A base transceiver station according to claim 13, wherein:

said base transceiver station receives said digital multiplex signal obtained by placing the first D-channel signals oriented to said first base transceiver station and the second D-channel signals oriented to said second base transceiver station in a time slot for the D-channel according to a predetermined timing rule from said public switched telephone network (PSTN) side and said D-channel access control unit automatically distributes the received first D-channel signals and second D-channel signals to said first base transceiver station and said second base transceiver station according to said predetermined timing rule.

18. A base transceiver station according to claim 17, wherein:

said time slot of the D-channel is divided into a plurality of blocks according to said predetermined timing rule, the first D-channel signals oriented to said first base transceiver station are allocated to the first block, the second D-channel signals oriented to said second base transceiver station are allocated to the second block, and the other blocks are regarded as empty blocks.

19. A base transceiver station according to claim 17, wherein:

when said base transceiver station receives said digital multiplex signal having a continuous frame configuration from said public switched telephone network (PSTN) side, said predetermined timing rule is determined according to a repeatedly appearing series of frames;

the first D-channel signal oriented to said first base transceiver station is placed in said time slot of the D-channel in the first frame in one series of frames;

the second D-channel signal oriented to said second base transceiver station is placed in said time slot of the D-channel in the second frame; and said time slots of the D-channel of the third frame and subsequent frames are regarded as idle time slots.

20. A base transceiver station according to claim 13, wherein:

said D-channel access control unit momentarily terminates said first and second D-channel signals of a speed s respectively received from said master cell station in said first base transceiver station and said master cell station in said second base transceiver station, further multiplexes the same together with the monitoring control signal containing various monitoring control information generated in the base transceiver station, and inserts the same as a D-channel signal of a speed S (S>s) in the digital multiplex signal on said public switched telephone network (PSTN) side.

21. A base transceiver station according to claim 13, wherein:

when said base transceiver station receives a digital multiplex signal of a speed S obtained by multiplexing said first D-channel signal oriented to said master cell station in said first base transceiver station, a second D-channel signal oriented to said master cell station in said second base transceiver station, and monitoring control signal containing various monitoring control information used in the base transceiver station in the D-channel from said public switched telephone network (PSTN) side, said D-channel access control unit terminates said first D-channel signal, said second D-channel signal, and said monitoring control signal, converts them to a first D-channel signal and second D-channel signal each having a speed s (S>s), and transmits the same to the corresponding master cell stations.

22. A base transceiver station according to claim 13, wherein said D-channel access control unit manages and controls terminal endpoint identifiers (TEI) in a LAPD on said public switched telephone network (PSTN) side and the terminal endpoint identifiers (TEI) in a LAPD on each said master cell station side in said first and second base transceiver stations, replaces the terminal endpoint identifiers (TEI), and terminates the LAPD on said public switched telephone network (PSTN) side and the LAPD on each said master cell station side.

23. A base transceiver station according to claim 13, wherein said D-channel access control unit momentarily terminates download information of software which has been placed in said D-channel in said digital multiplex signal from said public switched telephone network (PSTN) side for transfer, holds this in its memory, and feeds the download information to said master cell stations in said first and second base transceiver stations by a LAPB protocol.

24. A base transceiver station in a wireless local loop system using a "personal handy-phone system" (PHS), wherein the base transceiver station is connected to a public switched telephone network (PSTN) via interface converting equipment converting a protocol used in the existing public switched telephone network (PSTN) and a protocol used in the wireless local loop system between each other, wherein said interface converting equipment has:
   a first input/output unit connected to said wireless local loop system side;
   a second input/output unit connected to said public switched telephone network (PSTN) side;
   a switching unit inserted between said first input/output unit and the second input/output unit;
   a layer 2 terminating unit for terminating digital data from said wireless local loop system side obtained via the switching unit and digital data of each layer 2 from said public switched telephone network (PSTN) side; and
   a central processing unit (CPU) which processes the message of a layer 3 obtained at the layer 2 terminating unit, converts this to digital data of the layer 2 again, and transmits the resultant data to said public switched telephone network (PSTN) side and said wireless local loop system side opposing each other via said switching unit.

25. A base transceiver station according to claim 24, wherein said interface converting equipment further has
   a maintenance and operating unit which performs at least monitoring and control of the interface converting equipment per se and said base transceiver station and management and maintenance of the subscriber information.

26. A method of operating a base transceiver station in a wireless local loop system using a "personal handy-phone system" (PHS) having
   a first base transceiver station having a plurality of cell stations each accommodating a plurality of subscriber units and a multiplexing/demultiplexing unit for multiplexing or demultiplexing digital signals transmitted and received between the cell stations and a subscriber exchange, and
   a second base transceiver station which has a plurality of cell stations each accommodating a plurality of subscriber units and commonly uses said multiplexing/demultiplexing unit in said first base transceiver station to transmit and receive digital signals between the cell stations and said subscriber exchange, wherein
      at least one of said plurality of cell stations is set as the master cell station (CS1) handling control-use D-channel signals in addition to speech-use B-channel signals and the remaining plurality of cell stations are set as slave cell stations (CS2, CS3, and CS4) controlled by the master cell station; and
      when a fault occurs in one said master cell station, the fault is covered by one of the remaining plurality of cell stations.

27. A method of operation according to claim 26, wherein:
   when a fault occurs in the master cell station (CS1)in one of said first and second base transceiver stations each having said master cell station (CS1),
   said base transceiver station is maintained by only the other of the first and second base transceiver stations.

28. A method of operation according to claim 26, wherein:
   when a fault occurs in the master cell station (CS1) in one of said first and second base transceiver stations each having said master cell station (CS1),
   said control, including that of said slave cell stations in that faulty base transceiver station, is continued by said master cell station in the other of the first and second base transceiver stations.

29. A method of operation according to claim 26, wherein:
   a backup master cell station forming an active and standby pair together with the master cell station (CS1) is further added to said master cell station (CS1) and
   when a fault occurs in the active master cell station (CS1), it is switched to said backup master cell station to continue said control.

30. A method of operation according to claim 26, wherein:
   a universal cell station which can operate as said master cell station (CS1) and said slave cell stations (CS2, CS3, and CS4) is additionally provided and
   when a fault occurs in one of said master cell station and said slave cell stations,
   the function of the faulty cell station is taken over by the universal cell station.

31. A method of operation according to claim 26, wherein:
   each of said slave cell stations (CS2, CS3, and CS4) is also provided with a function as said master cell station (CS1) and
   when a fault occurs in said master cell station (CS1),
   the function of the faulty master cell station (CS1) is taken over by a selected slave cell station.

32. A method of operation according to claim 31, wherein the slave cell station succeeding to function of the master cell station (CS1) is arbitrarily selected from among said plurality of slave cell stations (CS2, CS3, and CS4).

33. A method of operation according to claim 31, wherein:
   second management information equivalent to first management information held by said master cell station (CS1) per se is held in a managing memory in said multiplexing/demultiplexing unit in parallel;
   said selected slave cell station takes over said second management information from said managing memory; and
   the entire base transceiver station is restarted.

34. A method of operation according to claim 31, wherein:
   second management information equivalent to first management information held by said master cell station (CS1) per se is held parallelly in a common memory shared by all said cell stations;
   said selected slave cell station takes over said second management information from said common memory; and
   the entire base transceiver station in restarted.

35. A method of operation according to claim 31, wherein:
   second management information equivalent to first management information held by said master cell station (CS1) per se is held in distributed memories provided in said slave cell stations (CS2, CS3, and CS4) in parallel;
   said selected slave cell station takes over said second management information from its own distributed memory; and
   the entire base transceiver station is restarted.

36. A method of operation according to claim 31, wherein:
   when selecting said slave cell station to take over the function of said faulty master cell station;

a slave cell station where none of the channels are in use or, if there is no such cell station, the one of the cell stations having the smallest number of channels in use is selected from the plurality of slave cell stations (CS2 to CS4), said selected slave cell station is restarted as the master cell station.

37. A method of operation according to claim 31, wherein:

when selecting said slave cell station to take over the function of said faulty master cell station, a slave cell station where none of the channels are in use is searched for from among the plurality of slave cell stations (CS2 to CS4) and it is decided if there is not even one such slave cell station, when the above decision has been made, one of the plurality of slave cell stations (CS2 to CS4) is arbitrarily selected as the new master cell station (CS1) and the management information held by the new master cell station (CS1) at the time of selection is taken over by anyone of the other slave cell stations which were not selected.

38. A base transceiver station in a wireless local loop system using a mobile communication system operated under a time division duplex (TDD) mode, comprising:

a plurality of cell stations for accommodating subscriber units each comprising a plurality of terminals and a hybrid section comprising a multistage power combiner which is arranged between said plurality of cell stations and two transmitting and receiving antennas having a space diversity (SD) configuration and which combines the transmitting powers from the plurality of cell stations and feeds the combined power to one of said two transmitting and receiving antennas, a multistage power distributor which distributes the power received from one of said two transmitting and receiving antennas to said plurality of cell stations, a space diversity switch (SD·SW) which combines said transmitting powers toward one of said two transmitting and receiving antennas, and a time division duplex (TDD) switch which alternately switches said one transmitting and receiving antenna between transmission use and reception use based on the time division duplex (TDD) mode, wherein said base transceiver station is provided with a plurality of transmitting amplifiers for every plurality of said cell stations and where the base transceiver station further includes a transmission gain changing means which detects said transmitting power at the point nearest the input end of said transmitting and receiving antenna and gives a transmission gain in accordance with the result of detection to said transmitting amplifiers, said transmission gain is controlled by utilizing a reception cycle.

39. A base transceiver station in a wireless local loop system using a mobile communication system operated under a time division duplex (TDD) mode, comprising:

a plurality of cell stations for accommodating subscriber units each comprising a plurality of terminals and a hybrid section comprising a multistage power combiner which is arranged between said plurality of cell stations and a single transmitting and receiving antenna and which combines the transmitting powers from the plurality of cell stations and feeds the combined power to said transmitting and receiving antenna, a multistage power distributor which distributes the power received from said transmitting and receiving antenna to said plurality of cell stations, and a time division duplex (TDD) switch which alternately switches said transmitting and receiving antenna between transmission use and reception use based on the time division duplex (TDD) mode, said base transceiver station is provided with a plurality of transmitting amplifiers for every plurality of said cell stations and where the base transceiver station further includes a transmission gain changing means which detects said transmitting power at the point nearest the input end of said transmitting and receiving antenna and gives a transmission gain in accordance with the result of detection to said transmitting amplifiers, said transmission gain is controlled by utilizing a reception cycle.

* * * * *